United States Patent
Gray

(10) Patent No.: US 11,575,851 B2
(45) Date of Patent: *Feb. 7, 2023

(54) HANDHELD COMMUNICATION DEVICE WITH DRIVE-SENSE CIRCUIT BASED IMAGING ARRAY AND METHODS FOR USE THEREWITH

(71) Applicant: SigmaSense, LLC., Wilmington, DE (US)

(72) Inventor: Michael Shawn Gray, Dripping Springs, TX (US)

(73) Assignee: SigmaSense, LLC., Wilmington, DE (US)

( * ) Notice: Subject to any disclaimer, the term of this patent is extended or adjusted under 35 U.S.C. 154(b) by 29 days.

This patent is subject to a terminal disclaimer.

(21) Appl. No.: 17/444,955

(22) Filed: Aug. 12, 2021

(65) Prior Publication Data
US 2022/0385851 A1 Dec. 1, 2022

Related U.S. Application Data

(60) Provisional application No. 63/202,134, filed on May 28, 2021.

(51) Int. Cl.
*H04N 5/3745* (2011.01)
*H04N 5/378* (2011.01)

(52) U.S. Cl.
CPC ......... *H04N 5/37455* (2013.01); *H04N 5/378* (2013.01)

(58) Field of Classification Search
None
See application file for complete search history.

(56) References Cited

U.S. PATENT DOCUMENTS 6,218,972 B1 4/2001 Groshong
6,665,013 B1 12/2003 Fossum et al.
(Continued)

FOREIGN PATENT DOCUMENTS

CN 103995626 A 8/2014
CN 104182105 A 12/2014

OTHER PUBLICATIONS

U.S. Appl. No. 17/444,951, filed Dec. 2020.*
(Continued)

*Primary Examiner* — Mark T Monk
(74) *Attorney, Agent, or Firm* — Garlick & Markison; Bruce E. Stuckman

(57) ABSTRACT

An imaging device includes pixel sensors. A drive-sense circuit is configured to generating a sensed signal corresponding to one of pixel sensors. The drive-sense circuit includes: a first conversion circuit configured to convert, a receive signal component of a sensor signal corresponding to the one of the pixel sensors into the sensed signal, wherein the sensed signal indicates a change in a capacitance associated with the one of the pixel sensors; a second conversion circuit configured to generate, based on the sensed signal, a drive signal component of the sensor signal corresponding to the one of the pixel sensors. The drive-sense circuit is further configured to generate other sensed signals corresponding to other ones of the pixel sensors for the other ones of the pixel sensors. A graphics processing module is configured to generate image data based on the sensed signal and the other sensed signals.

20 Claims, 35 Drawing Sheets

(56) References Cited

U.S. PATENT DOCUMENTS

Figure 1:
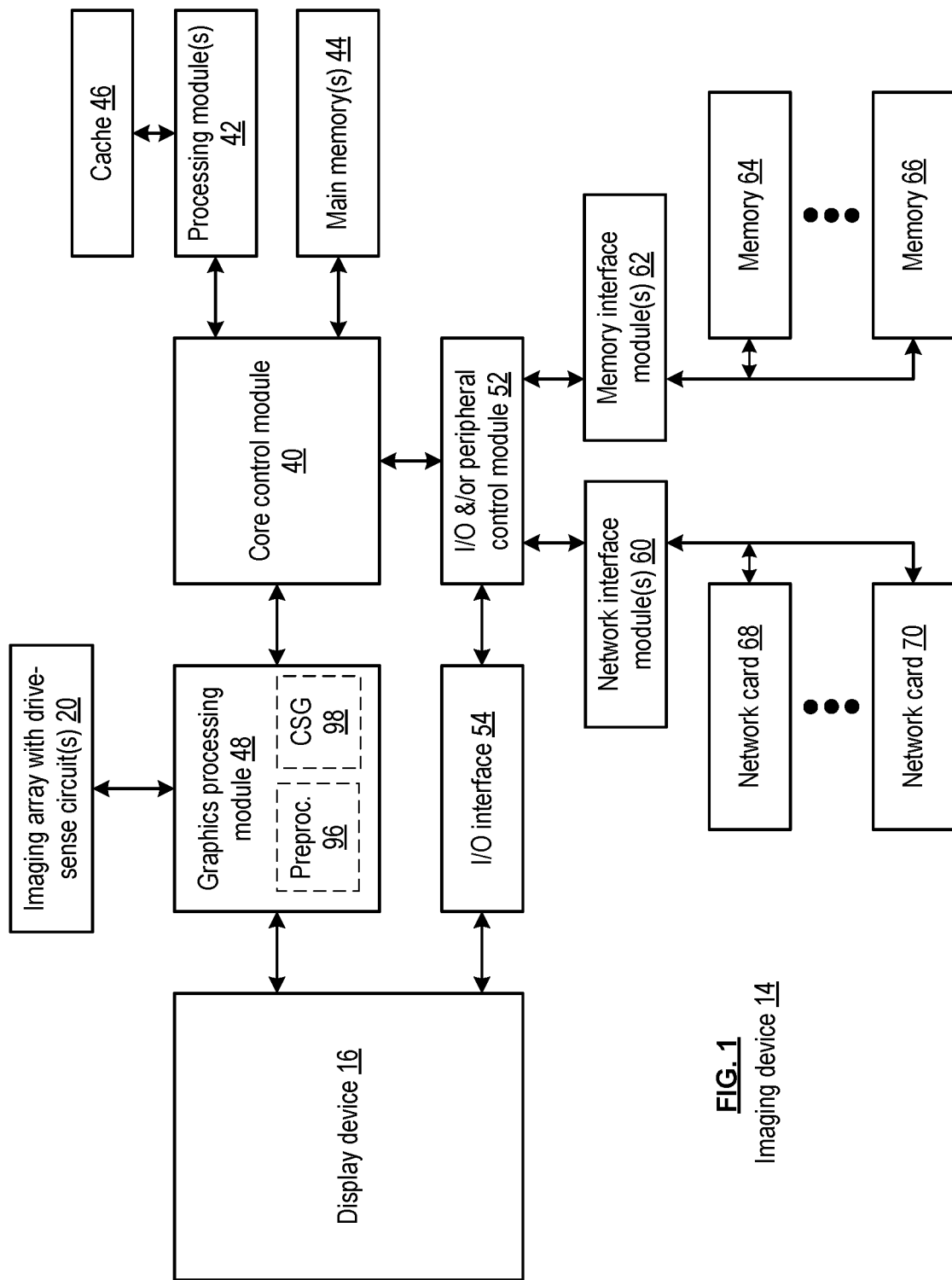

| | | |
|---|---|---|
| 7,528,755 B2 | 5/2009 | Hammerschmidt |
| 8,031,094 B2 | 10/2011 | Hotelling |
| 8,089,289 B1 | 1/2012 | Kremin et al. |
| 8,279,180 B2 | 10/2012 | Hotelling et al. |
| 8,547,114 B2 | 10/2013 | Kremin |
| 8,587,535 B2 | 11/2013 | Oda et al. |
| 8,625,726 B2 | 1/2014 | Kuan |
| 8,982,097 B1 | 3/2015 | Kuzo et al. |
| 9,201,547 B2 | 12/2015 | Elias |
| 2011/0063154 A1 | 3/2011 | Hotelling et al. |
| 2011/0298745 A1 | 12/2011 | Souchkov |
| 2012/0278031 A1 | 11/2012 | Oda |
| 2013/0278447 A1 | 10/2013 | Kremin |
| 2014/0168450 A1* | 6/2014 | Meddeler ............ H04N 17/002 348/187 |
| 2014/0327644 A1 | 11/2014 | Mohindra |
| 2015/0091847 A1 | 4/2015 | Chang |
| 2015/0346889 A1 | 12/2015 | Chen |
| 2016/0188049 A1 | 6/2016 | Yang et al. |

OTHER PUBLICATIONS

Baker; How delta-sigma ADCs work. Part 1; Analog Applications Journal; Oct. 1, 2011; 6 pgs.
Brian Pisani, "Digital Filter Types in Delta-Sigma ADCs", Application Report SBAA230, May 2017, pp. 1-8, Texas Instruments Incorporated, Dallas, Texas.

\* cited by examiner

Imaging device 14

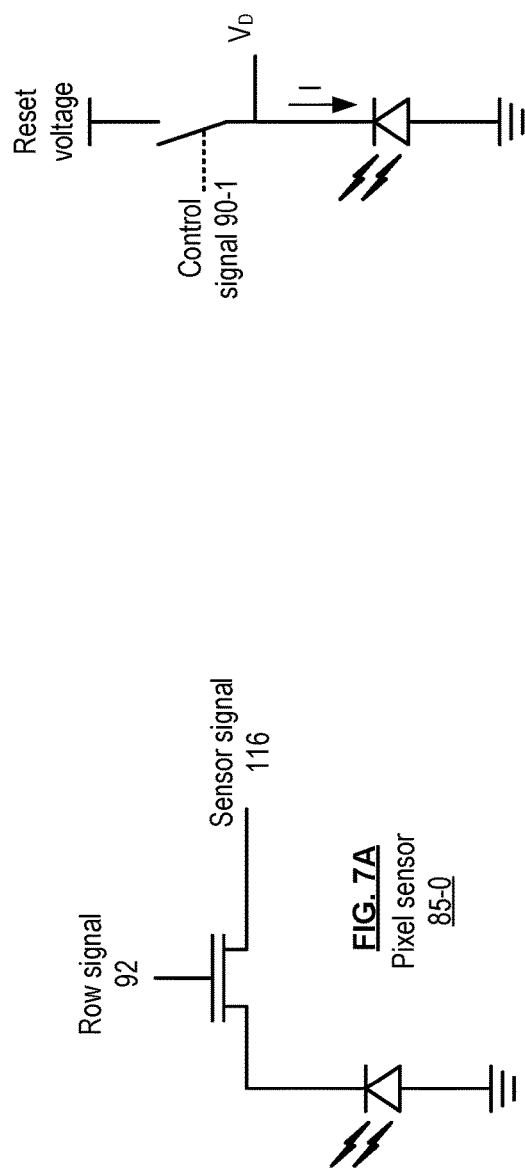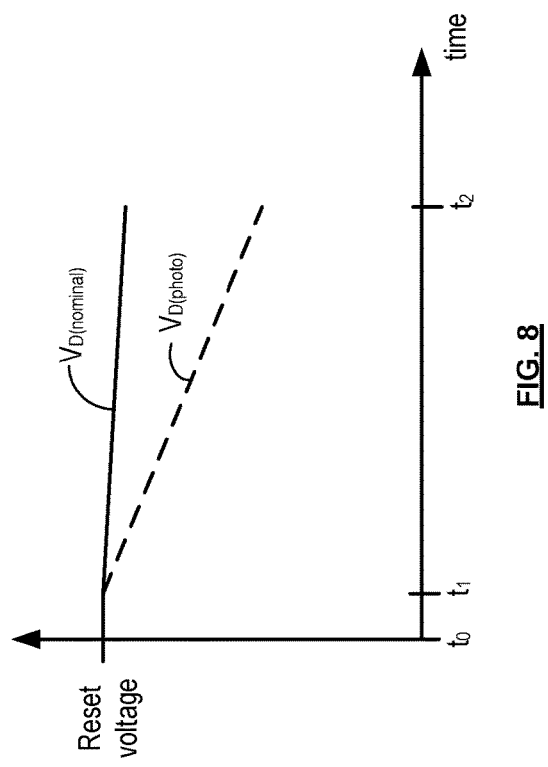

DSC 28-2

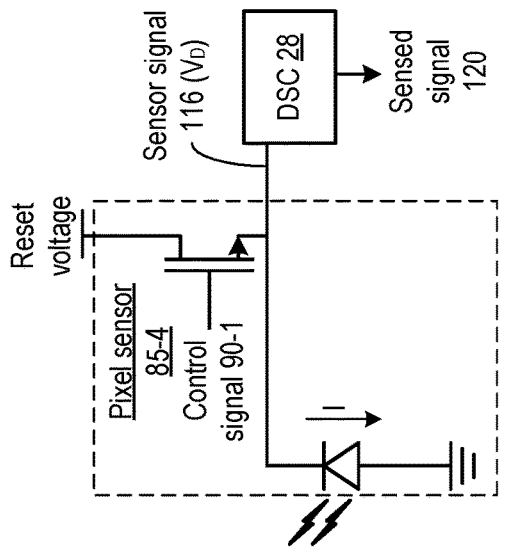
FIG. 13
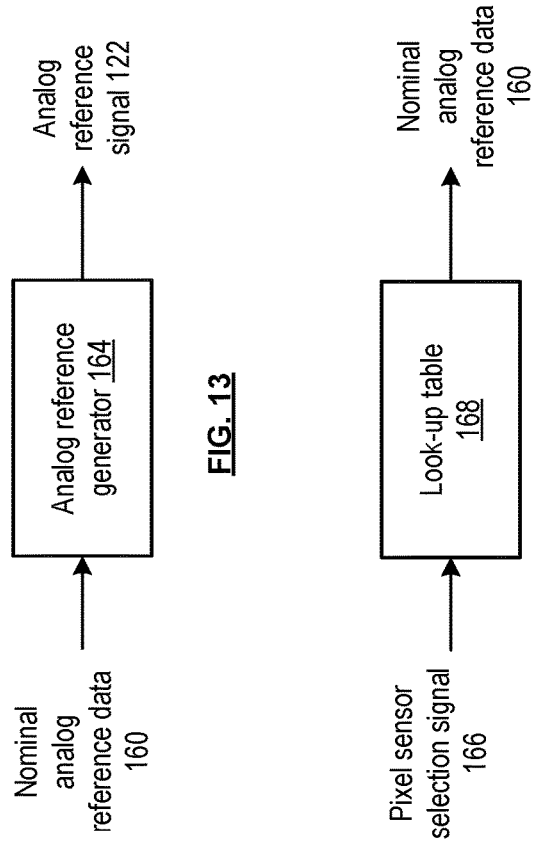
FIG. 14
FIG. 15
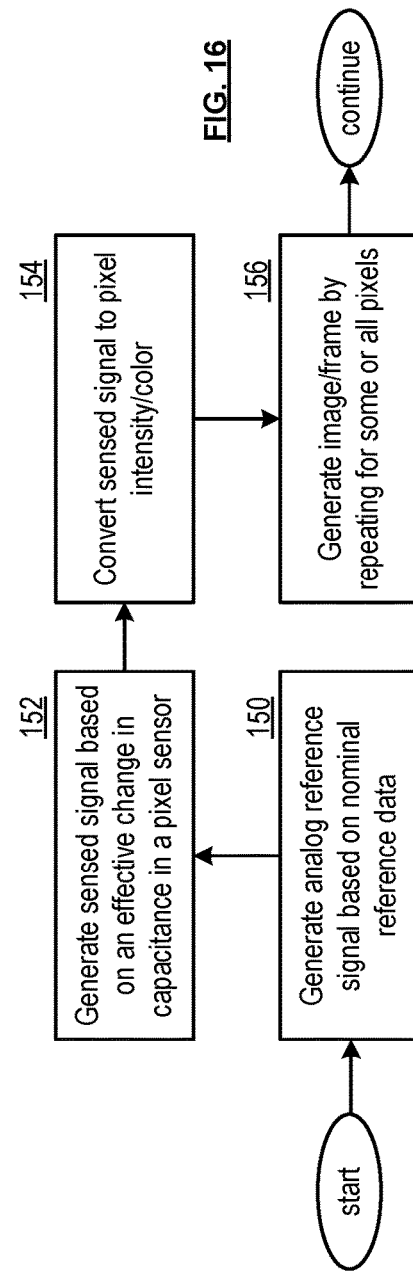
FIG. 16

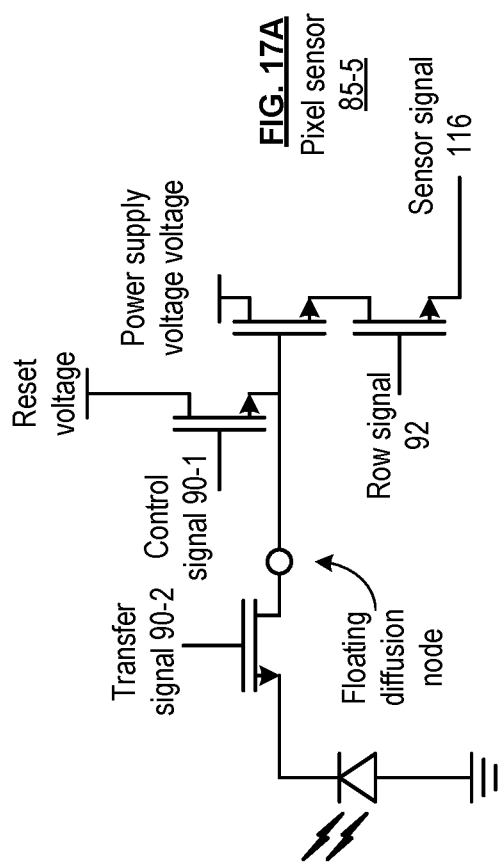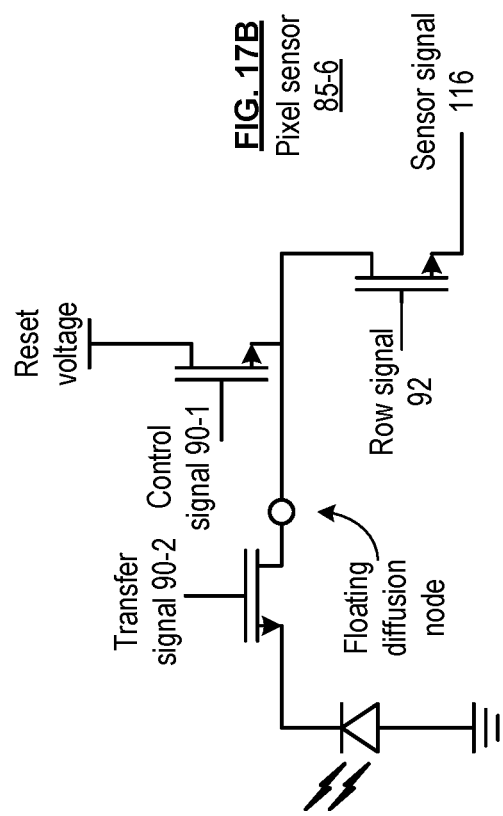

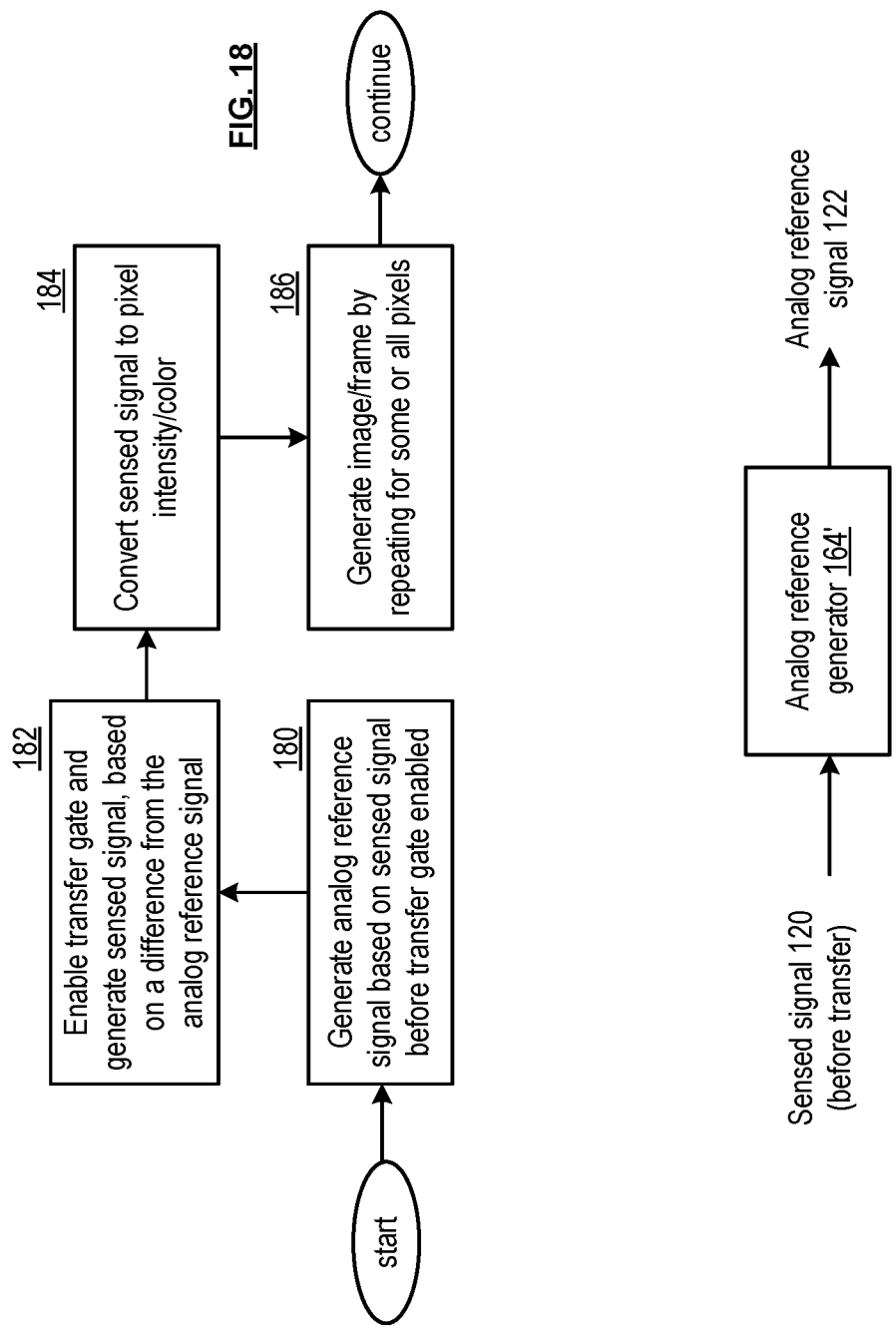

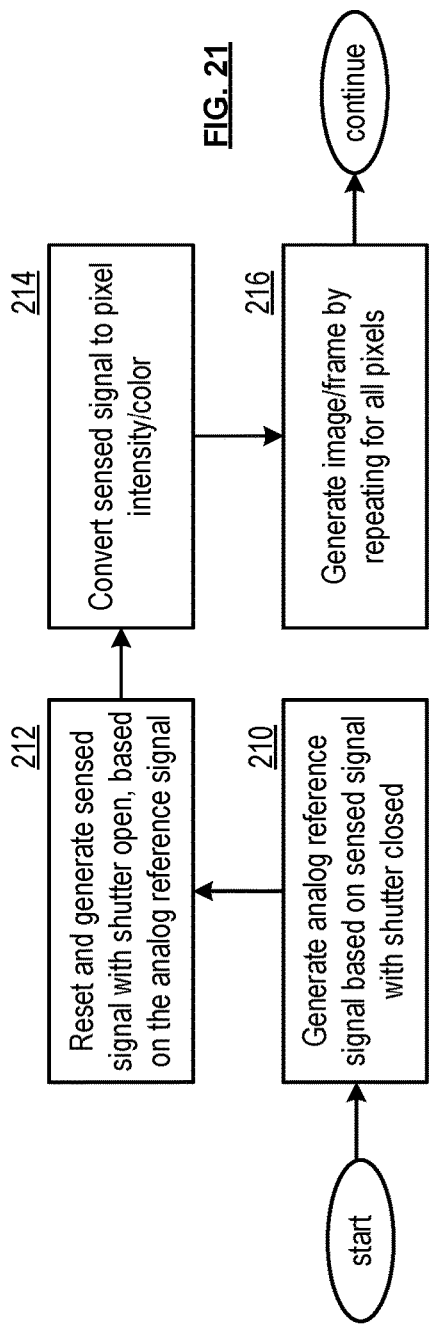
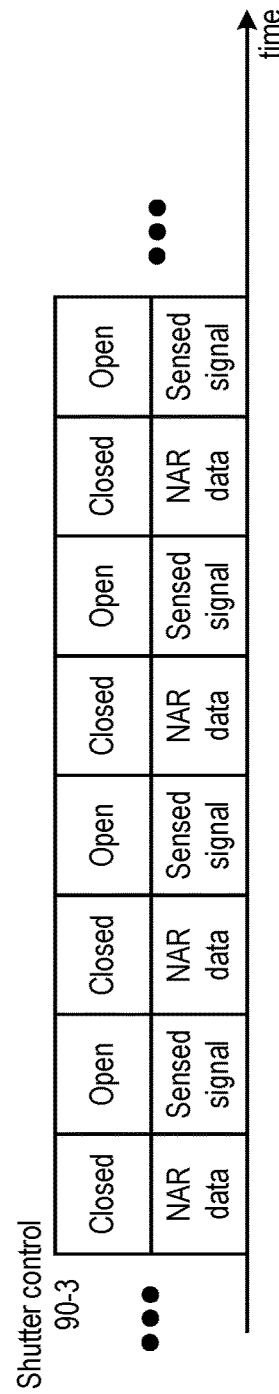
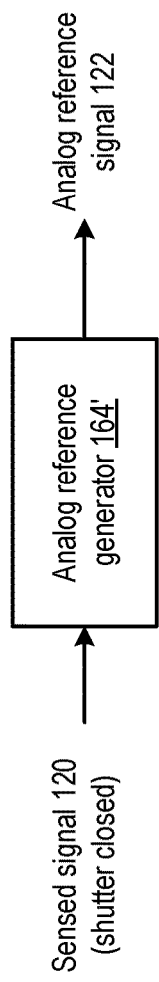

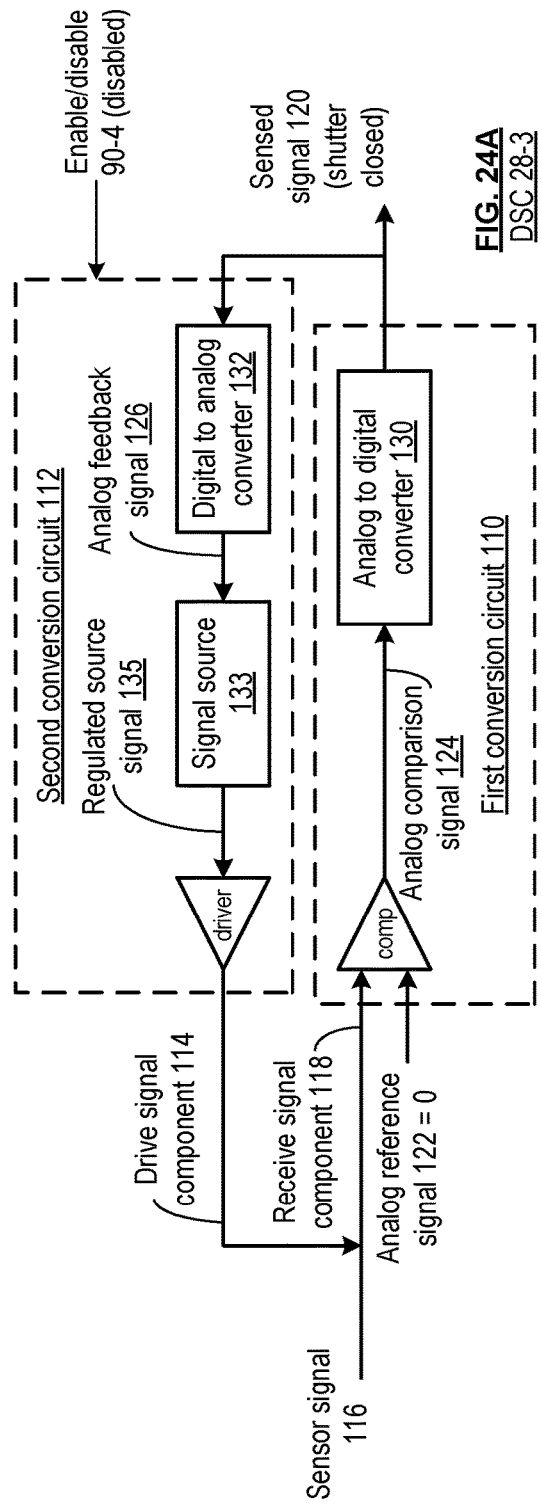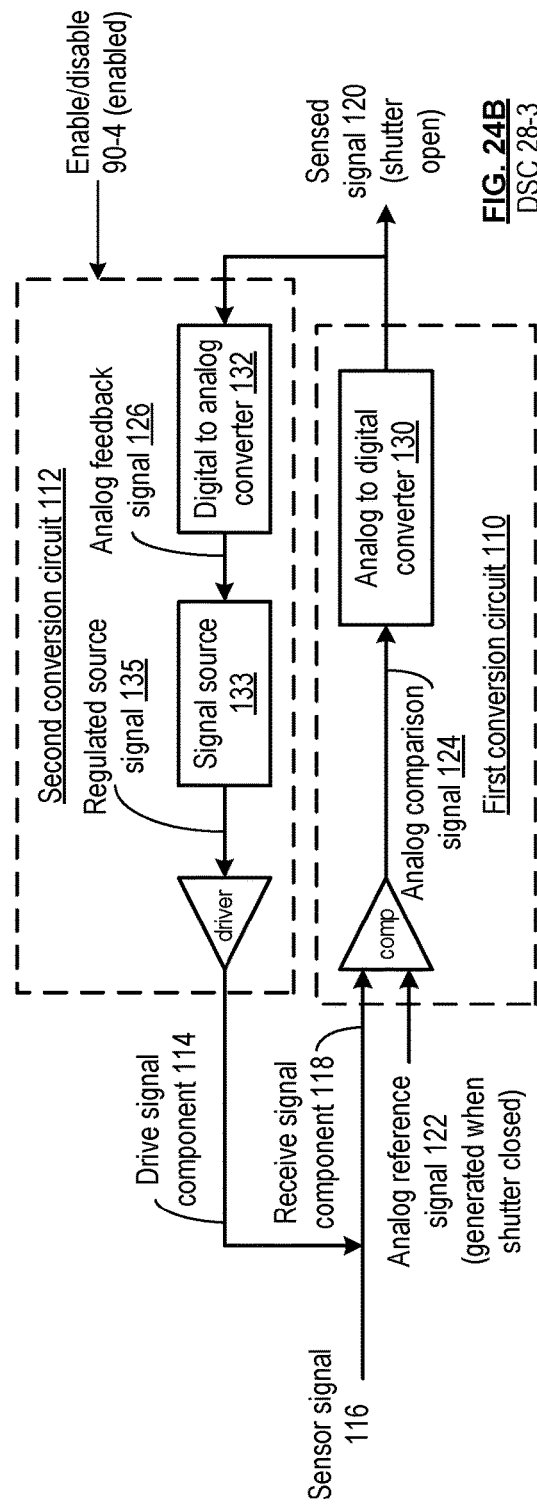

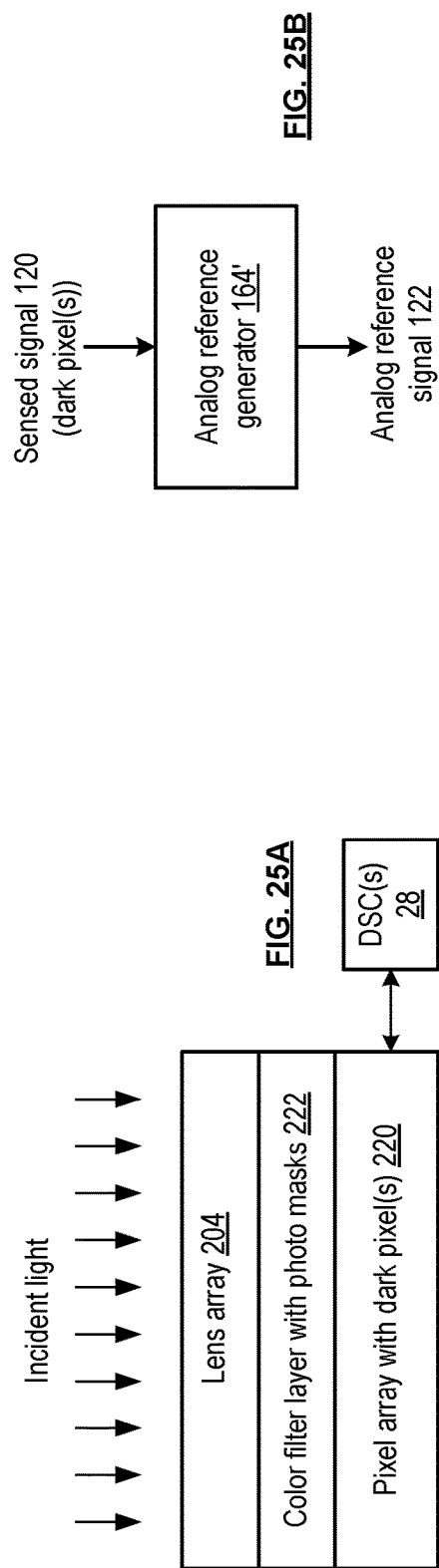
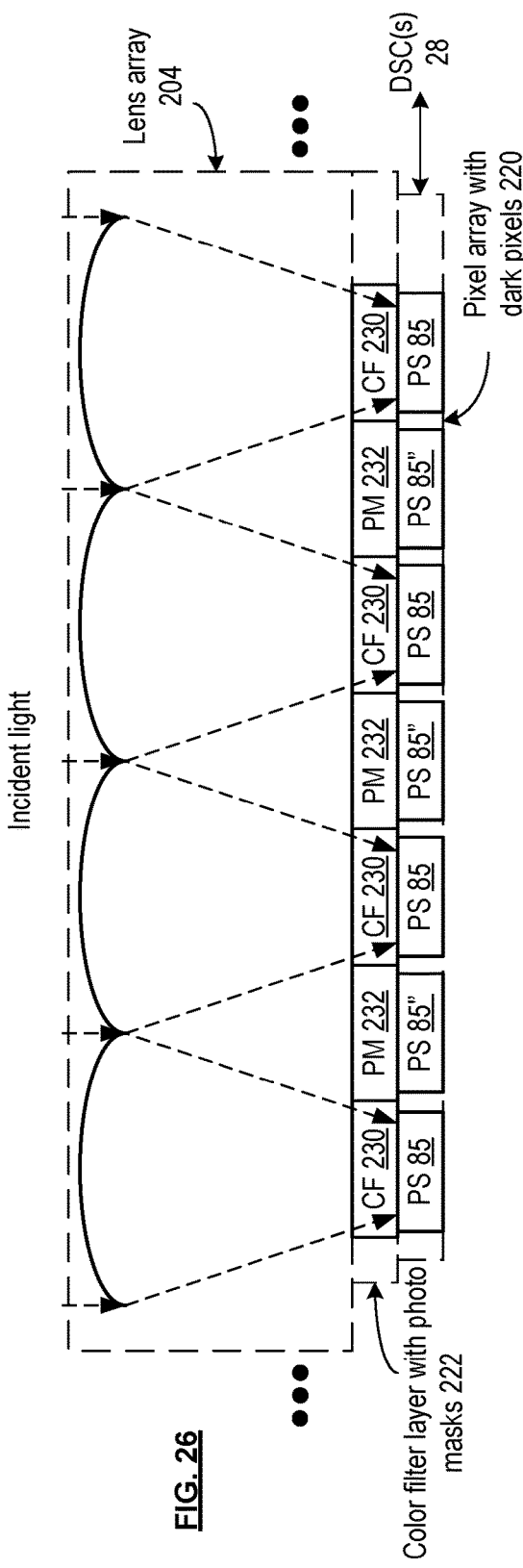

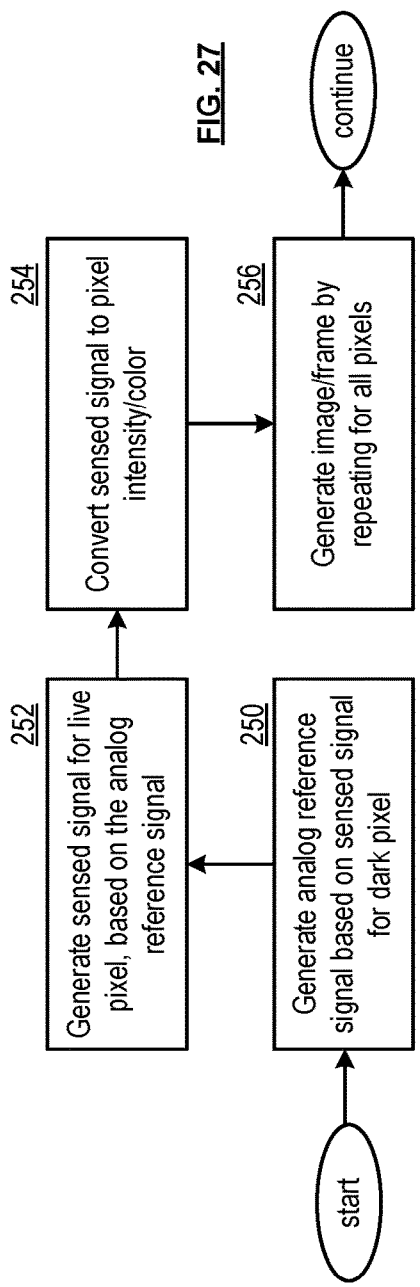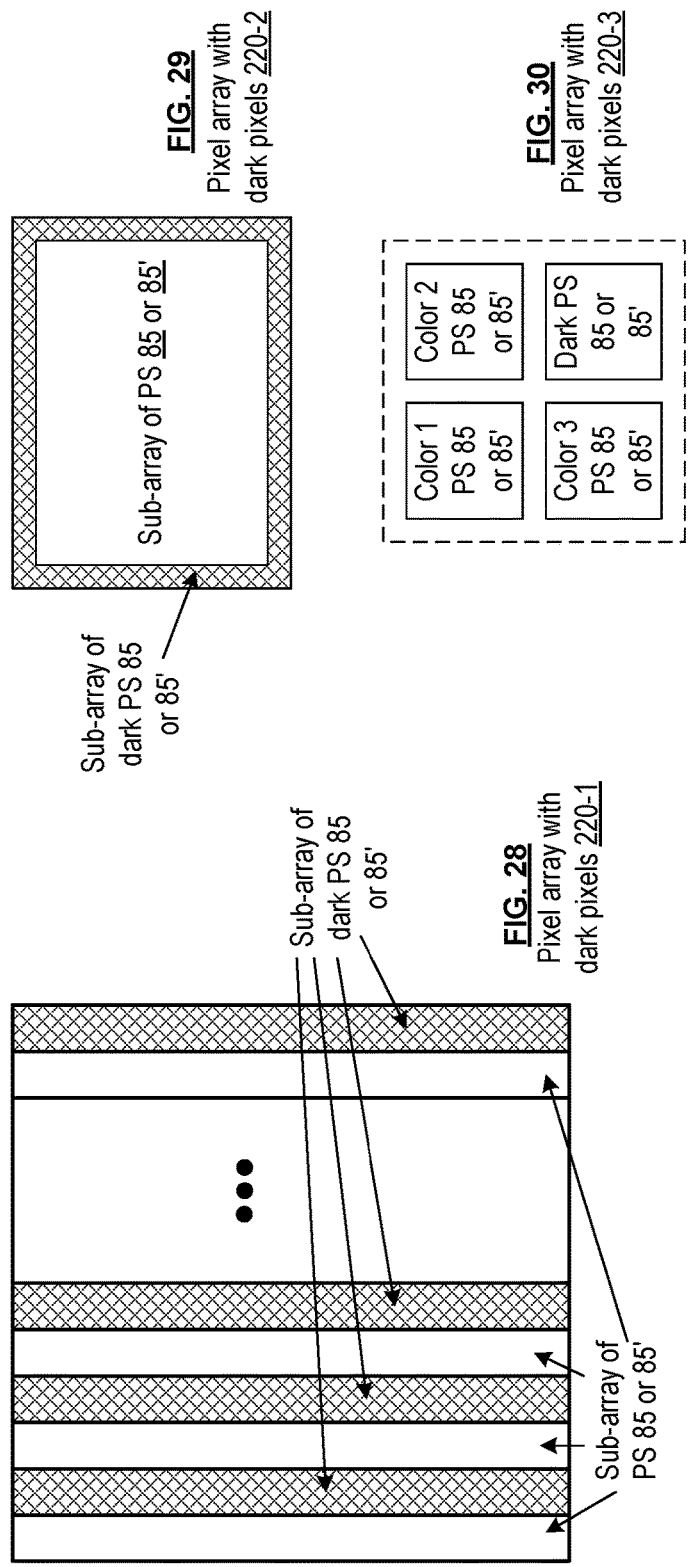

Handheld communication device 1014

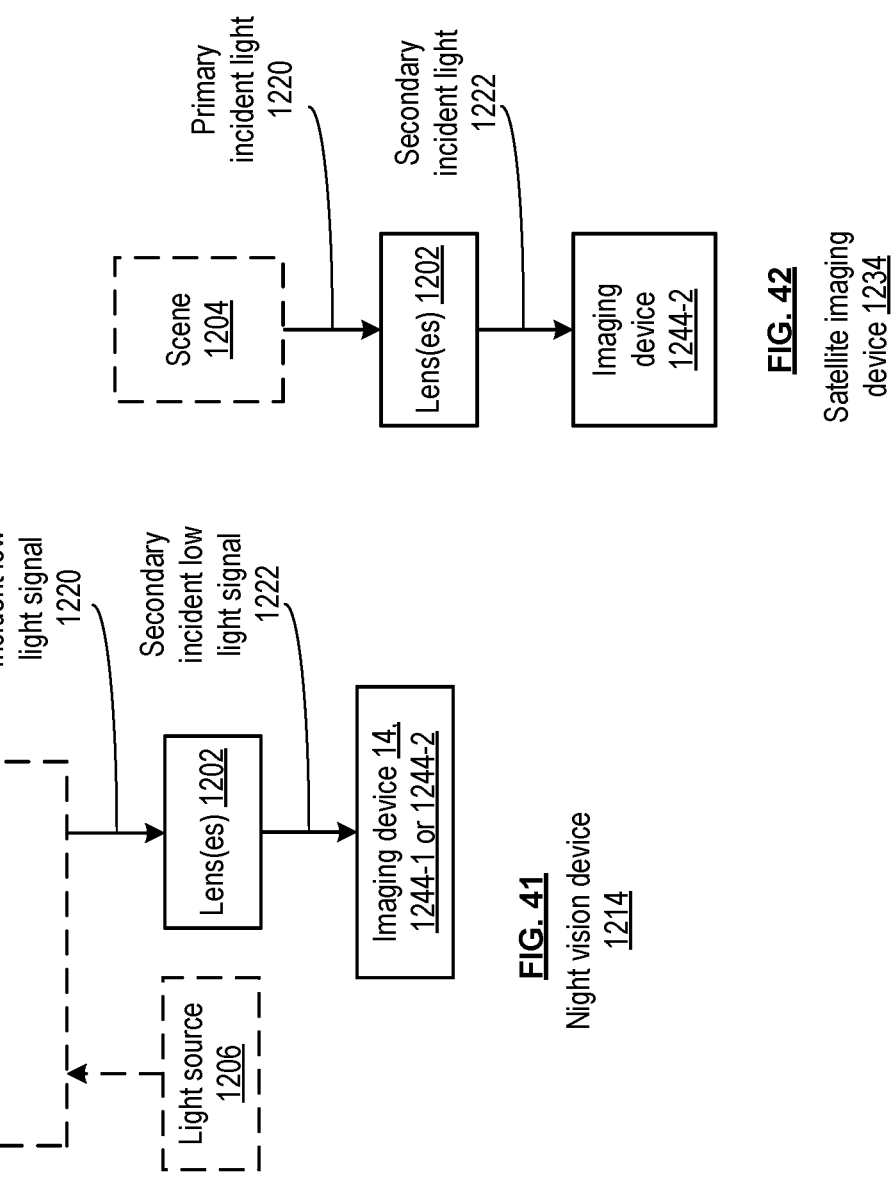
FIG. 42
Satellite imaging device 1234
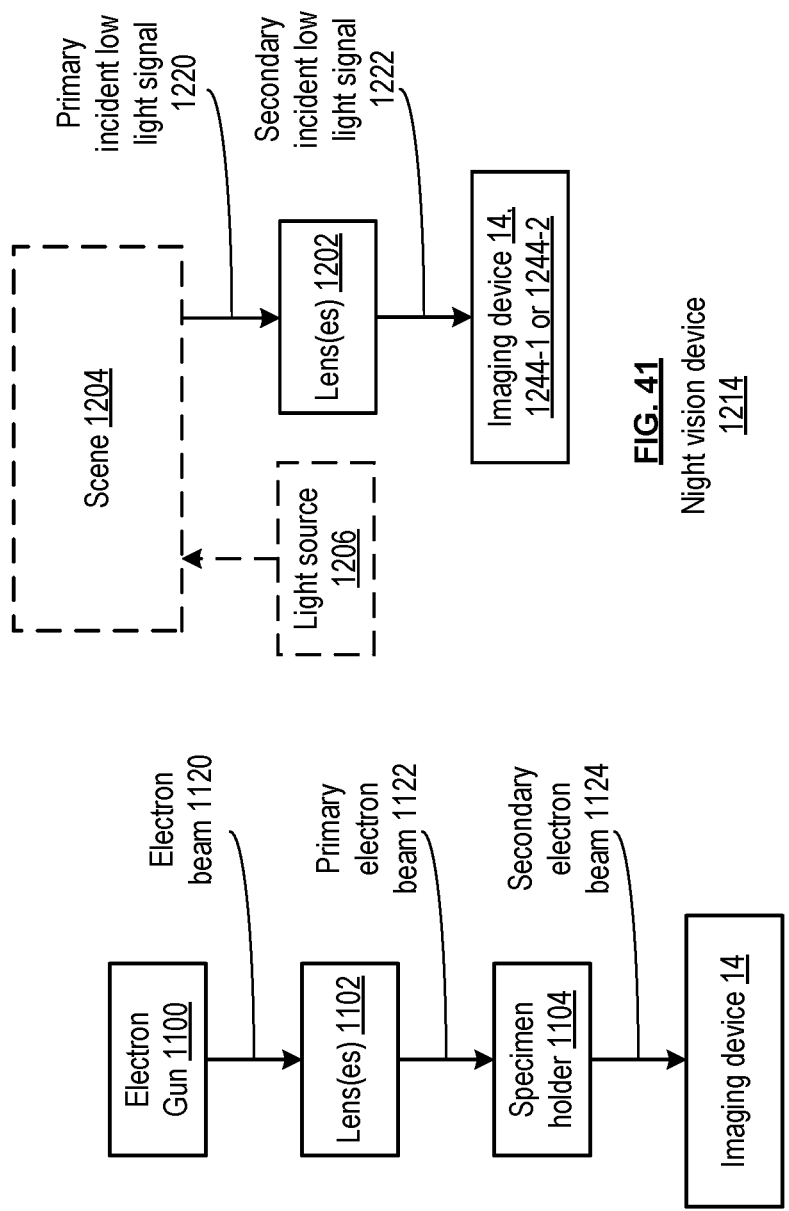
FIG. 41
Night vision device 1214
FIG. 40
Electron Microscope 1114

Imaging device 1244-1

Imaging device 1244-2

LIDAR device 1314

Imaging device 1344

HANDHELD COMMUNICATION DEVICE WITH DRIVE-SENSE CIRCUIT BASED IMAGING ARRAY AND METHODS FOR USE THEREWITH

CROSS REFERENCE TO RELATED APPLICATIONS

The present U.S. Utility Patent Application claims priority pursuant to 35 U.S.C. § 119(e) to U.S. Provisional Application No. 63/202,134, entitled "HANDHELD COMMUNICATION DEVICE WITH DRIVE-SENSE CIRCUIT BASED IMAGING ARRAY AND METHODS FOR USE THEREWITH", filed May 28, 2021, which is hereby incorporated herein by reference in its entirety and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to digital imaging systems used in communication devices and more particularly to sensed data collection from imaging sensors.

BRIEF DESCRIPTION OF THE SEVERAL VIEWS OF THE DRAWING(S)

Figure 2:
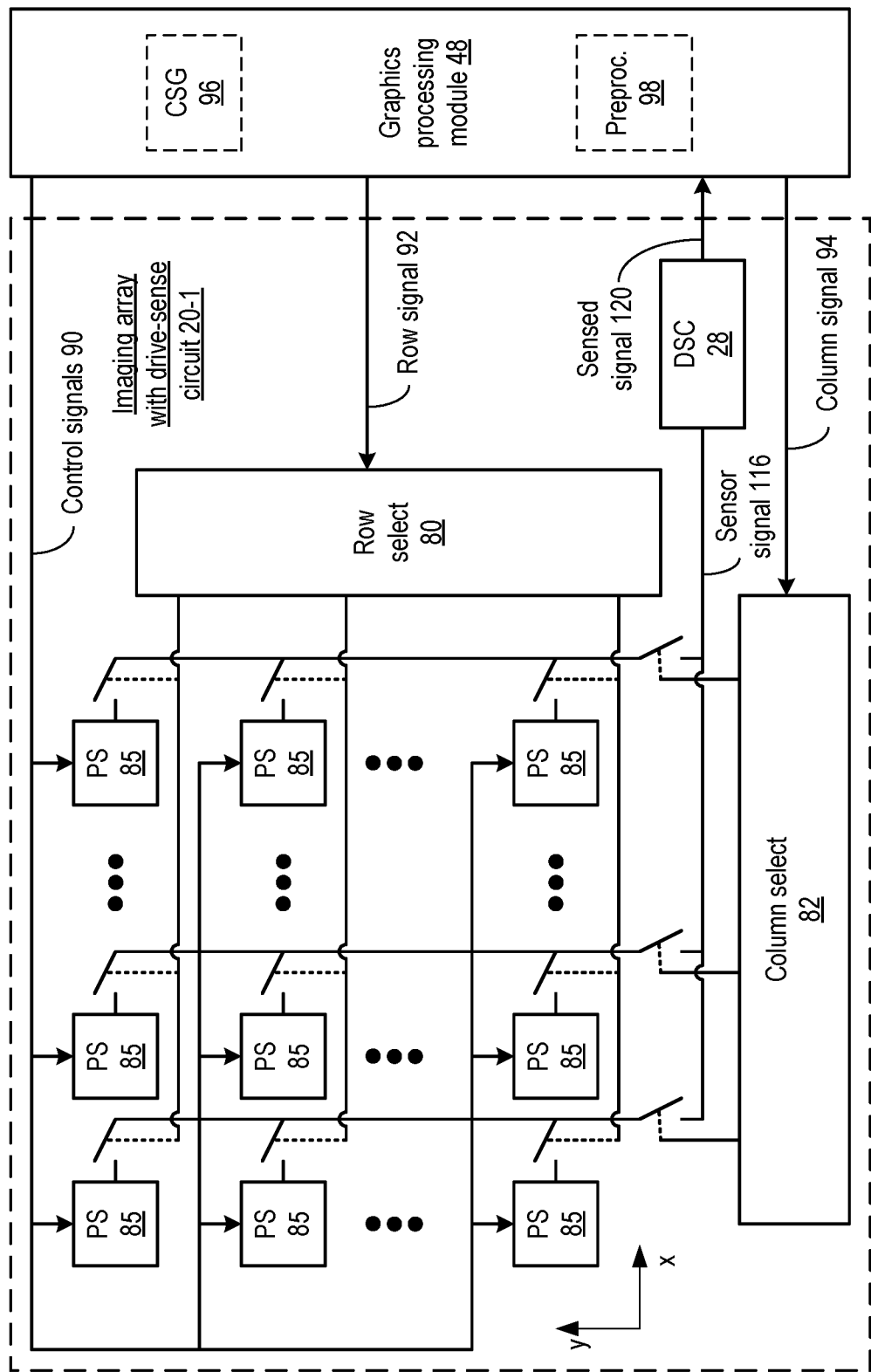
Figure 3:
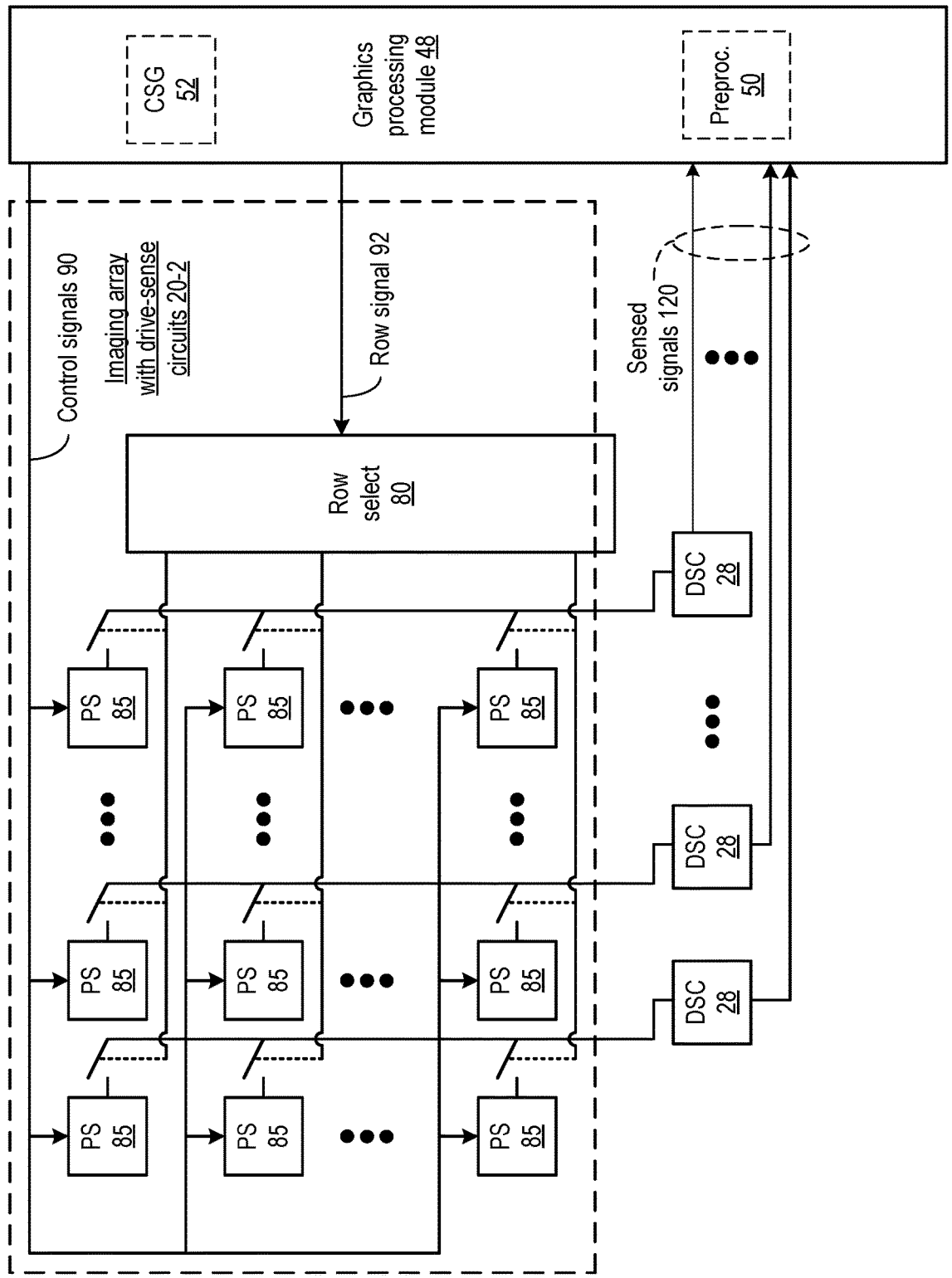
Figure 4:
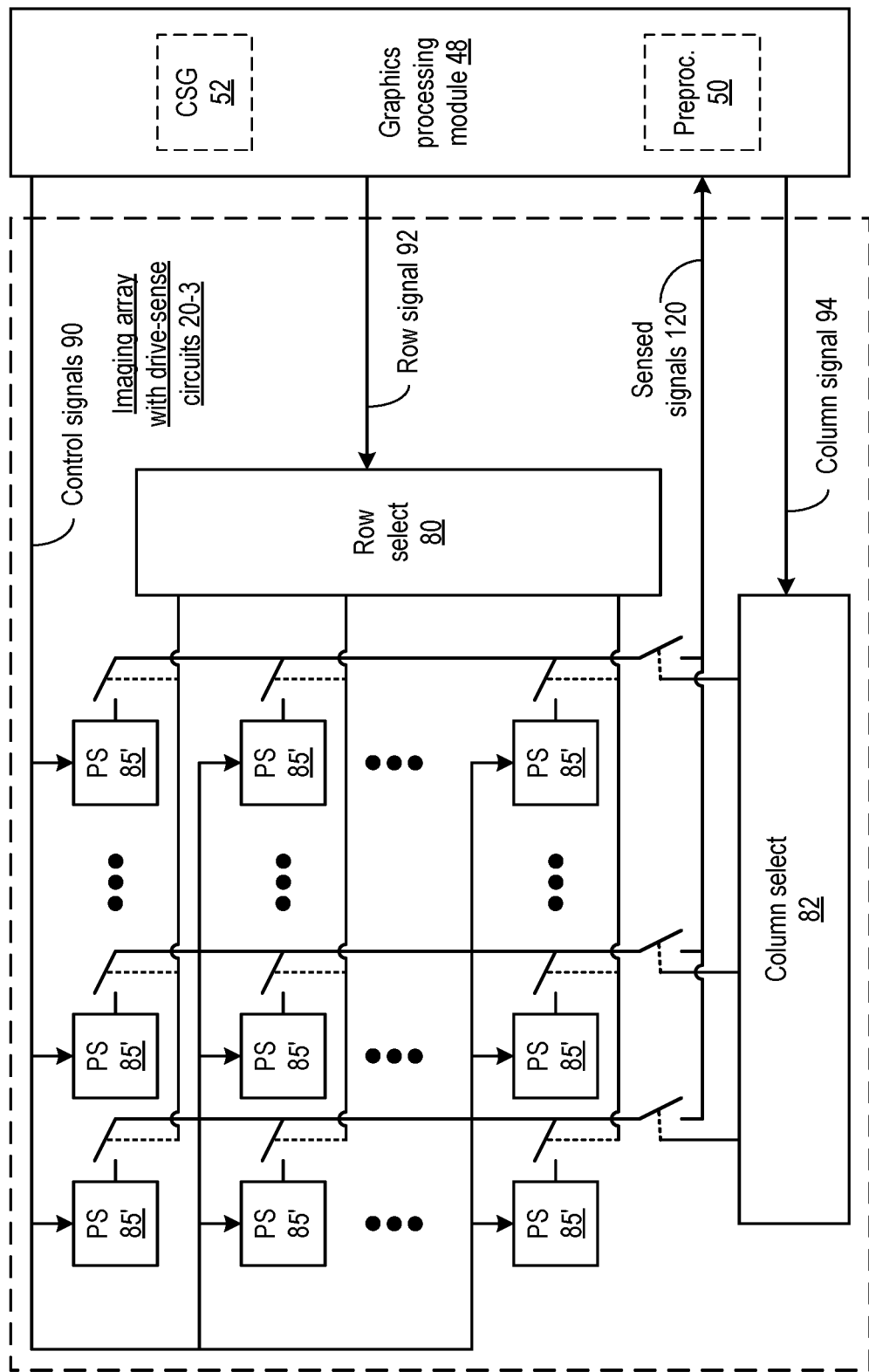
Figure 5:
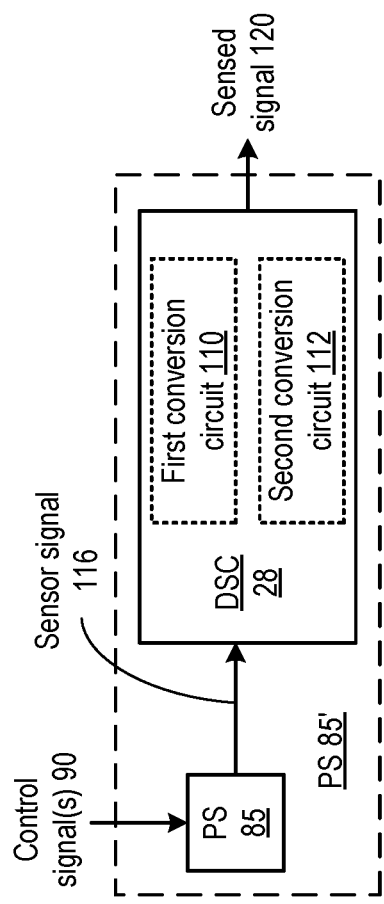
Figure 6:
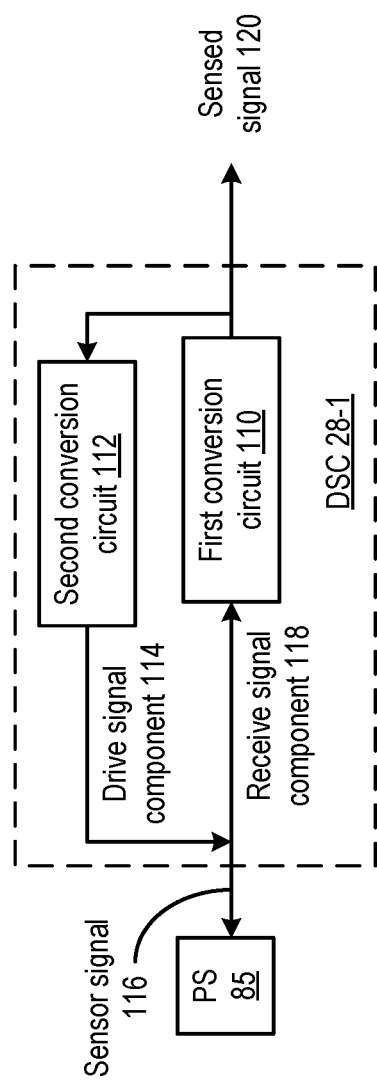
Figure 9:
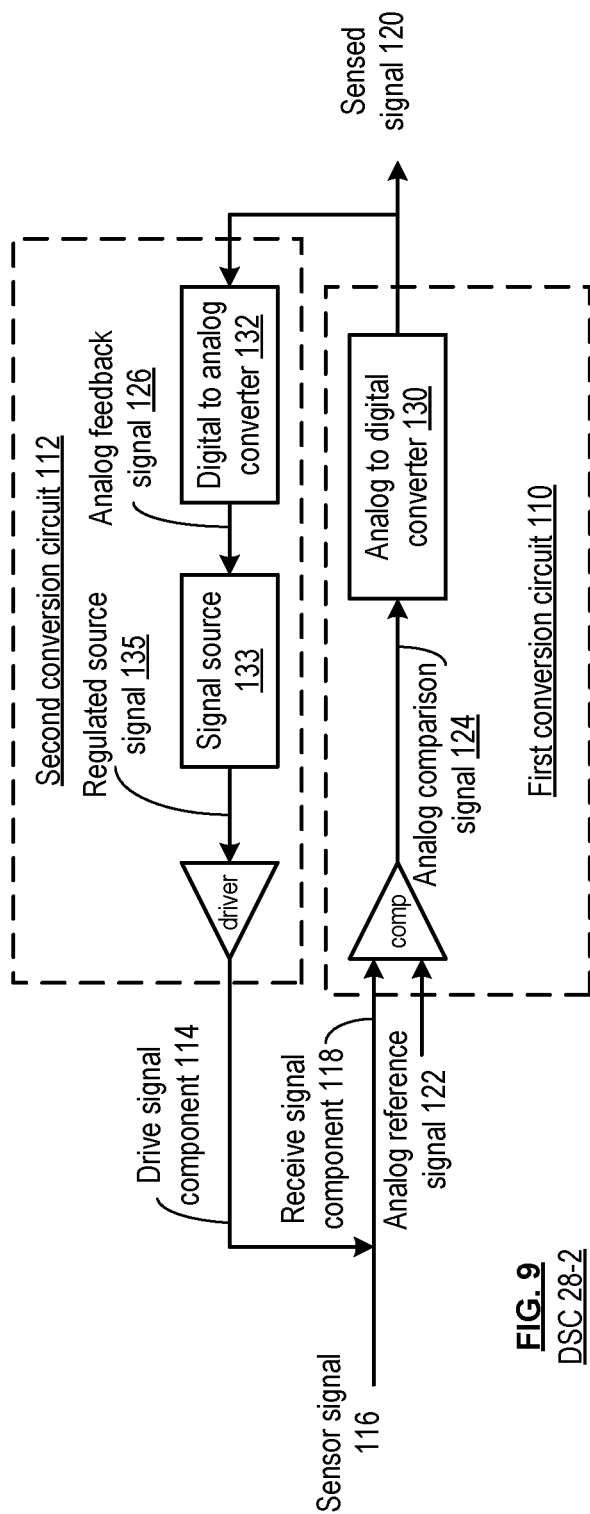
Figure 10:
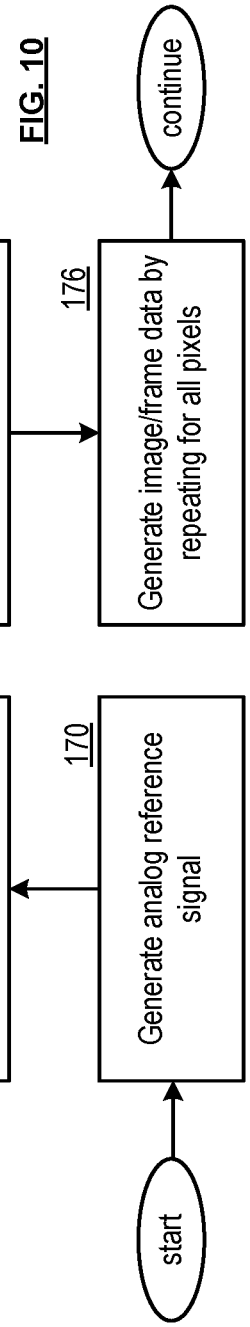
Figure 11:
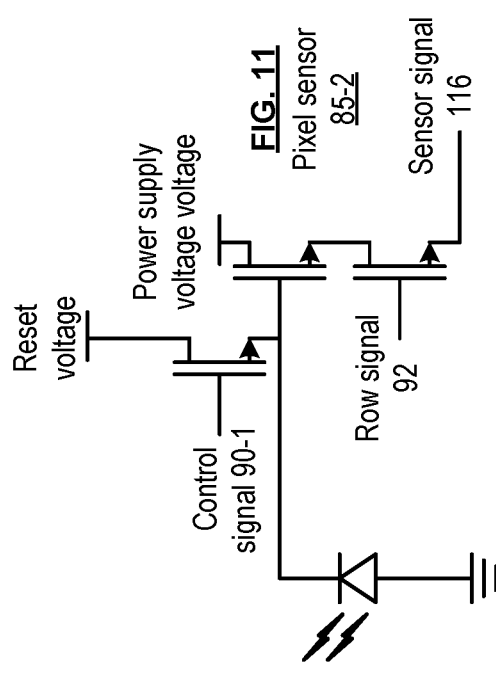
Figure 12:
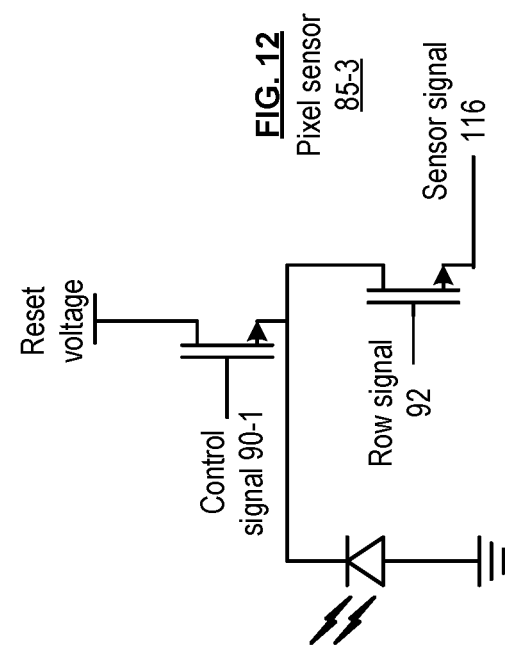
Figure 20A:
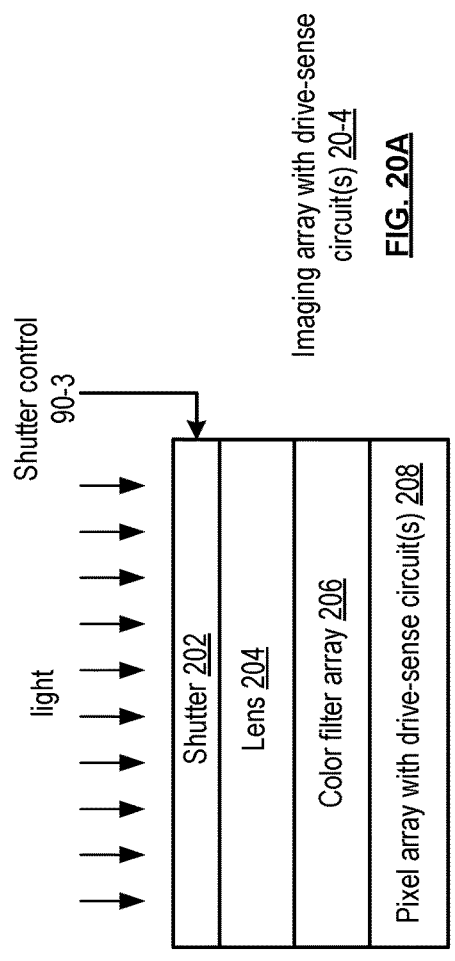
Figure 20B:
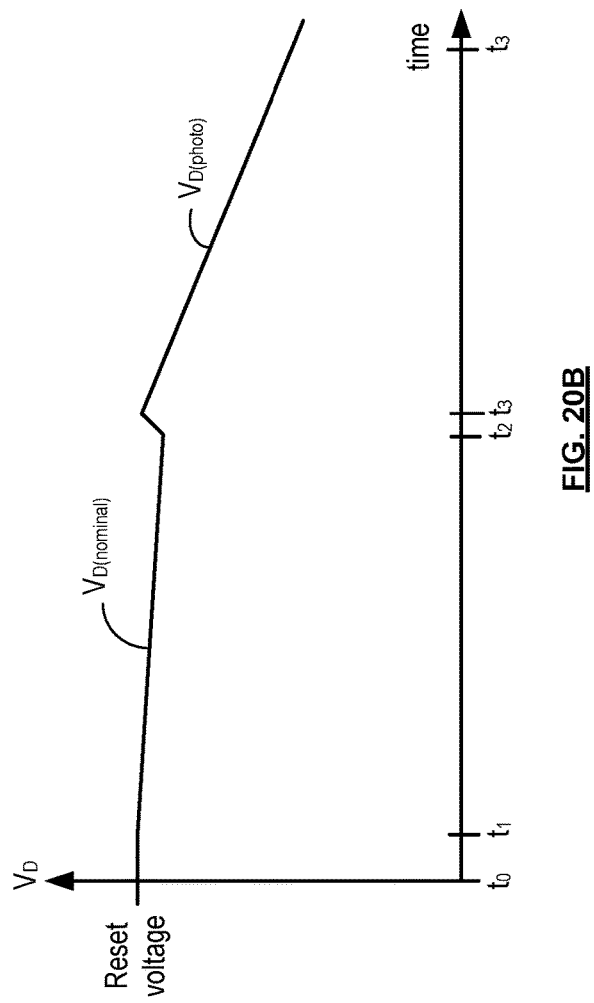
Figure 31:
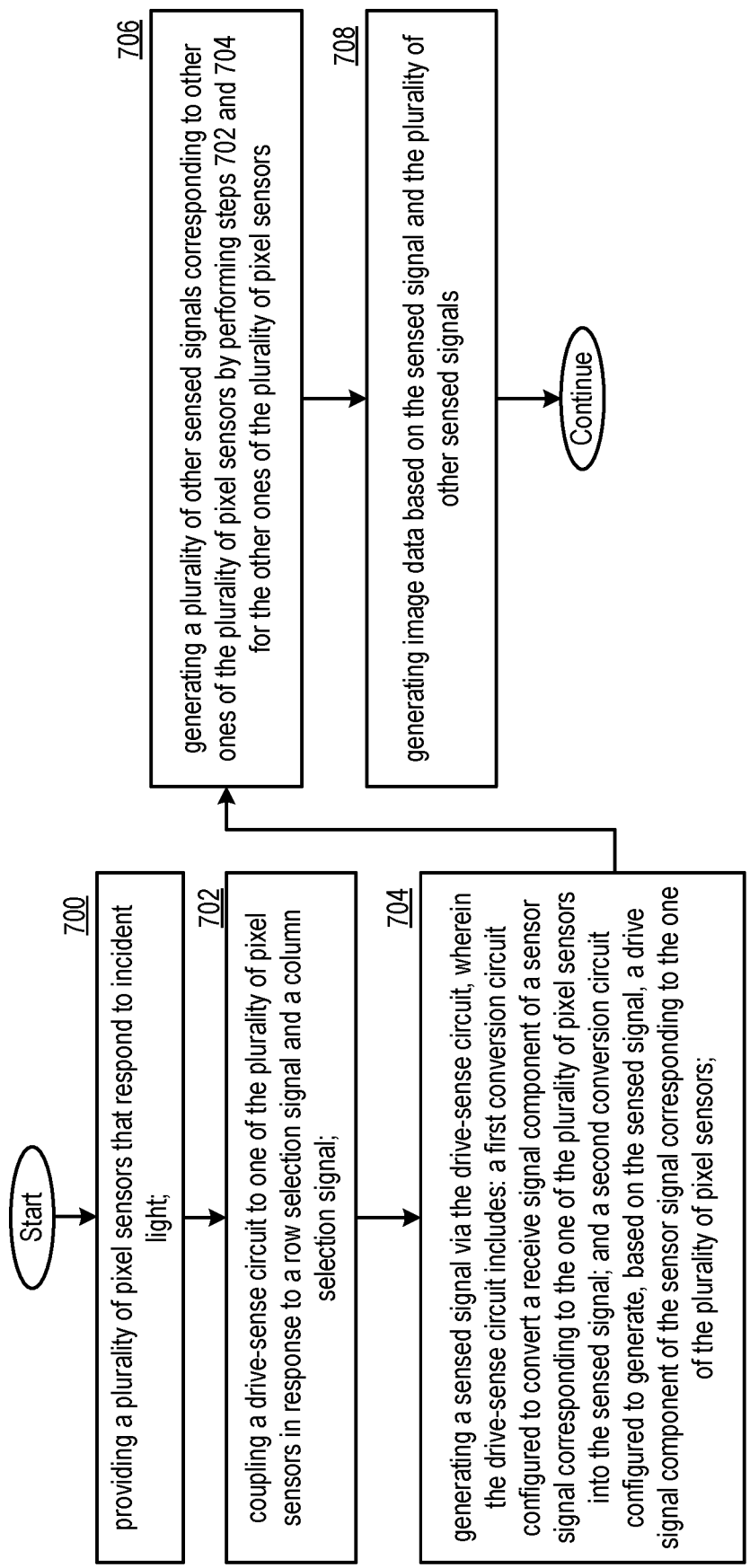
Figure 32:
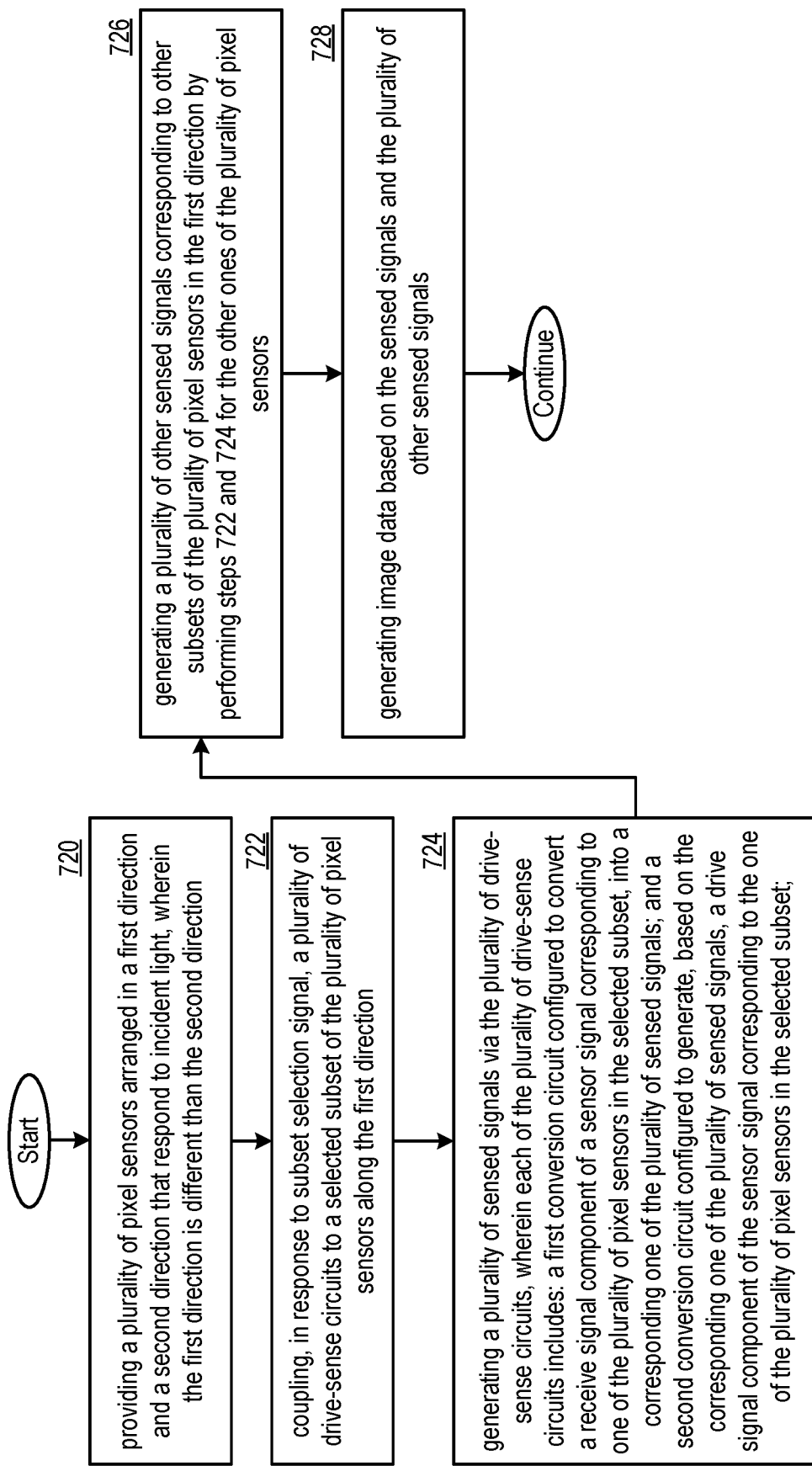
Figure 33:
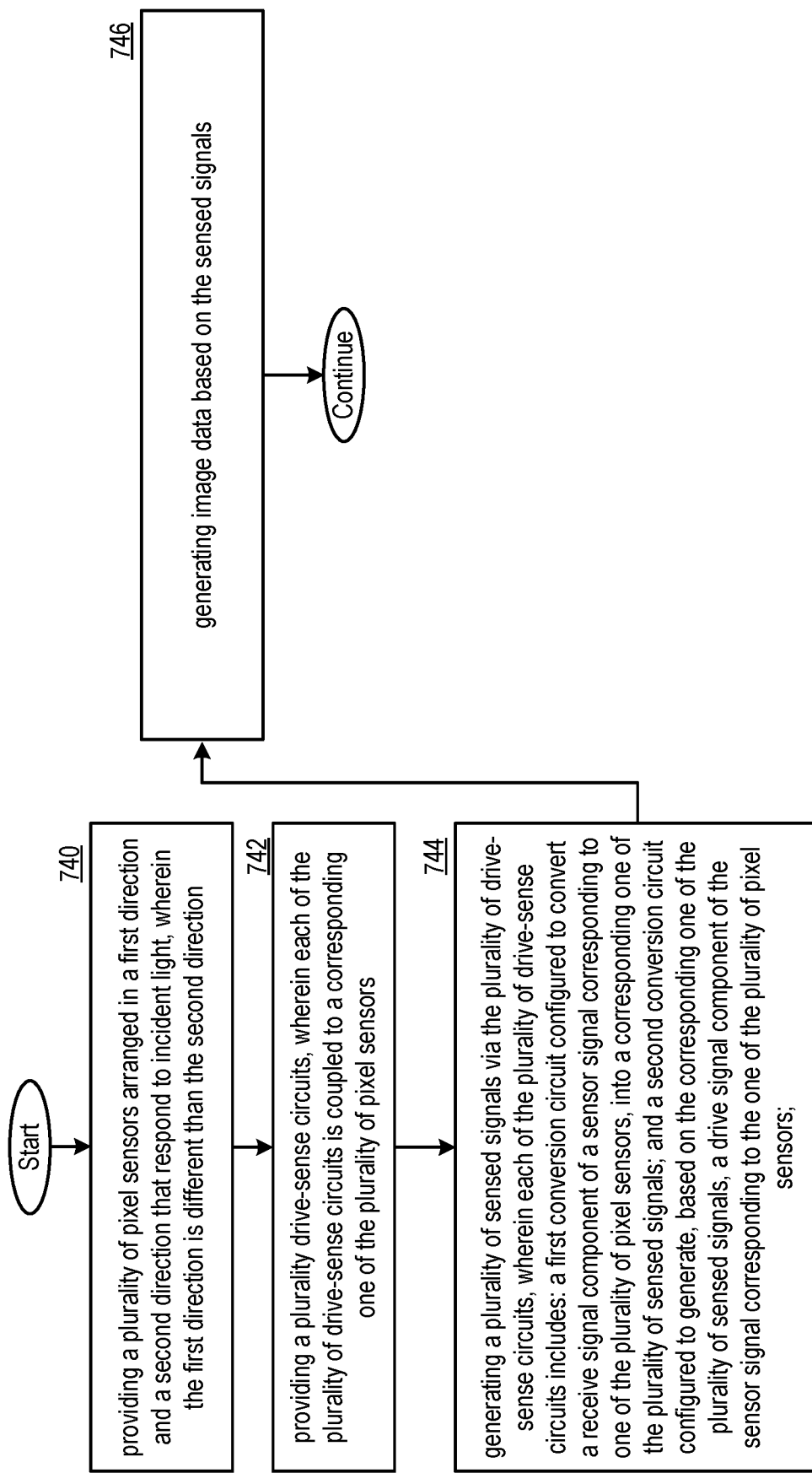
Figure 34:
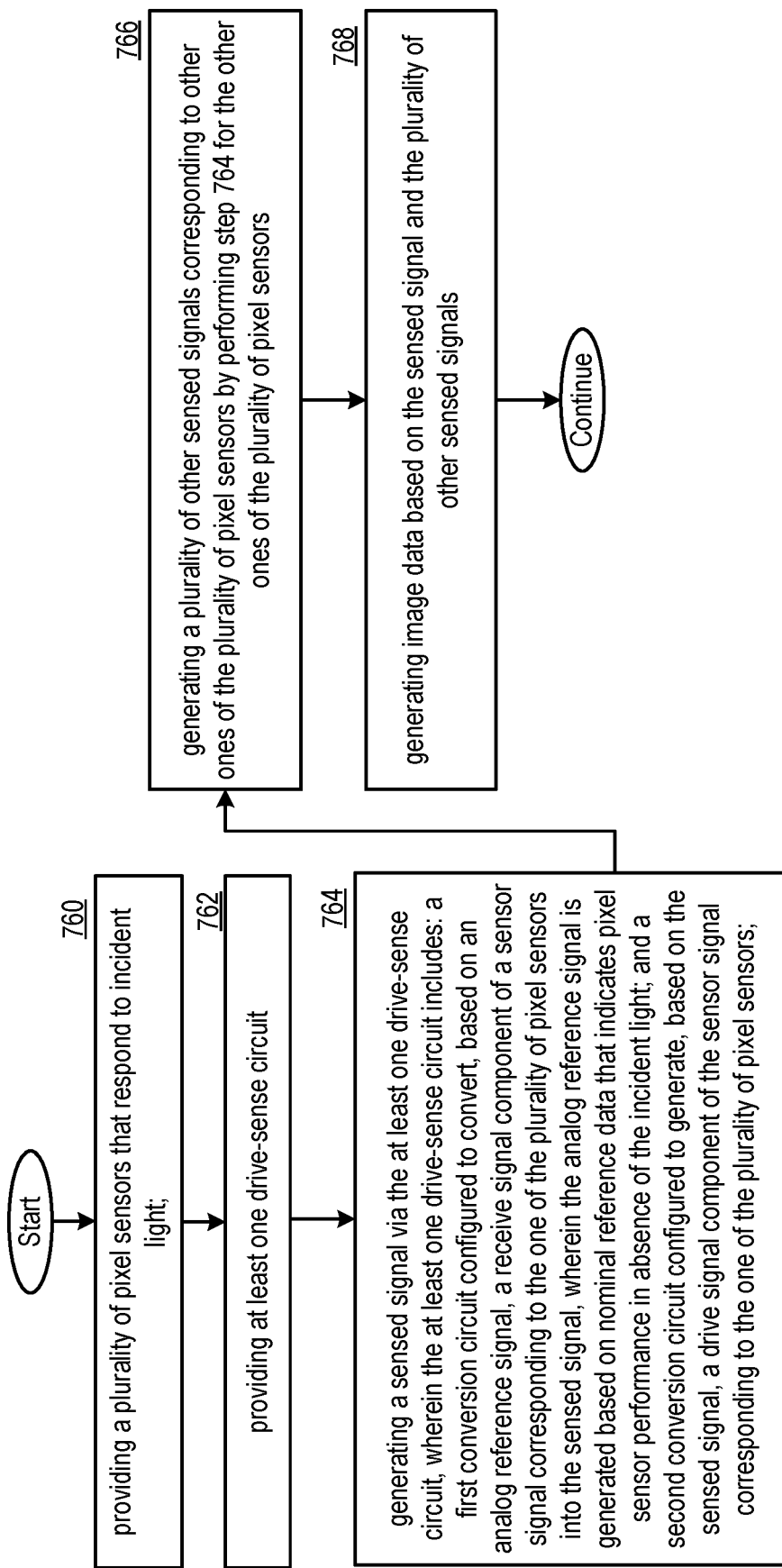
Figure 35:
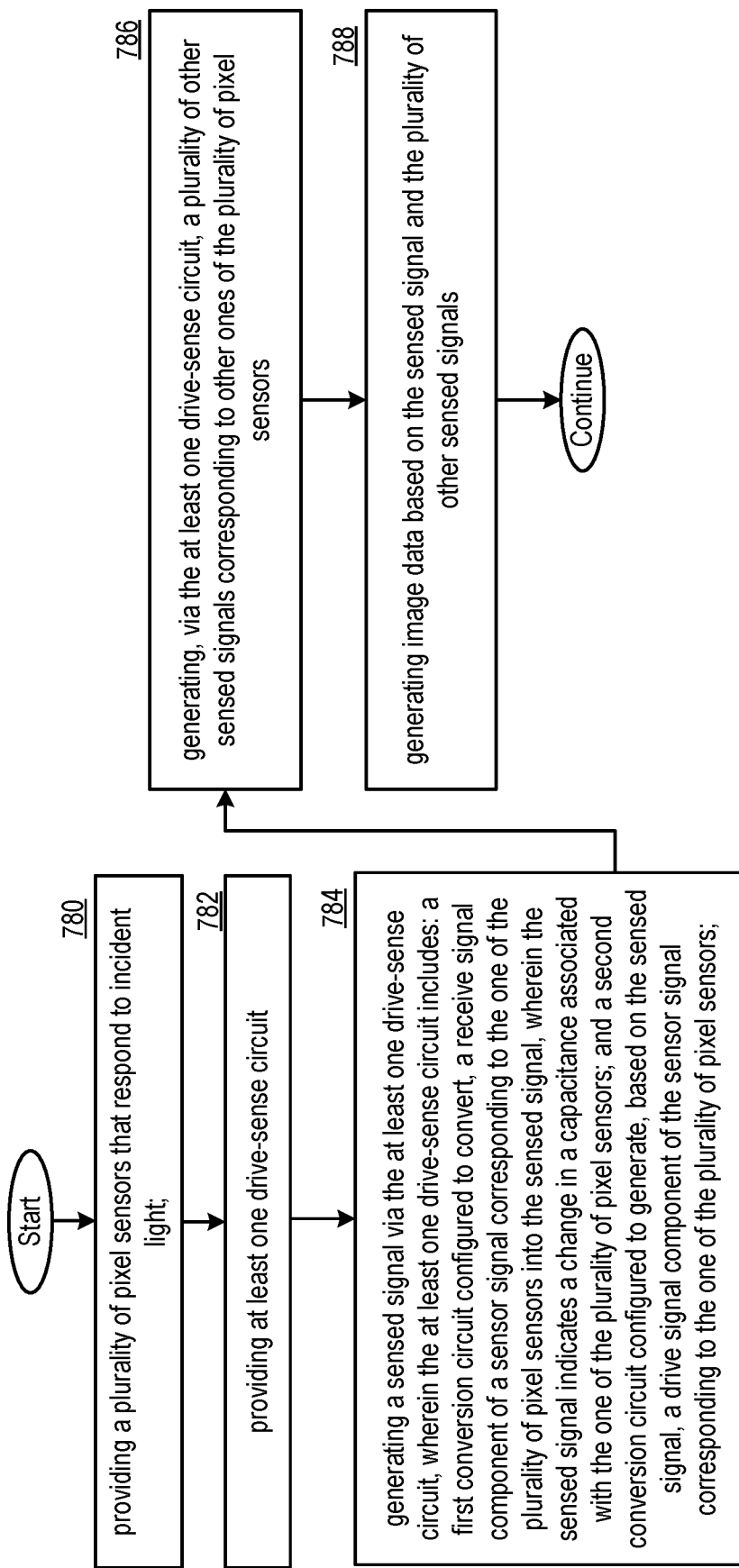
Figure 36:
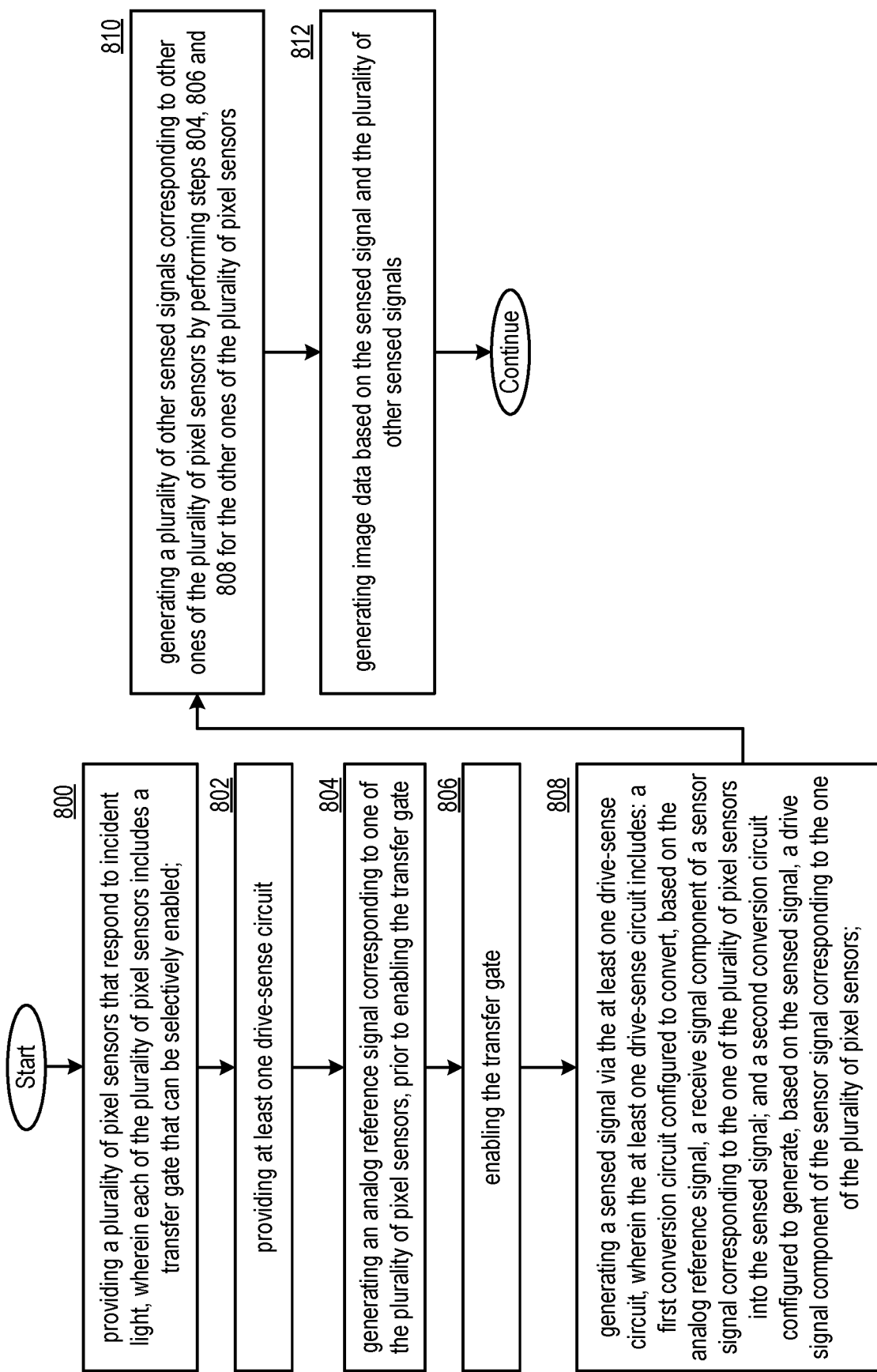
Figure 37:
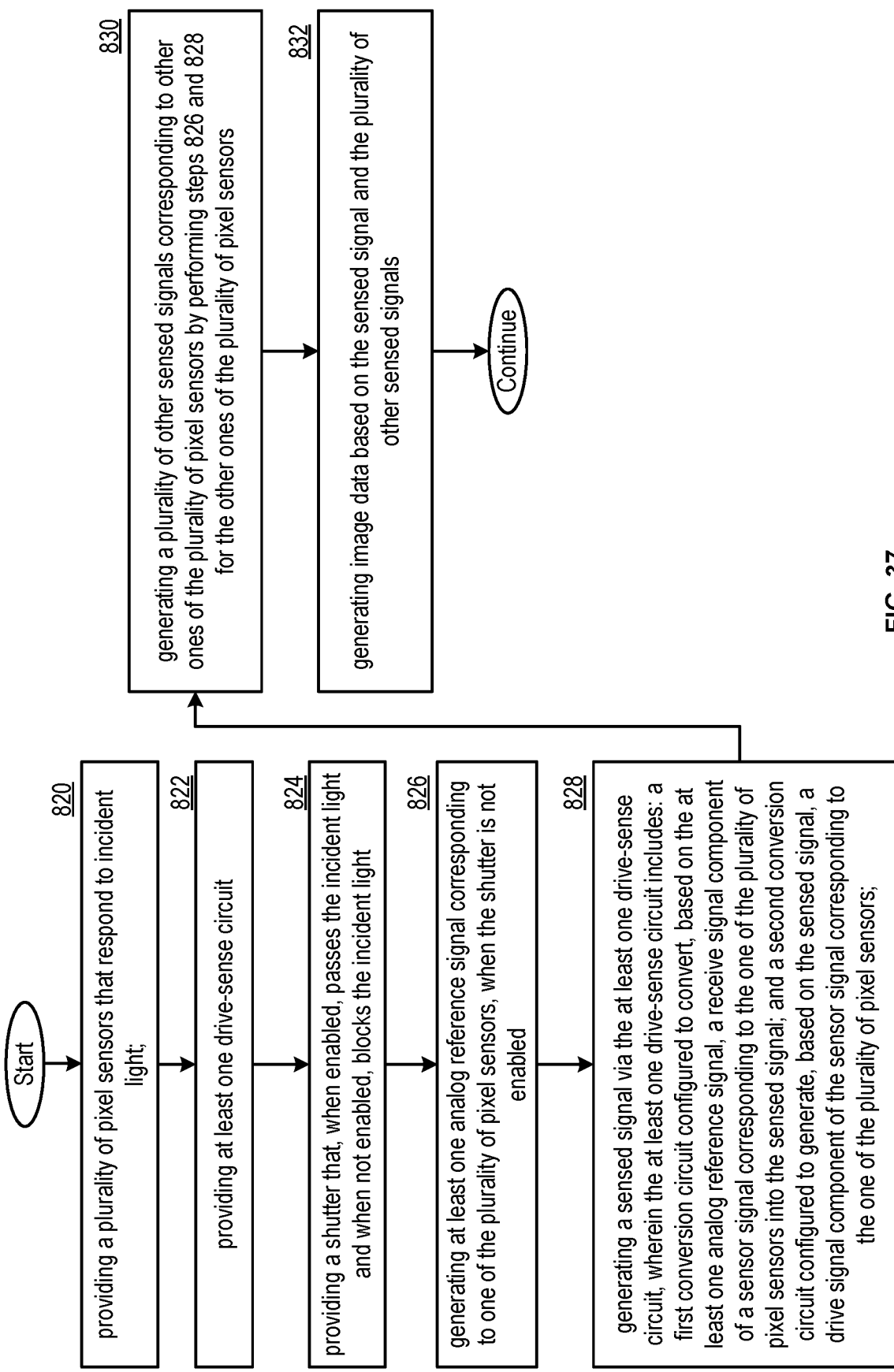
Figure 38:
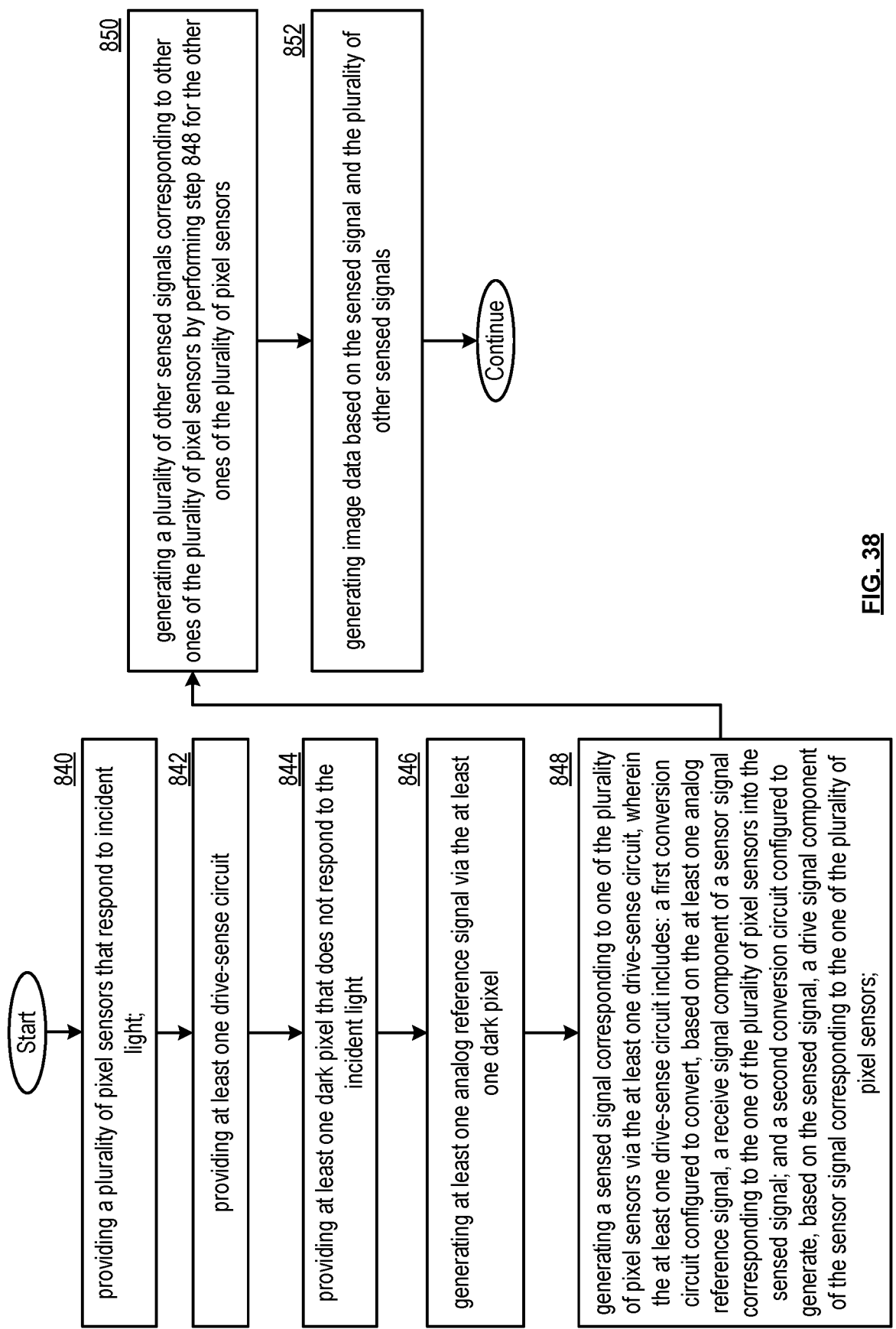
Figure 39:
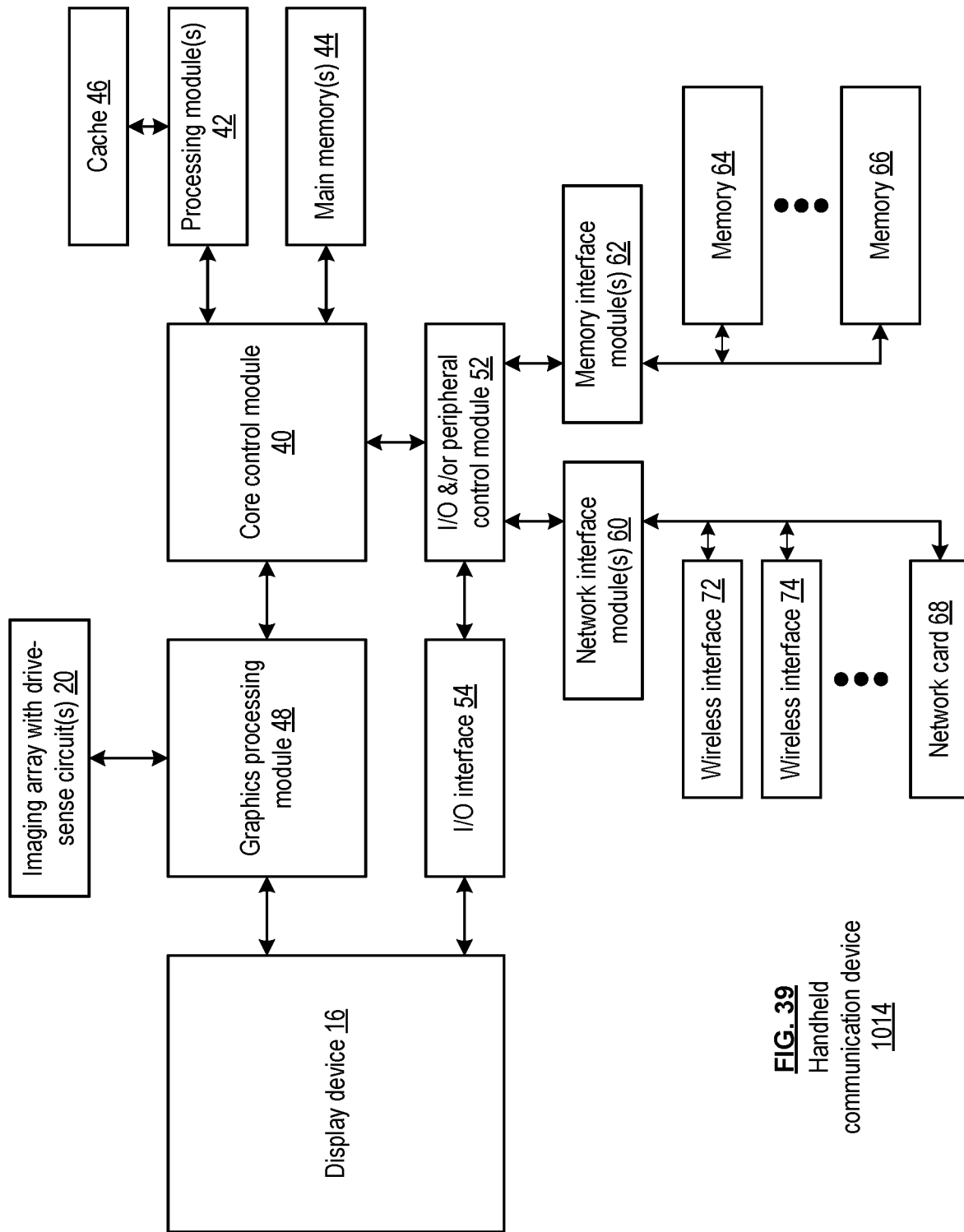
Figure 43:
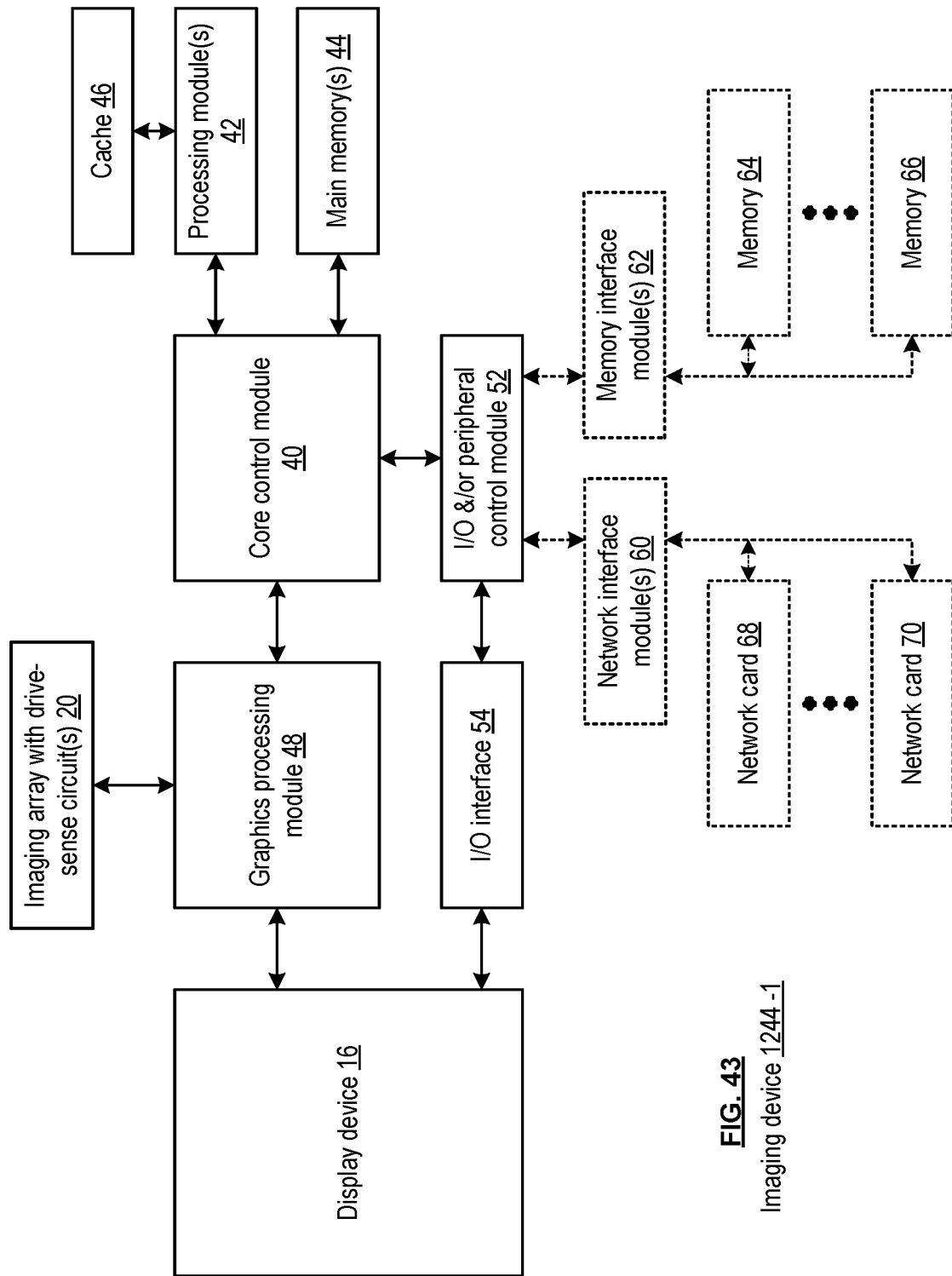
Figure 44:
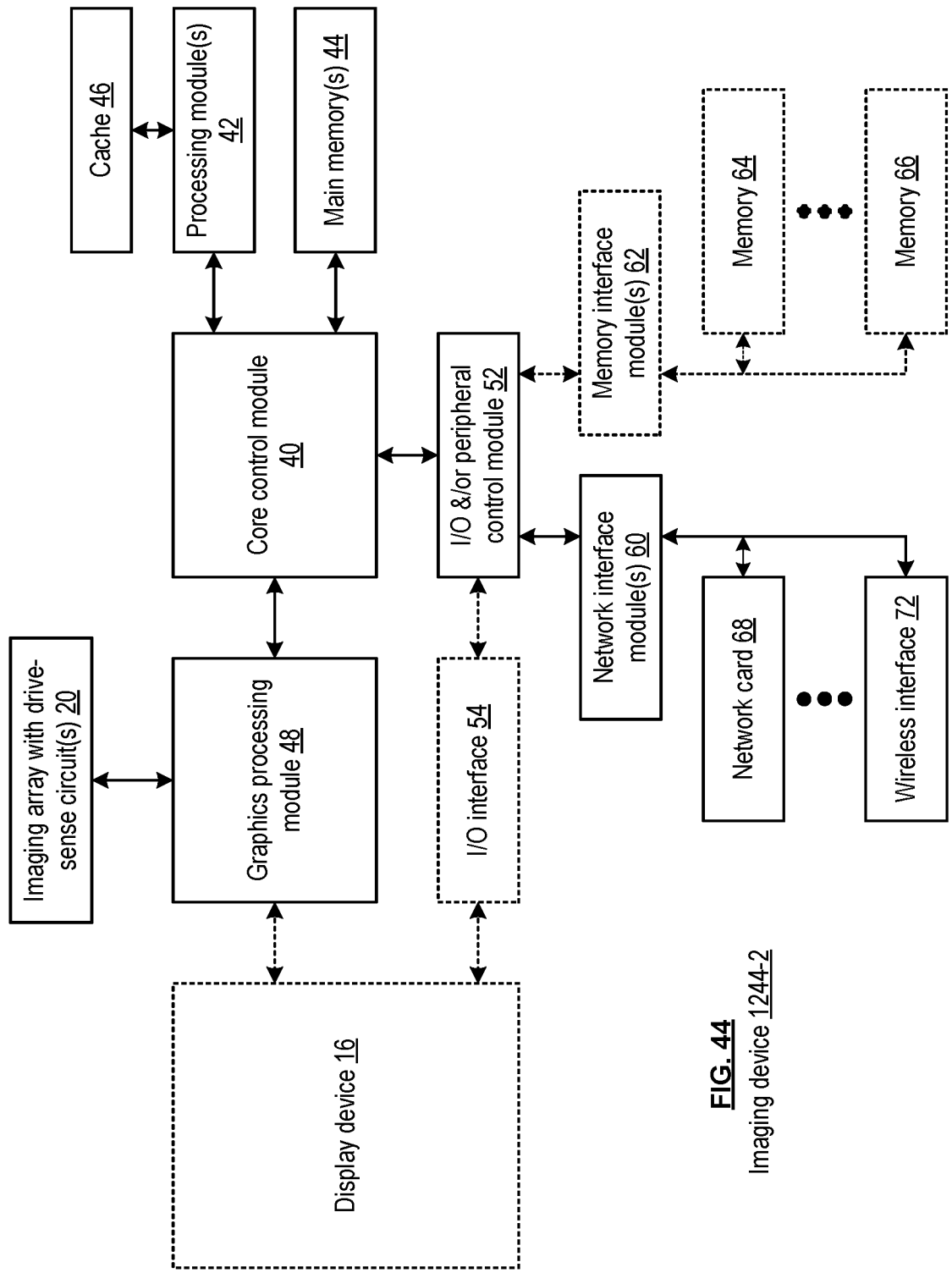
Figure 45:
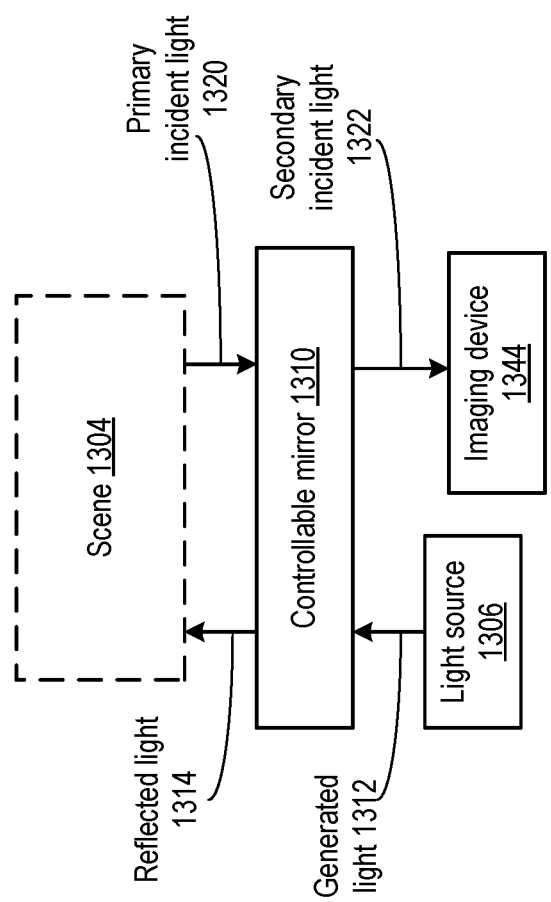
Figure 46:
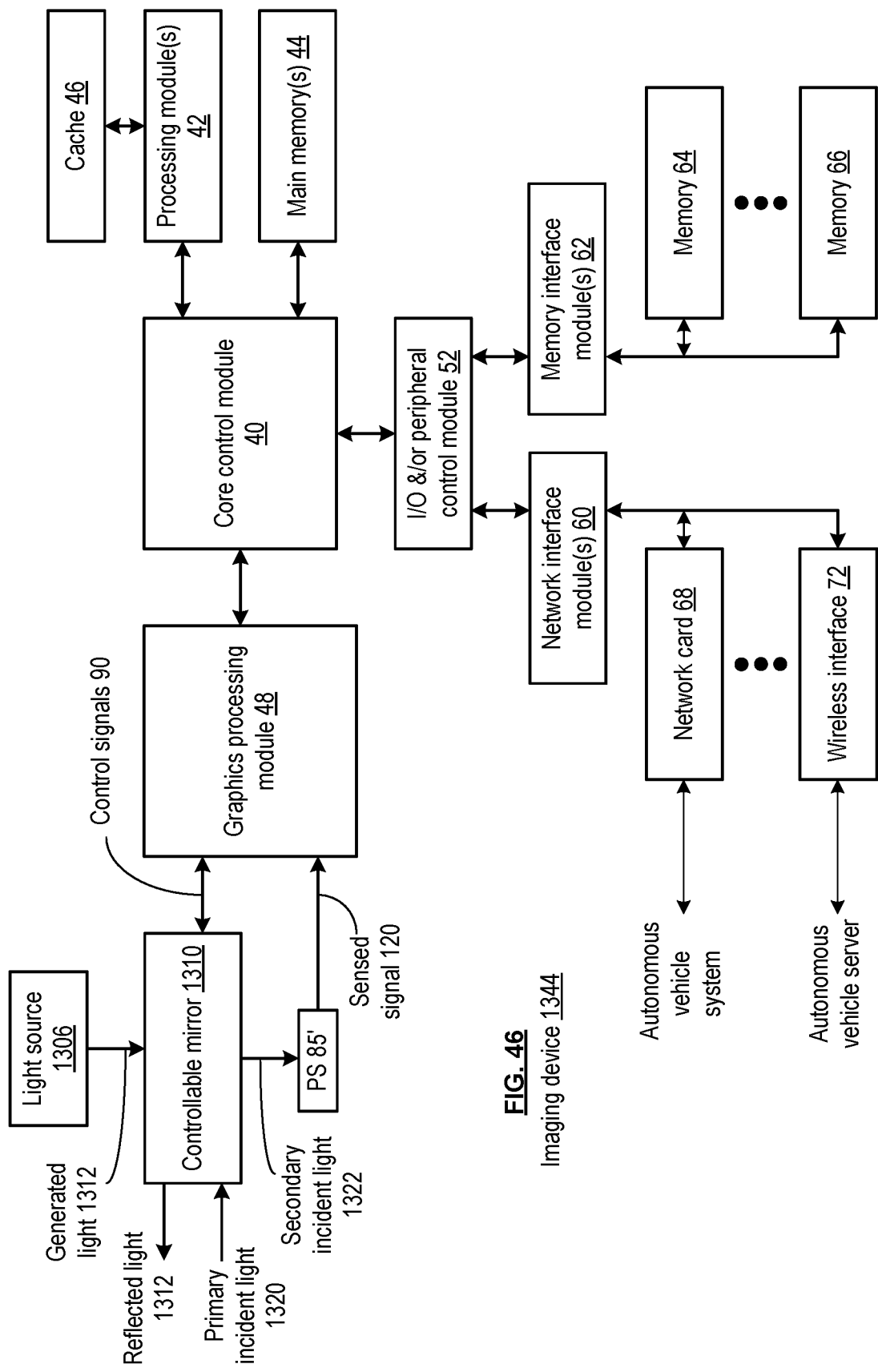
Figure 47:
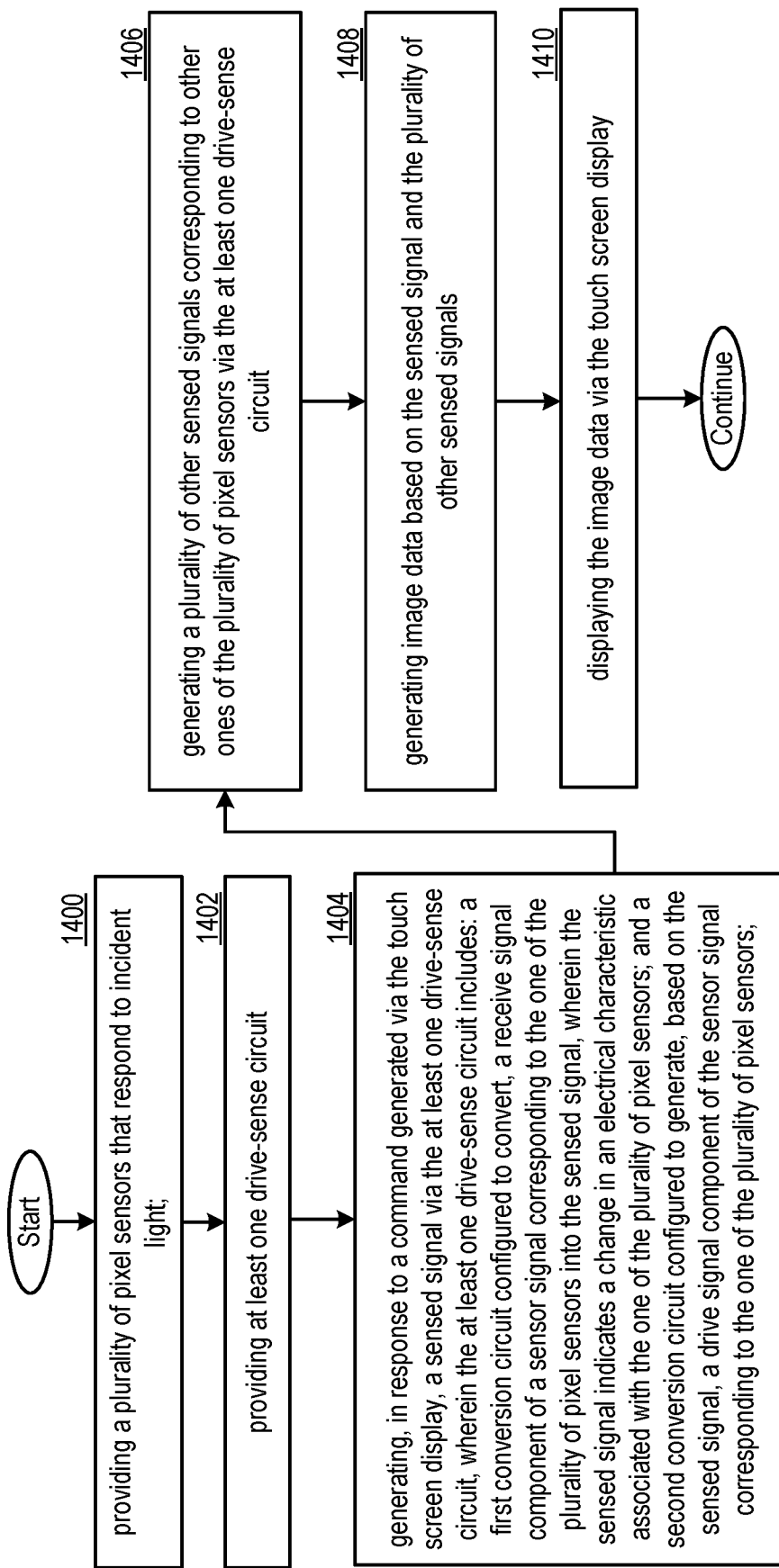
Figure 48:
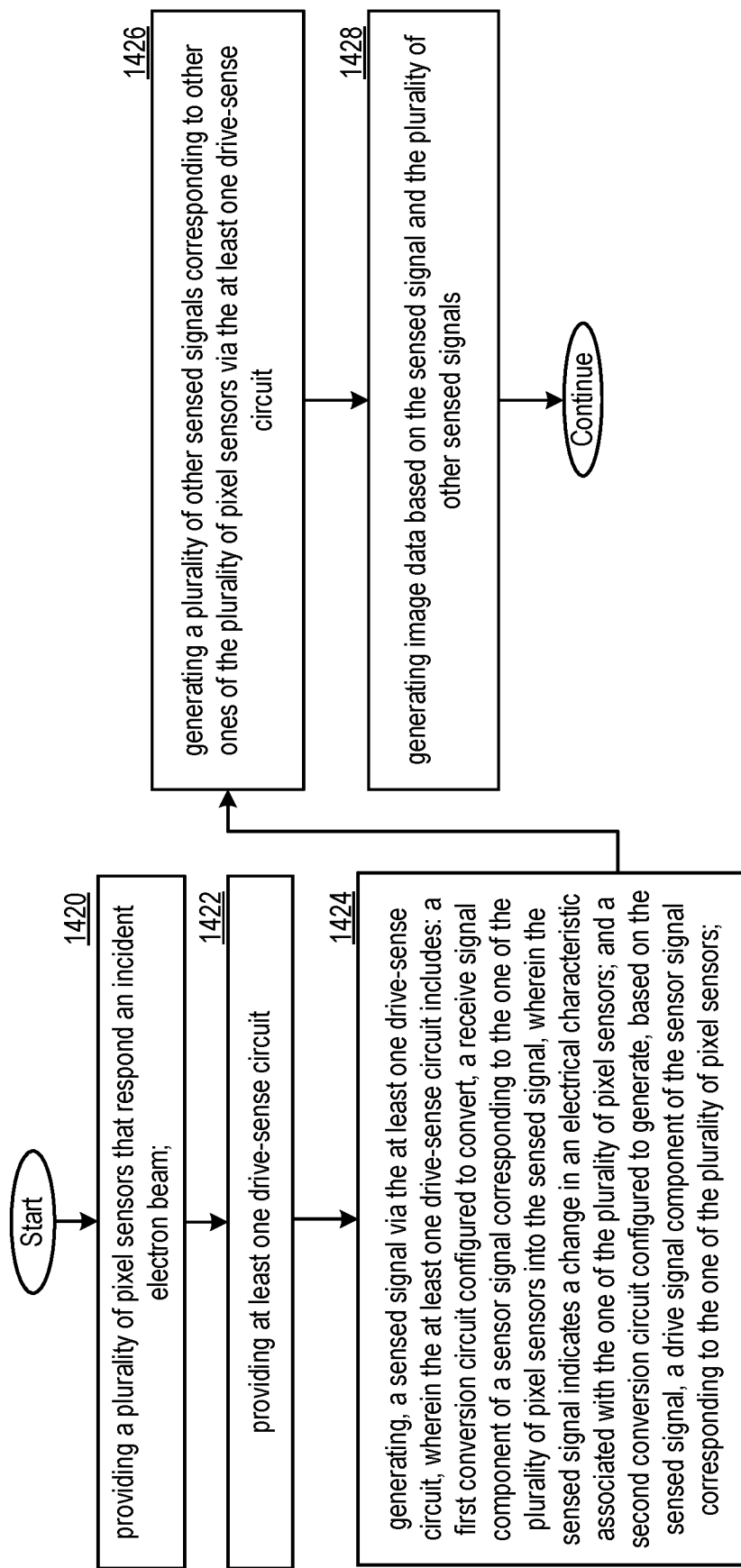
Figure 49:
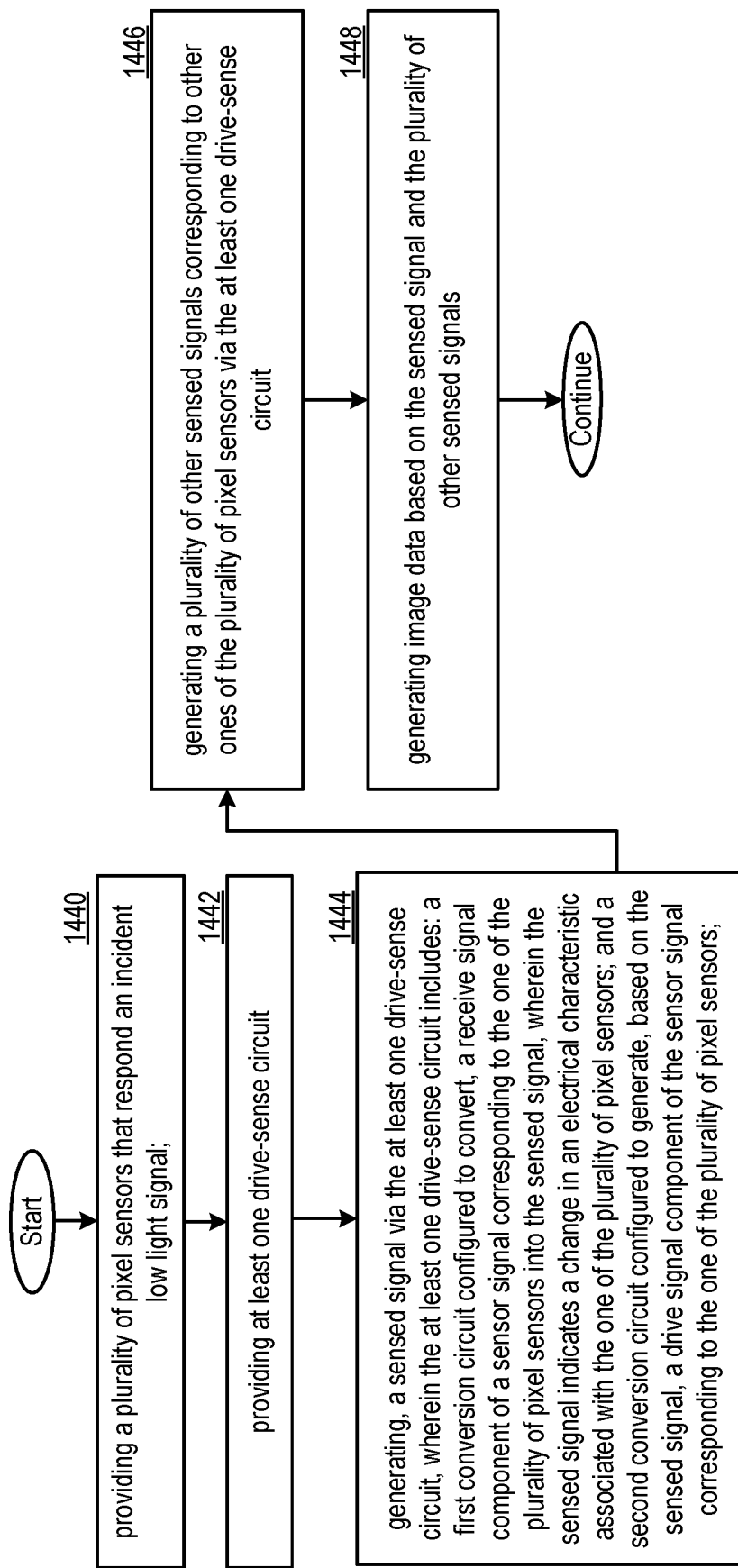
Figure 50:
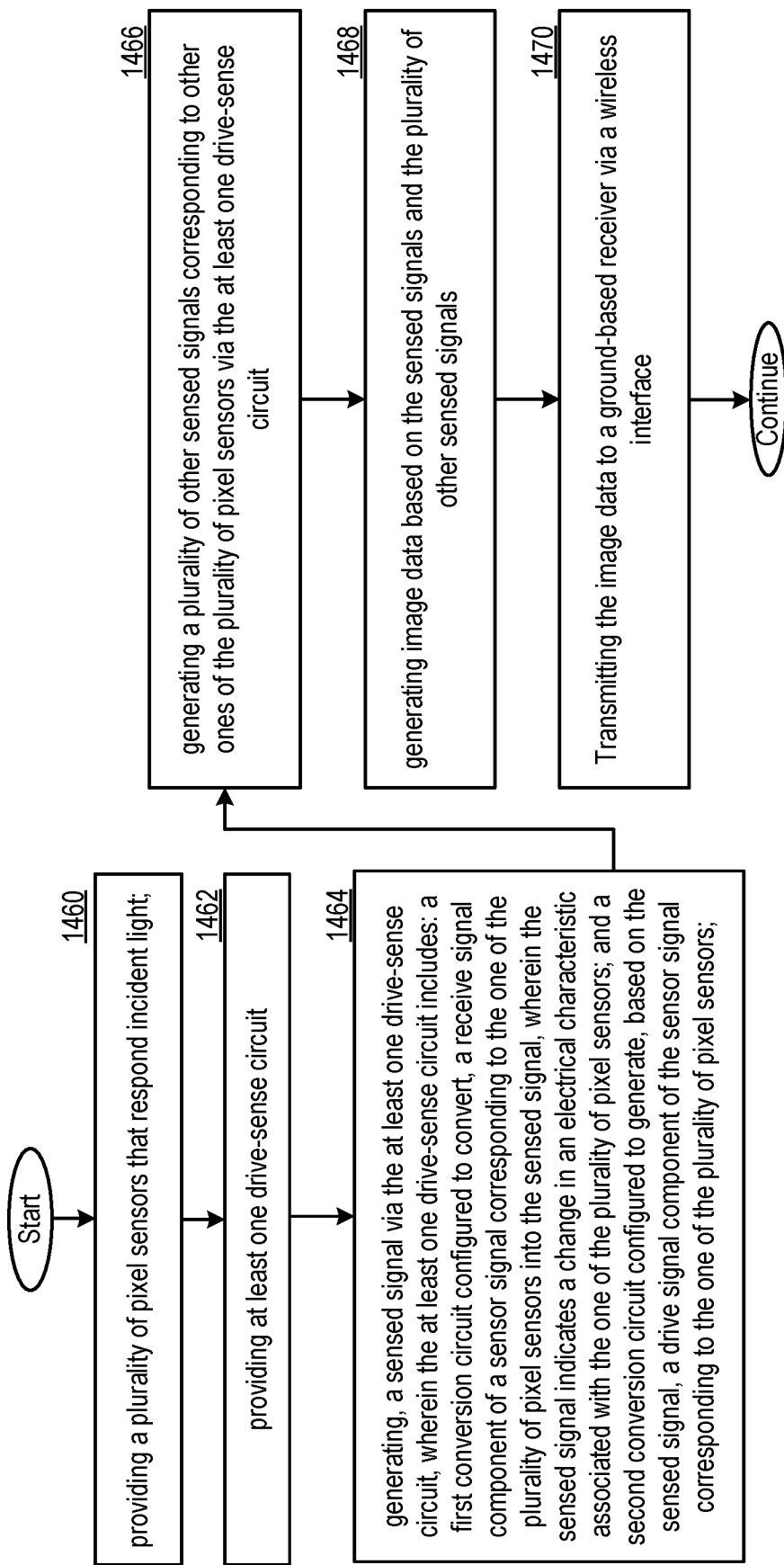
Figure 51:
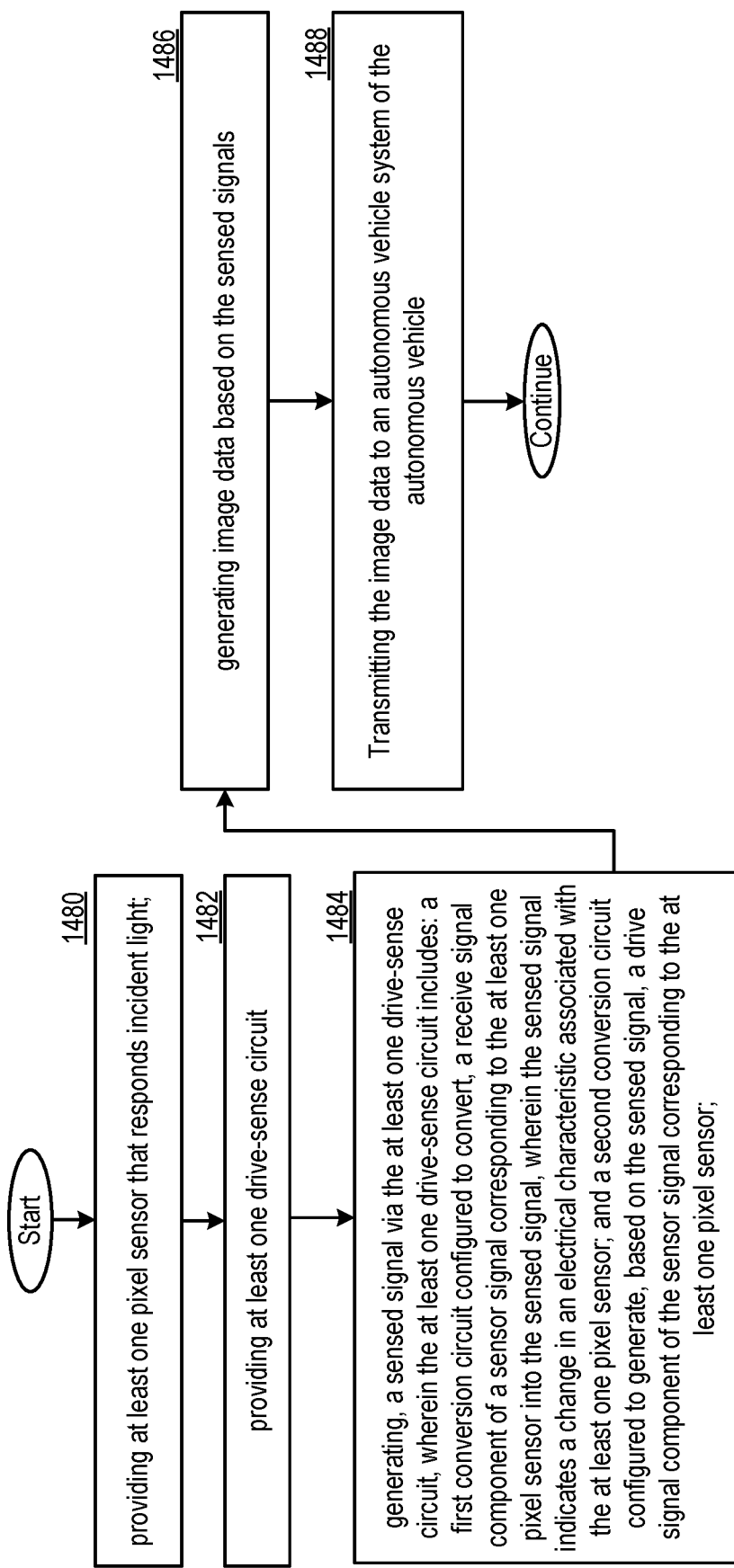

FIG. 1 is a schematic block diagram illustrating an example of an imaging device;
FIG. 2 is a schematic block diagram illustrating an example of an imaging array with drive-sense circuit(s);
FIG. 3 is a schematic block diagram illustrating an example of an imaging array with drive-sense circuit(s);
FIG. 4 is a schematic block diagram illustrating an example of an imaging array with drive-sense circuit(s);
FIG. 5 is a schematic block diagram illustrating an example of a pixel sensor;
FIG. 6 is a schematic block diagram illustrating an example of a drive-sense circuit;
FIG. 7A is a schematic diagram illustrating an example of a pixel sensor;
FIG. 7B is a schematic diagram illustrating an example of a pixel sensor;
FIG. 8 is a graphical diagram illustrating an example of diode voltages;
FIG. 9 is a schematic block diagram illustrating an example of a drive-sense circuit;
FIG. 10 is a flow diagram illustrating an example method;
FIGS. 11 and 12 are schematic diagrams illustrating examples of a pixel sensor;
FIG. 13 is a schematic block diagram illustrating an example of an analog reference generator;
FIG. 14 is a schematic block diagram illustrating an example of a look-up table;
FIG. 15 is a schematic diagram illustrating an example of a pixel sensor;
FIG. 16 is a flow diagram illustrating an example method;
FIGS. 17A and 17B are schematic diagrams illustrating examples of a pixel sensor;
FIG. 18 is a flow diagram illustrating an example method;
FIG. 19 is a schematic block diagram illustrating an example of an analog reference generator;
FIG. 20A is a schematic block diagram illustrating an example of an imaging array with drive-sense circuit(s);
FIG. 20B is a graphical diagram illustrating an example diode voltage;
FIG. 21 is a flow diagram illustrating an example method;
FIG. 22 is a timing diagram illustrating an example shutter control;
FIG. 23 is a schematic block diagram illustrating an example of an analog reference generator;
FIG. 24A is a schematic block diagram illustrating an example of a drive-sense circuit;
FIG. 24B is a schematic block diagram illustrating an example of a drive-sense circuit;
FIG. 25A is a schematic block diagram illustrating an example of an imaging array with drive-sense circuit(s);
FIG. 25B is a schematic block diagram illustrating an example of an analog reference generator;
FIG. 26 is a schematic block diagram illustrating an example of an imaging array with drive-sense circuit(s);
FIG. 27 is a flow diagram illustrating an example method;
FIG. 28 is a schematic block diagram illustrating an example of a pixel array with dark pixels;
FIG. 29 is a schematic block diagram illustrating an example of a pixel array with dark pixels;
FIG. 30 is a schematic block diagram illustrating an example of a pixel array with dark pixels;
FIG. 31 is a flow diagram illustrating an example method;
FIG. 32 is a flow diagram illustrating an example method;
FIG. 33 is a flow diagram illustrating an example method;
FIG. 34 is a flow diagram illustrating an example method;
FIG. 35 is a flow diagram illustrating an example method;
FIG. 36 is a flow diagram illustrating an example method;
FIG. 37 is a flow diagram illustrating an example method;
FIG. 38 is a flow diagram illustrating an example method;
FIG. 39 is a schematic block diagram illustrating an example of a handheld communication device;
FIG. 40 is a schematic block diagram illustrating an example of an electron microscope;
FIG. 41 is a schematic block diagram illustrating an example of a night vision device;
FIG. 42 is a schematic block diagram illustrating an example of a satellite imaging device;
FIG. 43 is a schematic block diagram illustrating an example of an imaging device;
FIG. 44 is a schematic block diagram illustrating an example of an imaging device;
FIG. 45 is a schematic block diagram of a LIDAR device;
FIG. 46 is a schematic block diagram illustrating an example of an imaging device;
FIG. 47 is a flow diagram illustrating an example method;
FIG. 48 is a flow diagram illustrating an example method;
FIG. 49 is a flow diagram illustrating an example method;
FIG. 50 is a flow diagram illustrating an example method; and
FIG. 51 is a flow diagram illustrating an example method.

DETAILED DESCRIPTION

FIG. 1 is a schematic block diagram illustrating an example of an imaging device 14. In particular, the imaging device 14 can be a digital video camera, a digital still image camera or any other electronic device that captures, processes, transmits and/or stores still images or video images based on incident light or other radiation, inside or outside of the optical spectrum.

The imaging device 14 includes a display device 16 such as a touch screen or other display, an imaging array with one or more drive-sense circuit(s) 20, a core control module 40, one or more processing modules 42, one or more main memories 44, cache memory 46, a graphics processing module 48, a display 50, an input-output (I/O) peripheral control module 52, one or more input interface modules 56, one or more output interface modules 58, one or more network interface modules 60, and one or more memory interface modules 62. A processing module 42 is described in greater detail at the end of the detailed description and, in an alternative example, has a direction connection to the main memory 44. In an alternate example, the core control module 40 and the I/O and/or peripheral control module 52 are one module, such as a chipset, a quick path interconnect (QPI), and/or an ultra-path interconnect (UPI). While an architecture is presented having a particular interconnection scheme, a fewer or greater number of interconnections are likewise possible and further one or more buses may likewise be employed.

Each of the main memories 44 includes one or more Random Access Memory (RAM) integrated circuits, or chips. For example, a main memory 44 includes four DDR4 (4th generation of double data rate) RAM chips, each running at a rate of 2,400 MHz. In general, the main memory 44 stores data and operational instructions most relevant for the processing module 42. For example, the core control module 40 coordinates the transfer of data and/or operational instructions from the main memory 44 and the memory 64-66. The data and/or operational instructions retrieved from memory 64-66 are the data and/or operational instructions requested by the processing module or will most likely be needed by the processing module. When the processing module is done with the data and/or operational instructions in main memory, the core control module 40 coordinates sending updated data to the memory 64-66 for storage.

The memory 64-66 includes one or more hard drives, one or more solid state memory chips, and/or one or more other large capacity storage devices that, in comparison to cache memory and main memory devices, is/are relatively inexpensive with respect to cost per amount of data stored. The memories (64, 66, etc.) are coupled to the core control module 40 via the I/O and/or peripheral control module 52 and via one or more memory interface modules 62. In an example, the I/O and/or peripheral control module 52 includes one or more Peripheral Component Interface (PCI) buses or other interfaces to which peripheral components connect to the core control module 40. A memory interface module 62 can include a software driver and a hardware connector for coupling a memory device to the I/O and/or peripheral control module 52. For example, a memory interface 62 can be in accordance with a Serial Advanced Technology Attachment (SATA) port or other memory interface.

The core control module 40 coordinates data communications between the processing module(s) 42 and the network(s) 26 via the I/O and/or peripheral control module 52, the network interface module(s) 60, and a network card 68 or 70. A network cards (68, 70, etc.) can include wireless communication units and/or a wired communication units. Such a wireless communication unit can include a wireless local area network (WLAN) communication device that operates, for example in accordance with a 802.11 protocol or other wireless local area network protocol, a cellular data communication device, a Bluetooth device, a ZigBee communication device and/or other wireless communication interface. Such a wired communication unit can include a Gigabit LAN connection, a Firewire connection, a universal serial bus (USB) interface and/or other wired interface. The network interface module 60 includes a software driver and a hardware connector for coupling the network card(s) to the I/O and/or peripheral control module 52. For example, the network interface module 60 can operate in accordance with one or more versions of IEEE 802.11, cellular telephone protocols, 10/100/1000 Gigabit LAN protocols, an internet protocol, etc.

The core control module 40 coordinates data communications between the processing module(s) 42 and input device(s) 72 via the input interface module(s) 56 and the I/O and/or peripheral control module 52. An input device 72 includes a keypad, a keyboard, control switches, a touchpad, a microphone, etc. An input interface module 56 includes a software driver and a hardware connector for coupling an input device to the I/O and/or peripheral control module 52. In an example, an input interface module 56 is in accordance with one or more Universal Serial Bus (USB) protocols.

The core control module 40 coordinates data communications between the processing module(s) 42 and output device(s) 74 via the output interface module(s) 58 and the I/O and/or peripheral control module 52. An output device 74 can include one or more speakers, headphones, earphones or other output device(s). An output interface module 58 can include a software driver and a hardware connector for coupling an output device to the I/O and/or peripheral control module 52. In an example, an output interface module 56 is in accordance with one or more audio codec protocols.

The imaging array with drive-sense circuit(s) 20 includes an imaging array with a plurality of pixel sensors coupled to one or more plurality of drive-sense circuits (DSC). In general, the pixel sensors (e.g., CMOS pixel sensors or other pixel sensors) detect incident light in the form of photons and/or other radiation in a non-optical spectrum. For example, when light or other radiation from a scene to be captured enters the imaging array with drive-sense circuit(s) 20, one or more electrical characteristics of the pixel sensors change as a result. One or more drive-sense circuits (DSC) coupled to the affected pixel sensors detect these changes and generates sensed signals representative of these changes to the graphics processing module 48, which may be a separate processing module or integrated into one or the processing module(s) 42.

In various examples, the graphics processing module 48 includes at least one control signal generator 96 that operates to generate column and row selection signals for addressing/selecting the individual pixel sensors of the imaging array to be sensed by one or the drive-sense circuit(s) 20 and further that generates one or more other control signals 90 for the imaging array with drive-sense circuit(s) 20 such as timing signals for synchronizing the detection of these changes, resetting the pixel sensors after they are sensed, and/or transfer signals for pixel circuits with transfer gates, etc. In addition, when video signals are produced by the graphics processing module 48, the column and row selection signals (92, 94) and control signals 90 can support the formation of frames of video data. The at least one control signal generator 96 can further operate to generate one or more analog reference signals used in the operation of the drive-sense circuits. Further discussion of this feature including several examples will be discussed in conjunction with the Figures that follow, particularly in conjunction with FIGS. 12-16, 18-19, 21, 23, 24A-B, 27, etc. The control signal generator 96 can include, for example: one or more oscillators, clock signal generators and/or other timing generation circuits; a row driver, column driver and/or other pixel addressing circuits; one or more analog reference signal generators; and/or other processing circuits for generating the various control signal inputs to the imaging array with drive-sense circuit(s) 20 discussed herein.

The graphics processing module 48 further includes at least one preprocessing module 98 such as one or more buffers, a frame grabber and/or other processing circuitry that processes sensed signals from the drive-sense circuits into pixel data such as digital representations of intensity and/or color, that in conjunction with the corresponding addresses of the pixel sensors and/or timing, can be used by the graphics processing module 48 to generate frames of still image data and/or video data to be displayed by the display device 16, output to the core control module 40 for storage in a memory 64 or 66, and/or for transmission via network card 68, 70, etc. While the preprocessing module 98 and control signal generator 52 are shown as being a part of the graphics processing module 48, either device or both devices could instead be implemented as a part of the imaging array with drive-sense circuit(s) 20 or as part of a separate processing module or modules 42.

Furthermore, the processing module 42 can communicate directly with a graphics processing module 48 to display other data on the display 16. The display 16 can includes an LED (light emitting diode) display, an LCD (liquid crystal display), and/or other type of display technology. The display has a resolution, an aspect ratio, and other features that affect the quality of the display. The video graphics processing module 48 can receive data from the processing module 42, processes the data to produce rendered data in accordance with the characteristics of the display, and provides the rendered data to the display 16.

Further functions, features, implementations and applications of the imaging array with drive-sense circuit(s) 20 will be discussed in conjunction with the Figures that follow. These functions, features, implementations and applications of the imaging array with drive-sense circuit(s) 20 can be used in combination or as alternatives. It should be noted that, in various embodiments, the use of one or more drive sense circuits allows the complexity of pixel sensors to be reduced, increasing pixel fill factor and decreasing power consumption, temperature and resulting dark current. Furthermore, the drive sense circuit(s) can promote the cancellation of spatial noise, dark current and other undesirable quantities via the use of an analog reference signal generated based on double sampling, reference pixels, and/or dark pixels, etc.

FIG. 2 is a schematic block diagram illustrating an example of an imaging array with drive-sense circuit(s). In particular, an imaging array with drive-sense circuit 20-1 is shown in conjunction with graphics processing module 48. In the example shown, the imaging array with drive-sense circuit(s) 20-1 includes a plurality of pixel sensors (PS) 85 that are supported via a single drive-sense circuit 28.

In various examples, the pixel sensors 85 are individually addressable by row select 80 and column select 82 in response to row address signal 92 and column address signal 94 generated by the graphics processing module 48. Once an individual pixel sensor 85 is addressed, it is coupled to the drive-sense circuit 28 and a sensed signal 120 is generated that indicates, for example, the intensity of the incident light on the pixel sensor. After all of the individual pixel sensors 85 are addressed, the corresponding set of sensed signals 120 can be used to generate an entire image or frame of data. This process can be repeated to generate additional images and/or successive frames of video at a frame rate that set by the graphics processing module 48. Furthermore, the graphics processing module may be configured to address only a proper subset of the pixel sensors to generate an image or frame with less than the full resolution of the full array and/or to generate only a portion of the full image or frame that is possible.

In various examples, the pixel sensors 85 each include a low-power circuit such as a photo diode and CMOS circuit that operate under the control of one or more control signals 90 generated by the graphics processing module 48. For example, each pixel sensor 85 can be implemented as a passive pixel sensor, an active pixel sensors (APS) such as a 3T-APS pixel sensor, 4T-APS pixel or other active designs with amplification and/or other pixel designs without amplification that are at least partially driven by the drive-sense circuit 28 and merely include CMOS circuits as switches to control the selection, transfer of charge or voltage and/or reset of the photodiode or other light sensitive element after a sensed signal 120 has been generated. Furthermore, the pixel sensors 85 can be implemented via a CCD pixel sensor and/or other pixel sensor designs.

In operation, the pixel sensors 85 detect incident light in the form of photons and/or other radiation in a non-optical spectrum. When light or other radiation from a scene to be captured enters the imaging array with drive-sense circuit(s) 20, one or more electrical characteristics of the pixel sensors 85 change as a result. The drive-sense circuit 28 detects these changes and generates sensed signals 120 representative of these changes for processing by the preprocessing module 98.

The pixel sensors 85 are oriented in an accordance with the X-Y coordinate system as shown, where rows are parallel with the X axis and columns are parallel with the Y axis. It should be noted however, that other orientations are possible with rows and columns reversed. More generally, the "rows" correspond to a first direction or trajectory and "columns" correspond to a second direction or trajectory that differs from the first direction or trajectory. Furthermore, while these two directions are shown as being perpendicular, other non-perpendicular implementations are likewise possible.

In an example of operation, the drive-sense circuit 28 generates the sensed signal 120 corresponding to one of the plurality of pixel sensors 85, via a first conversion circuit configured to convert a receive signal component of a sensor signal 116 corresponding to the one of the plurality of pixel sensors into the sensed signal 120. In particular, the sensed signal 120 indicates a change in an electrical characteristic associated with the one of the plurality of pixel sensors 85. A second conversion circuit of the drive-sense circuit 28 is configured to generate, based on the sensed signal 120, a drive signal component of the sensor signal 116 corresponding to the one of the plurality of pixel sensors. This process can be repeated for other pixel sensors 85 coupling the drive-sense circuit 28, one-by-one, to individual ones of the other pixel sensors 85, to generate a plurality of other sensed signals 120 corresponding to other ones of the plurality of pixel sensors 85. Image data can then be generated by the graphics processing module 48, based on the sensed signal 120 and the plurality of other sensed signals 120.

As previously discussed, the sensed signal 120 is generated that indicates the intensity of the incident light (or other radiation on the pixel sensor. This can be accomplished by generating the sensed signal 120 to indicate a change in one or more electrical characteristics of the pixel sensor 85 that by themselves or collectively indicate the intensity of the incident light. The electrical characteristic(s) can include a voltage, current, charge, capacitance, reactance, impedance, or other electrical characteristic of the pixel sensor 85.

In various examples, the first conversion circuit is configured to convert, based on an analog reference signal, the receive signal component of the sensor signal 116 corresponding to the one of the plurality of pixel sensors into the sensed signal 120. The analog reference signal can be generated based on nominal reference data that indicates a selected electrical characteristic (such as a voltage, current, charge, capacitance, reactance, impedance, or other electrical characteristic) of the one of the plurality of pixel sensors 85 in an absence of the incident light. Furthermore, the nominal reference data used by the first conversion circuit to generate the sensed signal 120 can also be used by the first conversion circuit to generate the plurality of other sensed signals 120 corresponding to the other ones of the plurality of pixel sensors 85. Alternatively, the nominal reference data can be customized to the one of the plurality of pixel sensors 85, and the first conversion circuit can generate the plurality of other sensed signals 120 corresponding to the other ones of the plurality of pixel sensors 85, based on a plurality of other nominal reference data customized to the other ones of the plurality of pixel sensors 85. In this fashion, the sensed signal 120 for each pixel sensor 85 can be generated based on nominal reference data that is selected for that each pixel sensor 85.

FIG. 3 is a schematic block diagram illustrating an example of an imaging array with drive-sense circuit(s). In particular, an imaging array with drive-sense circuits 20-2 is shown in conjunction with graphics processing module 48. Similar elements from FIG. 2 are referred to by common reference numerals. In the example shown, the imaging array with drive-sense circuits 20-2 includes a plurality of pixel sensors 85 that are supported via an entire row of drive-sense circuits 28.

In operation, row select 80 operates to couple an entire rows of pixels sensors 85 to the drive-sense circuits 28 which generate a corresponding plurality of sensed signals 120, one for each of the pixel sensors 85 in the row. After all of the rows of pixel sensors 85 are selected, the corresponding set of sensed signals 120 can be used to generate an entire image or frame of data. This process can be repeated to generate additional images and/or successive frames of video at a frame rate that set by the graphics processing module 48. Furthermore, the graphics processing module 48 may be configured to address only a proper subset of the pixel sensors to generate an image or frame with less than the full resolution of the full array and/or to generate only a portion of the full image or frame that is possible.

In an example of operation, each drive-sense circuit 28 generates the sensed signal 120 corresponding to one of the pixel sensors 85 in a selected row via a first conversion circuit configured to convert a receive signal component of a sensor signal 116 corresponding to the one of the plurality of pixel sensors into the sensed signal 120. In particular, each sensed signal 120 indicates a change in an electrical characteristic associated with the one of the plurality of pixel sensors of the selected row. A second conversion circuit of the drive-sense circuit 28 is configured to generate, based on the sensed signal 120, a drive signal component of the sensor signal 116 corresponding to the one of the plurality of pixel sensors in the selected row. This process can be repeated for other rows pixel sensors 85 by generating, via the drive-sense circuit 28, a plurality of other sensed signals 120 corresponding to other pixel sensors 85 in other rows. Image data can then be generated by the graphics processing module 48, based on the sensed signal 120 and the plurality of other sensed signals 120.

While the description above has focused on scanning a row of drive-sense circuits 28 through various rows of pixel sensors 85, in the alternative, a column of drive-sense circuits 28 could be provided that scans through the various columns of pixel sensors 85.

FIG. 4 is a schematic block diagram illustrating an example of an imaging array with drive-sense circuit(s). In particular, an imaging array with drive-sense circuits 20-3 is shown in conjunction with graphics processing module 48. Similar elements from FIG. 2 are referred to by common reference numerals. In the example shown, the imaging array with drive-sense circuits 20-3 includes a plurality of pixel sensors (PS) 85' that are each include a pixel sensor 85 and a dedicated drive-sense circuit 28 having a first conversion circuit 110 and a second conversion circuit 112 as shown in conjunction with FIG. 5.

In various examples, the pixel sensors 85' are individually addressable by row select 80 and column select 82 in response to row address signal 92 and column address signal 94 generated by the graphics processing module 48. Once an individual pixel sensor 85' is addressed, its corresponding drive-sense circuit 28 generates a corresponding sensed signal 120 that indicates the intensity and/or color of the incident light on the pixel sensor. After all of the individual pixel sensors 85' are addressed, the corresponding set of sensed signals 120 can be used to generate an entire image or frame of data. This process can be repeated to generate additional images and/or successive frames of video at a frame rate that set by the graphics processing module 48. Furthermore, the graphics processing module may be configured to address only a proper subset of the pixel sensors to generate an image or frame with less than the full resolution of the full array and/or to generate only a portion of the full image or frame that is possible.

In an example of operation, each drive-sense circuit 28 generates the sensed signal 120 corresponding to one of the pixel sensors 85, via a first conversion circuit 110 configured to convert a receive signal component of a sensor signal 116 corresponding to the one of the plurality of pixel sensors into the sensed signal 120. In particular, each sensed signal 120 indicates a change in an electrical characteristic associated with the corresponding one of the plurality of pixel sensors 85. The second conversion circuit 112 of the drive-sense circuit 28 is configured to generate, based on the sensed signal 120, a drive signal component of the sensor signal 116 corresponding to the corresponding one of the plurality of pixel sensors 85. Image data can then be generated by the graphics processing module 48, based on the sensed signals 120 for all of the array.

FIG. 6 is a schematic block diagram illustrating an example of a drive-sense circuit. In particular a drive-sense circuit 28 is shown that includes a first conversion circuit 110 and a second conversion circuit 112. As previously discussed, the drive-sense circuit 28 generates the sensed signal 120 corresponding to one of the pixel sensors 85, via a first conversion circuit 110 configured to convert a receive signal component of the sensor signal 116 of the pixel sensor 85 into the sensed signal 120. A second conversion circuit 112 of the drive-sense circuit 28 is configured to generate, based on the sensed signal 120, a drive signal component of the sensor signal 116 corresponding to the corresponding one of the plurality of pixel sensors 85.

The first conversion circuit 110 functions to generate the sensed signal 120 to correspond to changes in a receive signal component 118 of the sensor signal 116. For example, the sensed signal 120 indicates a change in an electrical characteristic associated with the pixel sensor 85. The second conversion circuit 112 functions to generate a drive signal component 114 of the sensor signal based on the sensed signal 120 to substantially compensate for changes in the receive signal component 118 such that, for example, the sensor signal 116 remains substantially constant.

In various examples, the drive signal component 114 of the sensor signal 116 can be a voltage or current. The sensed signal 120 can indicate a change in an electrical characteristic associated with the pixel sensor 85, such as a voltage, current, charge, capacitance, reactance, impedance, or other electrical characteristic of the pixel sensor 85.

FIG. 7A is a schematic diagram illustrating an example of a pixel sensor. In this example, a passive pixel sensor 85-0 is shown that includes a CMOS switch, responsive to row signal 92. The sensor signal 116 is coupled to the drive-sense circuit 28, that generates a sensed signal 120 in response.

In an example of operation, the photodiode is left floating for a certain amount of time, (an integration time), where an electric charge is generated across the photodiode in response to incident light. At the end of the integration time, the control signal 90-1 closes the CMOS switch and the charge is then carried off the pixel sensor as sensor signal 116. The sensor signal 116 has a drive signal component 114 generated by the drive-sense circuit 28. A receive signal component of the sensor signal 116 is used to generate a sensed signal 120.

This particular configuration requires just one transistor which makes the pixel sensor design small and easy to implement. The photodiode can take up more space in relation to the drive-sense circuit 28—particularly in circumstances where only a single drive-sense circuit 28 or single drive-sense circuit 28 is employed. Therefore, the fill factor of pixel sensor 85-0 can be larger than the fill factor of other designs with a higher quantum efficiency compared to, for example, active pixel sensors requiring more space for additional CMOS circuitry. In operation, the drive-sense circuit 28 detects changes in one or more electrical characteristics of the pixel sensor 85-0, caused by changes in the charge transferred via sensor signal 116.

FIG. 7B is a schematic diagram illustrating an example of a pixel sensor. In this example, a more abstract representation designated pixel sensor 85-1 is shown that includes a switch, responsive to control signal 90-1 that can be implemented via a single CMOS transistor.

In an example of operation is shown graphically in FIG. 8. At some initial time to, the reset switch is closed, the photodiode is reverse biased and the diode voltage, $V_D$, is pinned to the reset voltage. At time $t_1$, the reset switch is opened and the diode voltage begins to drop. In particular, the drop in the diode voltage $V_D$ beginning at time $t_1$ can be expressed by the following relationship:

$$d\ V_D/dt = -I/C_{PD}$$

where I represents the photodiode current and $C_{PD}$ represents the capacitance of the photodiode. The photodiode current has two primary components, a dark current $I_D$, generated by internal factors of the photodiode itself and a photo current $I_{PH}$ that is proportional to the incident light on the photodiode. The dark current, for example, can be caused by diffusion, generation recombination currents, tunneling currents, surface leakage current, Frankel-Poole currents, impact ionization current and/or other factors and be dependent upon device temperature. Considering the nominal case (in the absence of incident light), $$I_{(nominal)} = I_D$$

And $$d\ V_{D(nominal)}/dt = -I_{(nominal)}/C_{PD}$$

In this case, the diode voltage $V_D$ falls relatively slowly as shown in FIG. 8. In the presence of light, $$I_{(photo)} = I_D + I_{PH}$$

And $$d\ V_{D(photo1)}/dt = -I_{(photo)}/C_{PD}$$

In this case, the diode voltage $V_d$ falls more rapidly due to the increased current as shown in FIG. 8. Furthermore, the increase in negative slope is proportional to the intensity (amount) of incident light on the surface of the photodiode. This change is slope after $t_1$ and/or the difference in diode voltage $V_D$ between $V_{D(nominal)}$ and $V_{D(photo)}$ are examples of electrical characteristics that can be sensed by drive-sense circuit 28 as sensed signal 120.

FIG. 9 is a schematic block diagram illustrating an example of a drive-sense circuit. The first conversion circuit 110 includes a comparator (comp) and an analog to digital converter (ADC) 130. The second conversion circuit 112 includes a digital to analog converter (DAC) 132, a signal source circuit 133, and a driver.

In an example of operation, the comparator compares the sensor signal 116 to an analog reference signal 122 to produce an analog comparison signal 124. The inclusion of this analog reference signal 122 allows, for example, the drive-sense circuit 28 to compensate for dark current, fixed biases and/or other nominal operating conditions and characteristics that are either common to all of the pixel sensors 85 or customized of each of the individual pixel sensors 85. In particular, analog reference signal 122 can be generated based on nominal analog reference data, such as nominal measurements of sensed signal 120 for a single pixel sensor, a group of pixel sensors, a reference pixel, a group of reference pixels, etc. Such measurements can be generated, for example, based on a sampled value of $V_{D(nominal)}$, values of $V_{D(nominal)}$ over time, a slope of $V_{D(nominal)}$, and/or other electrical characteristics of a pixel sensor 85, such as a charge, current, capacitance, reactance, impedance, etc.

The analog to digital converter 130 converts the analog comparison signal 124 into the sensed signal 120. The analog to digital converter (ADC) 130 may be implemented in a variety of ways. For example, the (ADC) 130 can include: a flash ADC, a successive approximation ADC, a ramp-compare ADC, a Wilkinson ADC, an integrating ADC, a delta encoded ADC, and/or a sigma-delta ADC. The digital to analog converter (DAC) 214 may be a sigma-delta DAC, a pulse width modulator DAC, a binary weighted DAC, a successive approximation DAC, and/or a thermometer-coded DAC.

The digital to analog converter (DAC) 132 converts the sensed signal 120 into an analog feedback signal 126. The signal source circuit 133 (e.g., a dependent current source, a linear regulator, a DC-DC power supply, etc.) generates a regulated source signal 135 (e.g., a regulated current signal or a regulated voltage signal) based on the analog feedback signal 126. The driver increases power of the regulated source signal 135 to produce the drive signal component 114.

FIG. 10 is a flow diagram illustrating an example method. In particular, a method is presented for use with one or more functions/features described in conjunction with FIGS. 1-9. In step 170 an analog reference signal is generated. As previously discussed, an analog reference signal, such as analog reference signal 122 can be generated based on nominal analog reference data, such as nominal measurements of sensed signal 120 for a single pixel sensor, a group of pixel sensors, a reference pixel, a group of reference pixels, etc. Such measurements can be generated, for example, based on a sampled value of $V_{D(nominal)}$, values of $V_{D(nominal)}$ over time, a slope of $V_{D(nominal)}$, and/or other electrical characteristics of one or more pixel sensor 85, such as a charge, current, capacitance, reactance, impedance, etc.

In step 172, the sensed signal is generated, via a drive-sense circuit 120 for example, based on a difference from the analog reference signal that was generated. In step 174, the sensed signal is converted to pixel intensity/color. In step 176, image/frame data is generated by repeating this process for some or all of the pixels in the array.

FIG. 11 is a schematic diagram illustrating an example of a pixel sensor. In particular, a pixel sensor 85-2 is shown that is implemented via a 3T APS circuit having a photodiode and three CMOS transistors. The photodiode lies in the photo-sensitive region of the pixel sensor 85.

In operation, the photodiode collects charge proportional to the number of photons hitting its surface. Each row of pixels is connected to a select transistor that determines which row of pixels has been selected for read out at any one time. Once a row select transistor has been engaged via row signal 92, the pixel is reset by disabling the reset transistor (which acts as a switch) via control signal 90-1 and the charge accumulated by the photodiode during a light detection, or integration, period is buffered by a source follower transistor before being transferred to a column bus connecting each pixel in a single column. This voltage can be held by a sample-and-hold capacitor of the column bus until it is time for that column bus to be read out or the sample-and-hold capacitor can be omitted with the voltage of sensor signal 116 being directly converted to the sensor signal 120 via the drive-sense circuit 28.

Because the 3T pixel is an active pixel sensor (APS), there is an amplifier in each pixel in form of a source follower, which means the total area of the pixel that is photo-sensitive is reduced. This lowers the pixel's fill factor (the percentage of the pixel occupied by the photodiode and any other unused space) compared to a simpler form of passive pixel sensor. An additional problem is that each amplifier will be slightly different, resulting in spatial offsets, such as fixed pattern noise, throughout the sensor. Fixed pattern noise is more pronounced vertically if additional amplifiers are present in the column circuitry.

While the use of appropriate analog reference signals 122 by the drive-sense circuit can help compensate for this noise, given the drive-sense functionality of the drive-sense circuit 28, the source follower transistor is largely redundant and can be omitted, yielding a passive design with only two transistors that operate as reset and row select switches as shown as pixel sensor 85-3 of FIG. 12. This not only increases the pixel's fill factor, it also helps to reduce the fixed pattern noise of the pixel sensor.

FIG. 13 is a schematic block diagram illustrating an example of an analog reference generator. In the example shown, an analog reference generator 164 generates the analog reference signal 122 in response to nominal analog reference data 160. The analog reference signal generator 164 can be included in the drive-sense circuit 28 or provided as a separate device.

The nominal analog reference data 164 can represent nominal measurements of sensed signal 120 and/or other nominal electrical characteristics for a single pixel sensor, a group of pixel sensors, a reference pixel, a group of reference pixels, etc. Such measurements can be generated, for example, based on a sampled value of $V_{D(nominal)}$, values of $V_{D(nominal)}$ over time, a slope of $V_{D(nominal)}$, measured values of sensed signal 120 under nominal conditions (in the absence of light) and/or other electrical characteristics of one or more pixel sensor 85, such as a charge, current, capacitance, reactance, impedance, etc. In various examples, the analog reference generator 164 can include a sigma-delta DAC, a pulse width modulator DAC, a binary weighted DAC, a successive approximation DAC, and/or a thermometer-coded DAC or other circuit that converts digital to analog signals.

Consider the case where a common set of nominal analog reference data 160 is used for all or a group of pixel sensors 85. Nominal measurements taken for a reference pixel can be stored as nominal analog reference data 160 and used as a representation of the nominal conditions of these pixel sensors. Furthermore, nominal measurements taken for a group of reference pixels or all or a group of the pixel sensors 85 can be averaged and stored as nominal analog reference data 160 and used as an average representation of the nominal conditions of these pixel sensors. In the alternative, nominal measurements taken for each pixel sensor 85 can be stored as nominal analog reference data 160 and used as a representation of the nominal conditions of each of these corresponding pixel sensors.

FIG. 14 is a schematic block diagram illustrating an example of a look-up table. In particular, look up-table 168 provides nominal analog reference data 166 that is customized for individual pixel sensors 85. The look up-table 168 can be included in the drive-sense circuit 28 or provided as a separate device.

In operation, nominal measurements taken for each pixel sensor 85 can be stored as nominal analog reference data 160 in the look-up table and indexed, for example by the X-Y coordinates identifying pixel row/column or other identifying information of each pixel. When a pixel sensor selection signal indicates the identifying information of the pixel sensor in conjunction, for example, with an upcoming sensing of that pixel sensor by a drive-sense circuit 28, the nominal analog reference data 160 for that particular pixel sensor 85 can be retrieved for use by the analog reference generator 164 in generating an analog reference signal 122 that is customized to that particular pixel.

FIG. 15 is a schematic diagram illustrating an example of a pixel sensor. In particular, a pixel sensor 85-4 similar to pixel sensor 85-3 is shown. While a row selection transistor has been omitted, it can be included, particularly in circumstances where the pixel sensor is implemented as part of imaging array with drive-sense circuit 20-1 or imaging array with drive-sense circuits 20-2 presented in conjunction with FIGS. 2 and 3.

In this case the sensed signal 116 is based on $V_D$ and consider again the relationship between $V_D$ and I where $$d\,V_D/dt = -I_D/C_{PD}$$

In the presence of light, the current I changes this differential equation from $$d\,V_D/dt = -(I_D + I_{PH})/C_{PD}$$

While, as previously discussed, the detection of changes in the voltage $V_D$ by a drive-sense circuit 28 can be used to indicate an amount of incident light on a pixel sensor, this also indicates that the detection of changes in current I by a drive-sense circuit can also be used for this purpose.

Furthermore, this change in current in the presence of incident light can also be characterized as a change in capacitance from $C_{PD}$ to a new effective capacitance, $C_{eff}$ of the pixel sensor 85-4 based on nominal dark current $I_D$ or $$d\,V_D/dt = -I_D/C_{eff}$$

In this case, $$-I_D/C_{eff} = -(I_D + I_{PH})/C_{PD}$$

Solving for this new effective capacitance, $C_{eff}$ yields $$C_{eff} = C_{PD}(I_D/(I_D + I_{PH}))$$

Because $I_D$ and $I_{PH}$ are both positive quantities, this means that the presence of incident light lowers the effective capacitance of the pixel sensor 85 from $C_{PD}$ to $C_{eff}$. This effect can be seen clearly when referring back to FIG. 8 since the voltage drops more quickly when light is present. Therefore the effect of incident light on the pixel sensor 85 can be measured by the drive-sense circuit 28 a change in the effective capacitance from $C_{PD}$ to $C_{eff}$ as measured from the sensor signal 116 by the drive-sense circuit 28 when generating the sensed signal 120. Furthermore, detecting changes in reactance and/or impedance caused by the change in capacitance can likewise be effective.

In addition, when the sensed signal 120, for example, indicates the effective capacitance $C_{eff}$, this quantity can then be preprocessed to generate the intensity of the incident light because this intensity is proportional to $I_{PH}$. In particular, the nominal values of $C_{PD}$ and $I_D$ can be determined either on a common or customized basis from nominal analog reference data and/or $V_{D(nominal)}$, values of $V_{D(nominal)}$ over time, a slope of $V_{D(nominal)}$, etc. In this case, $$I_{PH} = I_D(C_{PD} - C_{eff})/C_{eff}$$

Therefore, sensing changes in capacitance (and likewise, corresponding changes in reactance and/or impedance) can be used to indicate an amount/intensity of incident light. When pixel sensors 85 are implemented with different color filters to generate color images, the color information corresponding to each pixel sensor can be used to generate an amount/intensity of incident light of that corresponding color.

In an example of operation, the drive-sense circuit 28 generates a sensed signal 120 via a first conversion circuit configured to convert, a receive signal component of a sensor signal 116 of the pixel sensors 85 into the sensed signal 120, wherein the sensed signal 120 indicates a change in a capacitance associated with the pixel sensors 85. A second conversion circuit is configured to generate, based on the sensed signal 120, a drive signal component of the sensor signal 116 of the pixel sensors.

In a further example of operation, the drive-sense circuit 28 generates a sensed signal 120 via a first conversion circuit configured to convert, a receive signal component of a sensor signal 116 of the pixel sensors 85 into the sensed signal 120, wherein the sensed signal 120 indicates a change in a reactance associated with the pixel sensors 85. A second conversion circuit is configured to generate, based on the sensed signal 120, a drive signal component of the sensor signal 116 of the pixel sensors.

In another example of operation, the drive-sense circuit 28 generates a sensed signal 120 via a first conversion circuit configured to convert, a receive signal component of a sensor signal 116 of the pixel sensors 85 into the sensed signal 120, wherein the sensed signal 120 indicates a change in an impedance associated with the pixel sensors 85. A second conversion circuit is configured to generate, based on the sensed signal 120, a drive signal component of the sensor signal 116 of the pixel sensors.

In an additional example of operation, the drive-sense circuit 28 generates a sensed signal 120 via a first conversion circuit configured to convert, a receive signal component of a sensor signal 116 of the pixel sensors 85 into the sensed signal 120, wherein the sensed signal 120 indicates a change in a current associated with the pixel sensors 85. A second conversion circuit is configured to generate, based on the sensed signal 120, a drive signal component of the sensor signal 116 of the pixel sensors.

FIG. 16 is a flow diagram illustrating an example method. In particular, a method is presented for use with one or more functions/features described in conjunction with FIGS. 1-15.

In step 150 an analog reference signal is generated. For example, an analog reference signal, such as analog reference signal 122 can be generated based on nominal analog reference data that indicates a nominal capacitance $C_{PD}$. In step 152, the sensed signal is generated, via a drive-sense circuit 120 for example, based on a change in effective capacitance of a pixel sensor. In step 154, the sensed signal is converted to pixel intensity/color. In step 156, image/frame data is generated by repeating this process for some or all of the pixels in the array.

FIG. 17A is a schematic diagram illustrating an example of a pixel sensor. In particular, a pixel sensor 85-5 is shown that is implemented via a 4T APS circuit having a photodiode and four CMOS transistors—including a CMOS switch operating as a transfer gate in response to control signal 90-2.

In this example, a pinned photodiode is used with an extra thin p-type implant at its surface. When a voltage (called the pinning voltage) is applied to the diode, two depletion regions form near the back-to-back diodes. When these two regions meet, the diode is emptied of charge. Since there are no electrons remaining on the diode, the transfer is noiseless.

In operation, an integration period is completed, followed by the resetting of the separate readout node (known as a floating diffusion node). This reset value is then sampled before the transfer gate is opened in order to sample the signal value and empty the diode. This is known as correlated double sampling (CDS) and largely eliminates both fixed pattern noise and dark current noise because the noise from the floating diffusion node capacitance is read in both the signal and reset value, and thus are eliminated if the two signals are subtracted.

In various examples, the first conversion circuit 110 of the drive-sense circuit 28 is configured to convert a receive signal component of a sensor signal corresponding to the one of the plurality of pixel sensors into the sensed signal 120—based on an analog reference signal. In an example of operation, the analog reference signal is generated based on the sensed signal 120 generated by the drive-sense circuit 28, prior to enabling the transfer gate. The transfer gate is then enabled and the drive-sense circuit 28 generates a second sensed signal 120. The use of the first sample of the sensed signal (prior to opening the transfer gate) to generate such an analog reference serves to compensate for these undesirable artifacts in the second sensed signal 120.

Again, given the drive-sense functionality of the drive-sense circuit 28, the source follower transistor is largely redundant and can be omitted, yielding a passive design with only two transistors that operate as reset and row select switches as shown as pixel sensor 85-6 of FIG. 17B. This not only increases the pixel's fill factor, it also helps to reduce the fixed pattern noise.

FIG. 18 is a flow diagram illustrating an example method. In particular, a method is presented for use with one or more functions/features described in conjunction with FIGS. 1-17.

In step 180 an analog reference signal is generated, via a drive-sense circuit 120 for example, based on a sensed signal before the transfer gate is enabled (opened). In step 182, the sensed signal is generated again once the transfer gate is opened, via a drive-sense circuit 120 for example, based on a difference from the analog reference signal. In step 184, the sensed signal is converted to pixel intensity/color. In step 186, image/frame data is generated by repeating this process for some or all of the pixels in the array.

FIG. 19 is a schematic block diagram illustrating an example of an analog reference generator. In the example shown, an analog reference generator 164' generates the analog reference signal 122 in response to the sensed signal 120 (a first sensed signal, e.g. before transfer) from a pixel sensor, such as pixel sensor 85-5 or 85-6 having a transfer gate or other pixel sensor that operates via coordinated double sampling. The analog reference signal generator 164' can be included in the drive-sense circuit 28 or provided as a separate device.

The analog reference generator 164' includes a buffer for temporarily storing the first sample, prior to generation of the analog reference signal 122 for generation of the second sensed signal 120. In various examples, the analog reference generator 164' can further include a sigma-delta DAC, a pulse width modulator DAC, a binary weighted DAC, a successive approximation DAC, and/or a thermometer-coded DAC or other circuit that converts digital to analog signals.

FIG. 20A is a schematic block diagram illustrating an example of an imaging array with drive-sense circuit(s). In particular, an imaging array with drive-sense circuit(s) 20-4, shown in schematic cross section, includes a shutter 202, a lens 204 a color filter array 206 and a pixel array with drive-sense circuits 208. The pixel array with drive-sense circuit(s) can be implemented via the imaging array with drive-sense circuit(s) 20-1, 20-2 or 20-3 as previously discussed. The shutter, when enabled via shutter control 90-3 (e.g. open), passes the incident light through the lens 204 and color filter array 206 to the pixel array with drive-sense circuit(s) 208 and when not enabled via shutter control 90-3 (disabled, e.g. shut), blocks the incident light.

The lens 204 can be implemented via a monolithic resin lens, an array of micro-lenses or other lens that directs the incident light through the color filter array to the pixels of the pixel array with drive-sense circuit(s) 208. The color filter array 206 provides color filter separation to direct light of different colors to differing pixel sensors. In various examples, the color filter array 206 and pixel array with drive-sense circuit(s) 208 are configured in a Bayer pattern where four adjacent pixels have two green (G) pixels, one red (R) pixel and one blue (B) pixel, however, other color patterns with other colors such as emerald (E), cyan (C), yellow (Y), White (W), in patterns such as RGBE, RYYB, CYYM, CYGM, RGBW, X-Trans, RCCC, RCCB, etc. can likewise be implemented.

The shutter 202 can be implemented via an electromechanical shutter or electronic shutter such as a focal-plane shutter, leaf shutter, rotating shutter, diaphragm shutter, LCD shutter, rolling shutter or other shutter or shutter equivalent. The shutter 202 can be used in different ways.

Referring back to FIG. 8, the shutter control can be synchronized with the reset control signal 90-1 and closed except during the times t, where $$t_1 < t < t_2$$

In this fashion, the generation of $I_{PH}$ is coordinated with the sensing/integration period between $t_1 < t < t_2$ or a sampling time $t_2$ used by the drive-sense circuit 28—depending on the implementation.

In another example, the shutter 202 can be used to support another form of double sampling. In particular, nominal analog reference data 160 for some or all of the pixel sensors 85 or 85' can be generated based on first sensed signals 120 when the shutter 202 is not enabled (shut). These nominal analog reference data 160 can be used to generate analog reference signal for the drive-sense circuit(s) 28 when generating second sensed signals 120 when the shutter 202 is enabled (open).

FIG. 20B is a graphical diagram illustrating an example diode voltage. In particular, a diode voltage $V_D$ is shown as a function of time corresponding to a pixel sensor 85. At some initial time $t_0$, the reset switch and shutter 202 are both closed, the photodiode is reverse biased and the diode voltage, $V_D$, is pinned to the reset voltage. At time $t_1$, the reset switch is opened while the shutter 202 remains closed. The diode voltage begins to drop but the shutter is or remains closed. In particular, the drop in the diode voltage $V_{D(nominal)}$ beginning at time $t_1$ can be expressed by the following relationship:

$$dV_D/dt = -I_D/C_{PD}$$

where I represents the photodiode current and $C_{PD}$ represents the capacitance of the photodiode. A first sensed signal 120 generated during this period can be used to generate the nominal analog reference data for the pixel sensor, and in particular gives and indication of the actual dark current and/or nominal photodiode capacitance of this particular pixel sensor (in the absence of incident light).

At time $t_2$, the reset switch is closed and the diode voltage is again pinned to the reset voltage which is achieved at $t_3$, at which point the reset switch and shutter are both opened. In this case, the diode voltage $V_D$ falls more rapidly in the presence of incident light, due to the increased current, increase in negative voltage slope and decreased effective capacitance. These can be sensed by drive-sense circuit 28 that uses the nominal analog reference data to generate a corresponding nominal analog reference signal. This helps compensates for the dark current of this particular pixel sensor 85 in generating the second sensed signal 120.

FIG. 21 is a flow diagram illustrating an example method. In particular, a method is presented for use with one or more functions/features described in conjunction with FIGS. 1-20. Step 210 includes generating an analog reference signal based on a sensed signal generated by the drive-sense circuit with the shutter closed. Step 212 includes resetting the pixel sensor and generating, via the drive-sense circuit, another sensed signal based on the analog reference signal when the shutter is open. In step 214, the sensed signal is converted to pixel intensity/color. In step 216, image/frame data is generated by repeating this process for some or all of the pixels in the array.

FIG. 22 is a timing diagram illustrating an example shutter control. In the example shown, shutter control 90-3 toggles between closed an open for the entire array. When the shutter is closed, nominal analog reference (NAR) data are generated for some or all of the pixel sensors 85 or 85' based on first sensed signals 120 from the drive-sense circuit(s) 28. When the shutter is open, second sensed signals 120 are generated by the drive-sense circuit(s) 28 for some or all of the pixel sensors 85 or 85'.

In various embodiments, the number of shutter open periods in a second of time corresponds to a video frame rate to be generated such as 1.5 FPS, 5 FPS, 10FPS, 15 FPS, 20 FPS, 30 FPS, 60FPS, 120FPS, or other higher or lower rate, etc. It should be noted that, while a timing diagram shown that alternates between open and closed conditions, in other examples, NAR data can be generated less frequently, only once at device start-up or via some other pattern.

FIG. 23 is a schematic block diagram illustrating an example of an analog reference generator. In the example shown, an analog reference generator 164' generates the analog reference signal 122 in response to the sensed signal 120 (a first sensed signal, e.g. with the shutter closed) from a pixel sensor 85 or 85'. The analog reference signal generator 164' can be included in the drive-sense circuit 28 or provided as a separate device.

The analog reference generator 164' includes a buffer for temporarily storing the first sample, prior to generation of the analog reference signal 122 for generation of the second sensed signal 120. In various examples, the analog reference generator 164' can further include a sigma-delta DAC, a pulse width modulator DAC, a binary weighted DAC, a successive approximation DAC, and/or a thermometer-coded DAC or other circuit that converts digital to analog signals.

FIGS. 24A and 24B are schematic block diagrams 28-3 illustrating an example of a drive-sense circuit. In particular, the drive-sense circuit 28-3 has many similar elements the drive-sense circuit 28-2 of FIG. 9 to the that are referred to by common reference numerals.

In the example shown, the second conversion circuit 112 can be selectively enabled and disabled. Furthermore an implementation of double sampling is presented. FIG. 24A represents a time period where the shutter is closed. An analog reference signal 122 is set to zero or some other nominal DC offset. The second conversion circuit 112 is disabled and the sensed signal 120 (shutter closed) is generated as the difference between the sensor signal 116 and analog reference signal 122—and therefore is a representation of $V_{D(nominal)}$ with or without the nominal DC offset, and consequently indicative of $I_D$ and/or $C_{PD}$.

The sensed signal 120 (shutter closed) can be stored as nominal analog reference data that is used by analog reference generator 164' to generate an analog reference signal 122 during a later time period represented FIG. 24B. In this case, the second conversion circuit 112 is enabled to support the generation of sensed signal 120 (with the shutter open).

FIG. 25A is a schematic block diagram illustrating an example of an imaging array with drive-sense circuit(s). Similar elements to the imaging array of FIG. 20A are represented by common reference numerals. In this case, however, the shutter 202 is omitted and a color filter layer with photomasks 222 is included forming a photo array with dark pixels 220.

The photomasks can be constructed of a metallic patches or other opaque portions that block incident light from reaching the surface of the dark pixels. These dark pixels can operate as reference pixels and can be constructed to mimic the functionality of the remaining pixel sensors 85 or 85' of the pixel array. When sensed by a drive-sense circuit 28, the dark pixels are used to generate sensed signals 120 representative of the nominal operation in the absence of incident light. This configuration supports dark current compensation in the drive-sense circuit via analog reference signals generated via sensed signals 120 from these dark pixels.

In an example of operation, nominal analog reference data for some or all of the (non-dark) pixel sensors 85 or 85', such as nominal analog reference data 160, can be generated by a drive-sense circuit 28 based on sensed signals 120 generated for these dark pixels. Similarly, the drive-sense circuit 28-3 configuration of FIG. 24B can be employed that operates based on a zero or nominal DC offset as the analog reference signal and with the second conversion circuit disabled. In other configurations, a drive-sense circuit 28-2 configuration of FIG. 9 can be employed. These nominal analog reference data 160 can be used to generate analog reference signals 122 for the drive-sense circuit(s) 28 when generating second sensed signals 120 when the shutter 202 is enabled (open).

FIG. 25B is a schematic block diagram illustrating an example of an analog reference generator. In the example shown, an analog reference generator 164' generates the analog reference signal 122 in response to the sensed signal 120 from the pixel sensor 85 or 85' of a dark pixel. The analog reference signal generator 164' can be included in the drive-sense circuit 28 or provided as a separate device.

The analog reference generator 164' includes a buffer or other memory for storing the sensed signal 120 corresponding to the dark pixel(s) as nominal analog reference data, prior to generation of the analog reference signal 122. In various examples, the analog reference generator 164' can further include a sigma-delta DAC, a pulse width modulator DAC, a binary weighted DAC, a successive approximation DAC, and/or a thermometer-coded DAC or other circuit that converts digital to analog signals.

Consider the case where a common set of nominal analog reference data 160 is used for all or a group of pixel sensors 85 or 85' of the pixel array with dark pixel(s). Nominal measurements, such as sensed signal 120, taken for a dark pixel can be stored as nominal analog reference data 160 and used as a representation of the nominal conditions for each of these pixel sensors. Furthermore, nominal measurements taken for a group of dark pixels can be averaged and stored as nominal analog reference data 160 and used as a representation of the nominal conditions for all or a group of these pixel sensors. In the alternative, nominal measurements taken for a particular dark pixel can be stored as nominal analog reference data 160 and used as a representation of the nominal conditions of only a single pixel sensor 85 or 85' immediately adjacent to the dark pixel or only a small group of immediately adjacent pixel sensors 85 or 85'. As used herein, an immediately adjacent pixel sensor means having a physical proximity such that there are no other pixel sensors physically between the dark pixel and the immediately adjacent pixels sensor.

FIG. 26 is a schematic block diagram illustrating an example of an imaging array with drive-sense circuit(s). In particular, a portion of a schematic cross section of an imaging array with drive-sense circuit(s) of FIG. 25A is shown. Incident light is guided by the lens array 204 through corresponding color filters 230 to corresponding live pixels sensors 85 (non-dark pixels). Conversely, photomasks 232 block the incident light from reaching the pixel sensors 85" (dark pixels). While shown as pixel sensors 85 and pixel sensors 85" coupled to a one or more drive-sense circuit(s) 28, pixel sensors 85' could likewise be employed for either dark or non-dark pixels.

FIG. 27 is a flow diagram illustrating an example method. In particular, a method is presented for use with one or more functions/features described in conjunction with FIGS. 1-26.

Step 250 includes generating an analog reference signal based on a sensed signal generated by the drive-sense circuit for a dark pixel. Step 252 includes resetting the pixel sensor and generating, via the drive-sense circuit, another sensed signal based on the analog reference signal. In step 254, the sensed signal is converted to pixel intensity/color. In step 256, image/frame data is generated by repeating this process for some or all of the pixels in the array.

FIG. 28 is a schematic block diagram illustrating an example of a pixel array with dark pixels. In particular, a pixel array with dark pixels 220-1 is shown having a sub-array of (live) pixels 85 or 85' and a sub-array of dark pixels 85 or 85'. Placing columns/rows of dark pixels between rows of live pixels have the advantage to reduce spatial variations in manufacturing and/or spatial variations of pixel temperature that have an effect on dark current. Presumably, sensed signals 120 for adjacent dark pixels, alone or averaged based on multiple adjacent dark pixels, provide the most accurate prediction/approximation of nominal electrical characteristics of the live pixels adjacent to them.

FIG. 29 is a schematic block diagram illustrating an example of a pixel array with dark pixels. In particular, a pixel array with dark pixels 220-2 is shown having a sub-array of (live) pixels 85 or 85' and a sub-array of dark pixels 85 or 85'. Placing the dark pixels only along the periphery of the array increases the live-to-dark ratio and supports higher resolution for arrays of the same size.

FIG. 30 is a schematic block diagram illustrating an example of a pixel array with dark pixels. In particular, a group of 4 pixels in a pixel array with dark pixels 220-3 is shown. The group has 3 (live) pixel sensors 85 or 85', each responding to a different color (e.g, red, green and blue) and a single of dark pixel 85 or 85'. In this configuration, nominal analog reference data for the dark pixel is used to generate analog reference signals 122 for each of the three live pixels in the group.

FIG. 31 is a flow diagram illustrating an example method. In particular, a method is presented for use with one or more functions/features described in conjunction with FIGS. 1-31. Step 700 includes providing a plurality of pixel sensors that respond to incident light. Step 702 includes coupling a drive-sense circuit to one of the plurality of pixel sensors in response to a row selection signal and a column selection signal.

Step 704 includes generating a sensed signal via the drive-sense circuit, wherein the drive-sense circuit includes: a first conversion circuit configured to convert a receive signal component of a sensor signal corresponding to the one of the plurality of pixel sensors into the sensed signal; and a second conversion circuit configured to generate, based on the sensed signal, a drive signal component of the sensor signal corresponding to the one of the plurality of pixel sensors. Step 706 includes generating a plurality of other sensed signals corresponding to other ones of the plurality of pixel sensors by performing steps 702 and 704 for the other ones of the plurality of pixel sensors. Step 708 includes generating image data based on the sensed signal and the plurality of other sensed signals.

FIG. 32 is a flow diagram illustrating an example method. In particular, a method is presented for use with one or more functions/features described in conjunction with FIGS. 1-31. Step 720 includes providing a plurality of pixel sensors arranged in a first direction and a second direction that respond to incident light, wherein the first direction is different than the second direction. Step 722 includes coupling, in response to subset selection signal, a plurality of drive-sense circuits to a selected subset of the plurality of pixel sensors along the first direction.

Step 724 includes generating a plurality of sensed signals via the plurality of drive-sense circuits, wherein each of the plurality of drive-sense circuits includes: a first conversion circuit configured to convert a receive signal component of a sensor signal corresponding to one of the plurality of pixel sensors in the selected subset, into a corresponding one of the plurality of sensed signals; and a second conversion circuit configured to generate, based on the corresponding one of the plurality of sensed signals, a drive signal component of the sensor signal corresponding to the one of the plurality of pixel sensors in the selected subset. Step 726 includes generating a plurality of other sensed signals corresponding to other subsets of the plurality of pixel sensors in the first direction by performing steps 722 and 724 for the other subsets of the plurality of pixel sensors. Step 728 includes generating image data based on the plurality of sensed signals and the plurality of other sensed signals.

FIG. 33 is a flow diagram illustrating an example method. In particular, a method is presented for use with one or more functions/features described in conjunction with FIGS. 1-32. Step 740 includes providing a plurality of pixel sensors arranged in a first direction and a second direction that respond to incident light, wherein the first direction is different than the second direction. Step 742 includes providing a plurality drive-sense circuits, wherein each of the plurality of drive-sense circuits is coupled to a corresponding one of the plurality of pixel sensors.

Step 744 includes generating a plurality of sensed signals via the plurality of drive-sense circuits, wherein each of the plurality of drive-sense circuits includes: a first conversion circuit configured to convert a receive signal component of a sensor signal corresponding to the corresponding one of the plurality of pixel sensors into a corresponding one of the plurality of sensed signals; and a second conversion circuit configured to generate, based on the corresponding one of the plurality of sensed signals, a drive signal component of the sensor signal corresponding to the one of the plurality of pixel sensors. Step 746 includes generating image data based on the plurality of sensed signals.

FIG. 34 is a flow diagram illustrating an example method. In particular, a method is presented for use with one or more functions/features described in conjunction with FIGS. 1-33. Step 760 includes providing a plurality of pixel sensors that respond to incident light. Step 762 includes providing at least one drive-sense circuit.

Step 764 generating a sensed signal via the at least one drive-sense circuit corresponding to one of the plurality of pixel sensors, wherein the at least one drive-sense circuit includes: a first conversion circuit configured to convert, based on an analog reference signal, a receive signal component of a sensor signal corresponding to the one of the plurality of pixel sensors into the sensed signal, wherein the analog reference signal is generated based on nominal reference data that indicates pixel sensor performance in absence of the incident light; and a second conversion circuit configured to generate, based on the sensed signal, a drive signal component of the sensor signal corresponding to the one of the plurality of pixel sensors. Step 766 includes generating a plurality of other sensed signals corresponding to other ones of the plurality of pixel sensors by performing step 764 for the other ones of the plurality of pixel sensors. Step 768 includes generating image data based on the sensed signal and the plurality of other sensed signals.

FIG. 35 is a flow diagram illustrating an example method. In particular, a method is presented for use with one or more functions/features described in conjunction with FIGS. 1-34. Step 780 includes providing a plurality of pixel sensors that respond to incident light. Step 782 includes providing at least one drive-sense circuit.

Step 784 includes generating a sensed signal via the at least one drive-sense circuit corresponding to one of the plurality of pixel sensors, wherein the at least one drive-sense circuit includes: a first conversion circuit configured to convert, a receive signal component of a sensor signal corresponding to the one of the plurality of pixel sensors into the sensed signal, wherein the sensed signal indicates a change in a capacitance associated with the one of the plurality of pixel sensors; and a second conversion circuit configured to generate, based on the sensed signal, a drive signal component of the sensor signal corresponding to the one of the plurality of pixel sensors. Step 786 includes generating, via the at least one drive-sense circuit, a plurality of other sensed signals corresponding to other ones of the plurality of pixel sensors; and Step 788 includes generating image data based on the sensed signal and the plurality of other sensed signals.

In various examples, the plurality of pixel sensors each include a CMOS circuit having a photodiode. The first conversion circuit can be configured to convert, based on an analog reference signal, the receive signal component of the sensor signal corresponding to the one of the plurality of pixel sensors into the sensed signal, wherein the analog reference signal is generated based on nominal reference data that indicates an electrical characteristic of the one of the plurality of pixel sensors in an absence of the incident light. The nominal reference data used by the first conversion circuit to generate the sensed signal can also be used by the first conversion circuit to generate the plurality of other sensed signals corresponding to the other ones of the plurality of pixel sensors. The nominal reference data can be customized to the one of the plurality of pixel sensors and further the first conversion circuit can generate the plurality of other sensed signals corresponding to the other ones of the plurality of pixel sensors, based on a plurality of other nominal reference data customized to the other ones of the plurality of pixel sensors. The electrical characteristic can indicate a capacitance of the one of the plurality of pixel sensors in an absence of the incident light.

In various examples, the at least one drive-sense circuit includes a single drive-sense circuit that is selectively coupled to the one of the plurality of pixel sensors to generate the sensed signal and is selectively coupled to each of the other ones of the plurality of pixel sensors to generate the plurality of other sensed signals. The at least one drive-sense circuit can include a plurality of drive-sense circuits that is coupled to a selected subset of the plurality of pixel sensors along a first direction. The at least one drive-sense circuit can include a plurality of drive-sense circuits each coupled to a corresponding one of the plurality of pixel sensors.

FIG. 36 is a flow diagram illustrating an example method. In particular, a method is presented for use with one or more functions/features described in conjunction with FIGS. 1-35. Step 800 includes providing a plurality of pixel sensors that respond to incident light. Step 802 includes providing at least one drive-sense circuit. Step 804 includes generating an analog reference signal corresponding to one of the plurality of pixel sensors, prior to enabling the transfer gate. Step 806 includes enabling the transfer gate. Step 808 includes generating a sensed signal via the at least one drive-sense circuit corresponding to the one of the plurality of pixel sensors, wherein the at least one drive-sense circuit includes: a first conversion circuit configured to convert, based on the analog reference signal, a receive signal component of a sensor signal corresponding to the one of the plurality of pixel sensors into the sensed signal; and a second conversion circuit configured to generate, based on the sensed signal, a drive signal component of the sensor signal corresponding to the one of the plurality of pixel sensors.

Step 810 includes generating a plurality of other sensed signals corresponding to other ones of the plurality of pixel sensors by performing steps 804, 806 and 808 for the other ones of the plurality of pixel sensors. Step 812 includes generating image data based on the sensed signal and the plurality of other sensed signals.

FIG. 37 is a flow diagram illustrating an example method. In particular, a method is presented for use with one or more functions/features described in conjunction with FIGS. 1-36. Step 820 includes providing a plurality of pixel sensors that respond to incident light. Step 822 includes providing at least one drive-sense circuit. Step 824 includes providing a shutter that, when enabled, passes the incident light and when not enabled, blocks the incident light. Step 826 includes generating at least one analog reference signal corresponding to one of the plurality of pixel sensors, when the shutter is not enabled.

Step 828 includes generating a sensed signal via the at least one drive-sense circuit corresponding to the one of the plurality of pixel sensors when the shutter is enabled, wherein the at least one drive-sense circuit includes: a first conversion circuit configured to convert, based on the at least one analog reference signal, a receive signal component of a sensor signal corresponding to the one of the plurality of pixel sensors into the sensed signal; and a second conversion circuit configured to generate, based on the sensed signal, a drive signal component of the sensor signal corresponding to the one of the plurality of pixel sensors. Step 830 includes generating a plurality of other sensed signals corresponding to other ones of the plurality of pixel sensors by performing step 828 for the other ones of the plurality of pixel sensors. Step 832 includes generating image data based on the sensed signal and the plurality of other sensed signals.

FIG. 38 is a flow diagram illustrating an example method. In particular, a method is presented for use with one or more functions/features described in conjunction with FIGS. 1-37. Step 840 includes providing a plurality of pixel sensors that respond to incident light. Step 842 includes providing at least one drive-sense circuit. Step 844 includes providing at least one dark pixel that does not respond to the incident light. Step 846 includes generating at least one analog reference signal via the at least one dark pixel.

Step 848 includes generating a sensed signal corresponding to one of the plurality of pixel sensors via the at least one drive-sense circuit, wherein the at least one drive-sense circuit includes: a first conversion circuit configured to convert, based on the at least one analog reference signal, a receive signal component of a sensor signal corresponding to the one of the plurality of pixel sensors into the sensed signal; and a second conversion circuit configured to generate, based on the sensed signal, a drive signal component of the sensor signal corresponding to the one of the plurality of pixel sensors. Step 850 includes generating a plurality of other sensed signals corresponding to other ones of the plurality of pixel sensors by performing step 848 for the other ones of the plurality of pixel sensors. Step 852 includes generating image data based on the sensed signal and the plurality of other sensed signals.

FIG. 39 is a schematic block diagram illustrating an example of a handheld communication device. In particular, a handheld communication device 1014 is shown that includes one or more similar elements to imaging device 14 that are referred to by common reference numerals. In various embodiments, the handheld communication device 1014 can be implemented as a tablet, laptop computer, smartphone, smartwatch, smart display device, or other portable personal communication device.

The handheld communication device 1014 includes one or more imaging array with drive-sense circuit(s) 20 that facilitates the capture of frames of still and/or video data. The handheld communication device 1014 further includes a one or more wireless interfaces (72, 74) for sending and receiving data via wireless communications. The one or more wireless interfaces (72, 74) can include 802.11 transceivers, 4G or 5G transceivers, Bluetooth transceivers, Zigbee transceivers or other wireless interface devices that allow the handheld communication device 1014 to send and receive text and chat messages, email message, voice calls, engage in social media messaging, share audio, video, still images and/or other media. Furthermore, the display device 16 can provide a touch screen interface as a user interactive input/output device that allows the user to, for example, facilitate the capture of frames of still and/or video data, to store the still and/or video data, to append text, graphics, audio and/or other media to the still and/or video data, to upload or share the still and/or video data, to send messages that contain the still and/or video data, and/or to facilitate the other operations of the handheld communications device.

In an example of operation, the handheld communications device 14 operates to perform operations that include:
providing a plurality of pixel sensors that respond to incident light;
providing at least one drive-sense circuit;
generating, a sensed signal via the at least one drive-sense circuit corresponding to one of the plurality of pixel sensors, wherein the at least one drive-sense circuit includes: a first conversion circuit configured to convert, a receive signal component of a sensor signal corresponding to the one of the plurality of pixel sensors into the sensed signal, wherein the sensed signal indicates a change in an electrical characteristic associated with the one of the plurality of pixel sensors; and a second conversion circuit configured to generate, based on the sensed signal, a drive signal component of the sensor signal corresponding to the one of the plurality of pixel sensors.
generating a plurality of other sensed signals corresponding to other ones of the plurality of pixel sensors via the at least one drive-sense circuit; and
generating image data based on the sensed signal and the plurality of other sensed signals for display via a touch screen.

FIG. 40 is a schematic block diagram illustrating an example of an electron microscope. In particular, an electron microscope is presented that includes an electron gun 1100, one or more lenses 1102, a specimen holder 1104 and an imaging device 14 that responds to incident electrons.

In operation, the electron gun generates an electron beam 1120. The one or more lenses 1102 form the electron beam 1120 into a primary electron beam 1122 that is focused on a specimen to be imaged. The specimen holder 1104 holds the specimen. In various examples, the specimen holder 1104 can include a vacuum chamber that reduces the amount of air molecules surrounding the specimen that might be impacted by the primary electron beam, thereby reducing undesirable noise in the resultant image. The secondary electron beam 1124 results from transmission of the primary electron beam 1122 through the specimen (when implemented in a transmission electron microscope configuration) or reflection of the primary electron beam 1122 from the specimen (when implemented in a reflection electron microscope configuration).

In various examples, the imaging device 14 operates by:
providing a plurality of pixel sensors that respond to an incident electron beam;
providing at least one drive-sense circuit;
generating, a sensed signal via the at least one drive-sense circuit corresponding to one of the plurality of pixel sensors, wherein the at least one drive-sense circuit includes: a first conversion circuit configured to convert, a receive signal component of a sensor signal corresponding to the one of the plurality of pixel sensors into the sensed signal, wherein the sensed signal indicates a change in an electrical characteristic associated with the one of the plurality of pixel sensors; and a second conversion circuit configured to generate, based on the sensed signal, a drive signal component of the sensor signal corresponding to the one of the plurality of pixel sensors;
generating a plurality of other sensed signals corresponding to other ones of the plurality of pixel sensors via the at least one drive-sense circuit; and
generating image data based on the sensed signal and the plurality of other sensed signals.

FIG. 41 is a schematic block diagram illustrating an example of a night vision device. The night vision device 1214 includes one or more lenses 1202 and an imaging device 14, 1244-1 or 1244-2. In various examples, the night vision device 1214 can be implemented as a night vision camera, a night vision scope, a telescope, night vision goggles, or other low light or night vision imaging capture device. In operation, primary incident light 1220 from a scene 1204 is formed into secondary incident light 1222 focused on the surface of the imaging device 14, 1244-1 or 1244-2. The primary incident light 1220 can be an incident low light signal that comes from the scene 1204 itself and/or can be reflected from a light source 1206 included in the night vision device 1214.

In an example of operation, the imaging device 14, 1244-1 or 1244-2 operates by:
providing a plurality of pixel sensors that respond to an incident low light signal;
providing at least one drive-sense circuit;
generating, a sensed signal via the at least one drive-sense circuit corresponding to one of the plurality of pixel sensors, wherein the at least one drive-sense circuit includes: a first conversion circuit configured to convert, a receive signal component of a sensor signal corresponding to the one of the plurality of pixel sensors into the sensed signal, wherein the sensed signal indicates a change in an electrical characteristic associated with the one of the plurality of pixel sensors; and a second conversion circuit configured to generate, based on the sensed signal, a drive signal component of the sensor signal corresponding to the one of the plurality of pixel sensors;
generating a plurality of other sensed signals corresponding to other ones of the plurality of pixel sensors via the at least one drive-sense circuit; and
generating image data based on the sensed signal and the plurality of other sensed signals.

FIG. 42 is a schematic block diagram illustrating an example of a satellite imaging device. The satellite imaging device 1234 includes one or more lenses 1202 and an imaging device 1244-2. In operation, primary incident light 1220 from a scene 1204 is formed into secondary incident light 1222 focused on the surface of the imaging device 1244-2.

In an example of operation, the imaging device 1244-2 operates by:
  providing a plurality of pixel sensors that respond to incident light;
  providing at least one drive-sense circuit;
  generating, a sensed signal via the at least one drive-sense circuit corresponding to one of the plurality of pixel sensors, wherein the at least one drive-sense circuit includes: a first conversion circuit configured to convert, a receive signal component of a sensor signal corresponding to the one of the plurality of pixel sensors into the sensed signal, wherein the sensed signal indicates a change in an electrical characteristic associated with the one of the plurality of pixel sensors; and a second conversion circuit configured to generate, based on the sensed signal, a drive signal component of the sensor signal corresponding to the one of the plurality of pixel sensors;
  generating a plurality of other sensed signals corresponding to other ones of the plurality of pixel sensors via the at least one drive-sense circuit;
  generating image data based on the sensed signal and the plurality of other sensed signals; and
  transmitting the image data to a ground-based receiver via a wireless interface.

FIG. 43 is a schematic block diagram illustrating an example of an imaging device. In particular, an imaging device 1244-1 is shown that includes similar elements to imaging device 14 that are referred to by common reference numerals. In various implementations, the image data is merely generated and displayed by the display device 16. In these examples, the image data may not be stored and the memory interface module(s) 62, separate memories 64 and 66 may be omitted, in lieu of dedicated memories provided in conjunction with one or more other modules, as may be required. Furthermore, the image data may not be transmitted and the network interface module(s) 60, separate network cards 68 and 68 may be omitted, if not required.

FIG. 44 is a schematic block diagram illustrating an example of an imaging device. In particular, an imaging device 1244-2 is shown that includes similar elements to imaging device 14 that are referred to by common reference numerals. In various implementations, the image data is merely generated and transmitted via network card 68 or 70. In these examples, the image data may not be stored and the memory interface module(s) 62, separate memories 64 and 66 may be omitted, in lieu of dedicated memories provided in conjunction with one or more other modules, as may be required. Furthermore, the image data may or may not be displayed and the I/O interface module 54 and display device 16 may be omitted, if not required.

FIG. 45 is a schematic block diagram of a LIDAR device. The LIDAR device 1214, for example of an autonomous vehicle, includes a controllable mirror and an imaging device 1344. The light source 1306 can be implemented via a semiconductor laser, other laser or other source of coherent light that is represented by generated light 1312.

In operation, the generated light 1312 is reflected from the controllable mirror as reflected light 1314. The controllable mirror 1310 controls the reflected light 1314 so as to scan the scene 1304 and generate, via reflection from the scene, primary incident light 1320. The primary incident light 1320 is reflected back via the controllable mirror as secondary incident light 1322 that is incident to the surface of the imaging device 1344.

In an example of operation, the imaging device 1344 operates by:
  providing at least one pixel sensor that responds to incident laser light;
  providing at least one drive-sense circuit coupled to the at least one pixel sensor;
  generating, a sensed signal via the at least one drive-sense circuit, wherein the at least one drive-sense circuit includes: a first conversion circuit configured to convert, a receive signal component of a sensor signal corresponding to the at least one pixel sensor into the sensed signal, wherein the sensed signal indicates a change in an electrical characteristic associated with the one of the plurality of pixel sensors; and a second conversion circuit configured to generate, based on the sensed signal, a drive signal component of the sensor signal corresponding to the at least one pixel sensor;
  generating image data based on the sensed signal; and
  transmitting the image data to an autonomous vehicle system of the autonomous vehicle.

In this fashion the autonomous vehicle system can use the image data for purposes of vehicle control, navigation and/or other purposes.

FIG. 46 is a schematic block diagram illustrating an example of an imaging device. In particular, an imaging device 1344 is shown that includes similar elements to imaging device 14 that are referred to by common reference numerals.

In the example shown, the controllable mirror 1310 scans the scene under control of control signals 90 from the graphics processing module, the image data is merely generated and transmitted via network card 68 or 70. In this example, the image data may not be displayed and the I/O interface module 54, and display device 16 may be omitted, if not required. As shown, network card 68 is employed to communicate with an autonomous vehicle system, for example, to transmit the image data. In addition, the wireless interface 72 can communicate with an autonomous vehicle server, to receive updates, transmit image data, error reports, and/or other data.

FIG. 47 is a flow diagram illustrating an example method. In particular, a method is presented for use with one or more functions/features described in conjunction with FIGS. 1-46. Step 1400 includes providing a plurality of pixel sensors that respond to incident light. Step 1402 includes providing at least one drive-sense circuit.

Step 1404 includes generating, a sensed signal via the at least one drive-sense circuit corresponding to one of the plurality of pixel sensors, wherein the at least one drive-sense circuit includes: a first conversion circuit configured to convert, a receive signal component of a sensor signal corresponding to the one of the plurality of pixel sensors into the sensed signal, wherein the sensed signal indicates a change in an electrical characteristic associated with the one of the plurality of pixel sensors; and a second conversion circuit configured to generate, based on the sensed signal, a drive signal component of the sensor signal corresponding to the one of the plurality of pixel sensors. Step 1406 includes generating a plurality of other sensed signals corresponding to other ones of the plurality of pixel sensors via the at least one drive-sense circuit. Step 1408 includes generating image data based on the sensed signal and the plurality of other sensed signals.

In various examples, the plurality of pixel sensors each include a CMOS circuit having a photodiode. The first conversion circuit can be configured to convert, based on an analog reference signal, the receive signal component of the sensor signal corresponding to the one of the plurality of pixel sensors into the sensed signal, wherein the analog reference signal is generated based on nominal reference data that indicates an electrical characteristic of the one of the plurality of pixel sensors in an absence of the incident light. The nominal reference data used by the first conversion circuit to generate the sensed signal can also be used by the first conversion circuit to generate the plurality of other sensed signals corresponding to the other ones of the plurality of pixel sensors. The nominal reference data can be customized to the one of the plurality of pixel sensors and further the first conversion circuit can generate the plurality of other sensed signals corresponding to the other ones of the plurality of pixel sensors, based on a plurality of other nominal reference data customized to the other ones of the plurality of pixel sensors. The electrical characteristic can indicate a capacitance of the one of the plurality of pixel sensors.

In various examples, the at least one drive-sense circuit includes a single drive-sense circuit that is selectively coupled to the one of the plurality of pixel sensors to generate the sensed signal and is selectively coupled to each of the other ones of the plurality of pixel sensors to generate the plurality of other sensed signals. The at least one drive-sense circuit can include a plurality of drive-sense circuits that is coupled to a selected subset of the plurality of pixel sensors along a first direction. The at least one drive-sense circuit can include a plurality of drive-sense circuits each coupled to a corresponding one of the plurality of pixel sensors.

FIG. 48 is a flow diagram illustrating an example method. In particular, a method is presented for use with one or more functions/features described in conjunction with FIGS. 1-47. Step 1420 includes providing a plurality of pixel sensors that respond to an incident electron beam. Step 1422 includes providing at least one drive-sense circuit.

Step 1424 includes generating, a sensed signal via the at least one drive-sense circuit corresponding to one of the plurality of pixel sensors, wherein the at least one drive-sense circuit includes: a first conversion circuit configured to convert, a receive signal component of a sensor signal corresponding to the one of the plurality of pixel sensors into the sensed signal, wherein the sensed signal indicates a change in an electrical characteristic associated with the one of the plurality of pixel sensors; and a second conversion circuit configured to generate, based on the sensed signal, a drive signal component of the sensor signal corresponding to the one of the plurality of pixel sensors. Step 1426 includes generating a plurality of other sensed signals corresponding to other ones of the plurality of pixel sensors via the at least one drive-sense circuit. Step 1428 includes generating image data based on the sensed signal and the plurality of other sensed signals.

FIG. 49 is a flow diagram illustrating an example method. In particular, a method is presented for use with one or more functions/features described in conjunction with FIGS. 1-48. Step 1440 includes providing a plurality of pixel sensors that respond to an incident low light signal. Step 1442 includes providing at least one drive-sense circuit.

Step 1444 includes generating, a sensed signal via the at least one drive-sense circuit corresponding to one of the plurality of pixel sensors, wherein the at least one drive-sense circuit includes: a first conversion circuit configured to convert, a receive signal component of a sensor signal corresponding to the one of the plurality of pixel sensors into the sensed signal, wherein the sensed signal indicates a change in an electrical characteristic associated with the one of the plurality of pixel sensors; and a second conversion circuit configured to generate, based on the sensed signal, a drive signal component of the sensor signal corresponding to the one of the plurality of pixel sensors. Step 1446 includes generating a plurality of other sensed signals corresponding to other ones of the plurality of pixel sensors via the at least one drive-sense circuit. Step 1448 includes generating image data based on the sensed signal and the plurality of other sensed signals.

FIG. 50 is a flow diagram illustrating an example method. In particular, a method is presented for use with one or more functions/features described in conjunction with FIGS. 1-49. Step 1460 includes providing a plurality of pixel sensors that respond to incident light. Step 1462 includes providing at least one drive-sense circuit.

Step 1464 includes generating, a sensed signal via the at least one drive-sense circuit corresponding to one of the plurality of pixel sensors, wherein the at least one drive-sense circuit includes: a first conversion circuit configured to convert, a receive signal component of a sensor signal corresponding to the one of the plurality of pixel sensors into the sensed signal, wherein the sensed signal indicates a change in an electrical characteristic associated with the one of the plurality of pixel sensors; and a second conversion circuit configured to generate, based on the sensed signal, a drive signal component of the sensor signal corresponding to the one of the plurality of pixel sensors.

Step 1466 includes generating a plurality of other sensed signals corresponding to other ones of the plurality of pixel sensors via the at least one drive-sense circuit. Step 1468 includes generating image data based on the sensed signal and the plurality of other sensed signals. Step 1470 includes transmitting the image data to a ground-based receiver via a wireless interface.

FIG. 51 is a flow diagram illustrating an example method. In particular, a method is presented for use with one or more functions/features described in conjunction with FIGS. 1-50. Step 1480 includes providing at least one pixel sensor that responds to incident laser light. Step 1482 includes providing at least one drive-sense circuit coupled to the at least one pixel sensor.

Step 1484 includes generating, a sensed signal via the at least one drive-sense circuit, wherein the at least one drive-sense circuit includes: a first conversion circuit configured to convert, a receive signal component of a sensor signal corresponding to the at least one pixel sensor into the sensed signal, wherein the sensed signal indicates a change in an electrical characteristic associated with the one of the plurality of pixel sensors; and a second conversion circuit configured to generate, based on the sensed signal, a drive signal component of the sensor signal corresponding to the at least one pixel sensor. Step 1486 includes generating image data based on the sensed signal. Step 1488 includes transmitting the image data to an autonomous vehicle system of the autonomous vehicle.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provide an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more examples have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more examples are used herein to illustrate one or more aspects, one or more features, one or more concepts, and/or one or more examples. A physical example of an apparatus, an article of manufacture, a machine, and/or of a process may include one or more of the aspects, features, concepts, examples, etc. described with reference to one or more of the examples discussed herein. Further, from figure to figure, the examples may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the examples. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element).

As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more examples have been expressly described herein, other combinations of these features and functions are likewise possible. The present disclosure is not limited by the particular examples disclosed herein and expressly incorporates these other combinations.

What is claimed is:

1. A method for use in a handheld communication device that includes a touch screen interface, the method comprising:
    providing a plurality of pixel sensors that respond to incident light;
    providing at least one drive sense circuit;
    generating, a sensed signal via the at least one drive-sense circuit corresponding to one of the plurality of pixel sensors, wherein the at least one drive-sense circuit includes:
        a first conversion circuit configured to convert a receive signal component of a sensor signal corresponding to the one of the plurality of pixel sensors into the sensed signal, wherein the sensed signal indicates a change in an electrical characteristic associated with the one of the plurality of pixel sensors; and
        a second conversion circuit configured to generate, based on the sensed signal, a drive signal component of the sensor signal corresponding to the one of the plurality of pixel sensors;
    generating a plurality of other sensed signals corresponding to other ones of the plurality of pixel sensors via the at least one drive sense circuit; and
    generating image data based on the sensed signal and the plurality of other sensed signals.

2. The method of claim 1 wherein the plurality of pixel sensors each include a CMOS circuit having a photodiode.

3. The method of claim 1 wherein the first conversion circuit is configured to convert, based on an analog reference signal, the receive signal component of the sensor signal corresponding to the one of the plurality of pixel sensors into the sensed signal; and wherein the analog reference signal is generated based on nominal reference data that indicates an electrical characteristic of the one of the plurality of pixel sensors in an absence of the incident light.

4. The method of claim 3 wherein the nominal reference data used by the first conversion circuit to generate the sensed signal is also used by the first conversion circuit to generate the plurality of other sensed signals corresponding to the other ones of the plurality of pixel sensors.

5. The method of claim 3 wherein the nominal reference data is customized to the one of the plurality of pixel sensors.

6. The method of claim 3 wherein the first conversion circuit generates the plurality of other sensed signals corresponding to the other ones of the plurality of pixel sensors, based on a plurality of other nominal reference data customized to the other ones of the plurality of pixel sensors.

7. The method of claim 1 wherein the electrical characteristic indicates a capacitance of the one of the plurality of pixel sensors.

8. The method of claim 1 wherein the at least one drive-sense circuit includes a single drive-sense circuit that is selectively coupled to the one of the plurality of pixel sensors to generate the sensed signal and is selectively coupled to each of the other ones of the plurality of pixel sensors to generate the plurality of other sensed signals.

9. The method of claim 1 wherein the at least one drive-sense circuit includes a plurality of drive-sense circuits that is coupled to a selected subset of the plurality of pixel sensors along a first direction.

10. The method of claim 1 wherein the at least one drive-sense circuit includes a plurality of drive-sense circuits each coupled to a corresponding one of the plurality of pixel sensors.

11. A handheld communication device:
at least one wireless interface for sending and receiving data via wireless communications;
at least one memory that stores operational instructions;
at least one processing circuit that executes the instructions to perform operations;
an imaging device that includes:
  a plurality of pixel sensors that respond to incident light;
  at least one drive sense circuit that generates a sensed signal via the at corresponding to one of the plurality of pixel sensors, wherein the at least one drive-sense circuit includes:
    a first conversion circuit configured to convert a receive signal component of a sensor signal corresponding to the one of the plurality of pixel sensors into the sensed signal, wherein the sensed signal indicates a change in an electrical characteristic associated with the one of the plurality of pixel sensors; and
    a second conversion circuit configured to generate, based on the sensed signal, a drive signal component of the sensor signal corresponding to the one of the plurality of pixel sensors;
  wherein the at least one drive sense circuit generates a plurality of other sensed signals corresponding to other ones of the plurality of pixel sensors; and
a graphics processing module configured to generate image data based on the sensed signal and the plurality of other sensed signals for wireless communication via the at least one wireless interface.

12. The handheld communication of claim 11 wherein the plurality of pixel sensors each include a CMOS circuit having a photodiode.

13. The handheld communication of claim 11 wherein the first conversion circuit is configured to convert, based on an analog reference signal, the receive signal component of the sensor signal corresponding to the one of the plurality of pixel sensors into the sensed signal; and
wherein the analog reference signal is generated based on nominal reference data that indicates an electrical characteristic of the one of the plurality of pixel sensors in an absence of the incident light.

14. The handheld communication of claim 13 wherein the nominal reference data used by the first conversion circuit to generate the sensed signal is also used by the first conversion circuit to generate the plurality of other sensed signals corresponding to the other ones of the plurality of pixel sensors.

15. The handheld communication of claim 13 wherein the nominal reference data is customized to the one of the plurality of pixel sensors.

16. The handheld communication of claim 13 wherein the first conversion circuit generates the plurality of other sensed signals corresponding to the other ones of the plurality of pixel sensors, based on a plurality of other nominal reference data customized to the other ones of the plurality of pixel sensors.

17. The handheld communication of claim 11 wherein the electrical characteristic indicates a capacitance of the one of the plurality of pixel sensors.

18. The handheld communication of claim 11 wherein the at least one drive-sense circuit includes a single drive-sense circuit that is selectively coupled to the one of the plurality of pixel sensors to generate the sensed signal and is selectively coupled to each of the other ones of the plurality of pixel sensors to generate the plurality of other sensed signals.

19. The handheld communication of claim 11 wherein the at least one drive-sense circuit includes a plurality of drive-sense circuits that is coupled to a selected subset of the plurality of pixel sensors along a first direction.

20. The handheld communication of claim 11 wherein the at least one drive-sense circuit includes a plurality of drive-sense circuits each coupled to a corresponding one of the plurality of pixel sensors.

* * * * *